US009578567B1

(12) United States Patent
Laganier et al.

(10) Patent No.: US 9,578,567 B1
(45) Date of Patent: Feb. 21, 2017

(54) DATA CENTER RELOCATION METHODS AND APPARATUS

(71) Applicant: Luminate Wireless, Inc., Cupertino, CA (US)

(72) Inventors: Julien Laganier, San Francisco, CA (US); Kevin Yu, Palo Alto, CA (US)

(73) Assignee: LUMINATE WIRELESS, INC., Cupertino, CA (US)

( * ) Notice: Subject to any disclaimer, the term of this patent is extended or adjusted under 35 U.S.C. 154(b) by 0 days.

(21) Appl. No.: 14/469,562

(22) Filed: Aug. 26, 2014

(51) Int. Cl.
| H04W 36/12 | (2009.01) |
| H04W 36/24 | (2009.01) |
| H04L 12/24 | (2006.01) |
| H04W 88/08 | (2009.01) |
| H04W 76/02 | (2009.01) |
| H04W 36/00 | (2009.01) |

(52) U.S. Cl.
CPC .......... *H04W 36/12* (2013.01); *H04L 41/0668* (2013.01); *H04W 36/0005* (2013.01); *H04W 36/0022* (2013.01); *H04W 36/24* (2013.01); *H04W 76/02* (2013.01); *H04W 88/08* (2013.01)

(58) Field of Classification Search
CPC ...... H04W 48/17; H04W 48/18; H04W 48/20; H04W 76/02; H04W 76/028; H04W 76/045; H04W 76/046; H04W 76/064–76/068; H04W 36/0005; H04W 36/0011; H04W 36/0022; H04W 36/0055–36/0077; H04W 36/10; H04W 36/12; H04W 36/14; H04W 36/24; H04W 36/34; H04W 36/38; H04W 40/244; H04W 40/28; H04W 40/36; H04L 45/28; H04L 41/0654; H04L 41/0668
See application file for complete search history.

(56) References Cited

U.S. PATENT DOCUMENTS

| 8,532,661 B2 | 9/2013 | Vikberg et al. |
| 9,107,110 B2 | 8/2015 | Zdarsky et al. |
| 2009/0003268 A1 | 1/2009 | Kesavan et al. |
| 2009/0190550 A1 | 7/2009 | Giustina et al. |

(Continued)

OTHER PUBLICATIONS

3GPP TS 36.413 V10.1.0, 3rd Generation Partnership Project; Technical Specification Group Radio Access Network; Evolved Universal Terrestrial Radio Access Network (E-UTRAN); S1 Application Protocol (S1AP) (Release 10), 256 pages, Mar. 2011.

(Continued)

*Primary Examiner* — Joshua Kading
(74) *Attorney, Agent, or Firm* — Michael P. Straub; Stephen T. Straub; Ronald P. Straub

(57) ABSTRACT

Methods and apparatus for supporting a data center relocation with regard to an access point are described. A primary gateway connection is established between the access point and a primary gateway in a first data center, and a secondary gateway connection is established between the access point and a secondary gateway in a second data center. A path switch request is sent via the secondary gateway connection. A DNS server sends an IP address corresponding to the second data center. The data center for the access point is switched from the first data center to the second data center. In some embodiments, the transition from the first data center to the second data center is in response to a detected communications failure. In other embodiments, the transition from the first data center to the second data center is due to scheduled maintenance.

26 Claims, 29 Drawing Sheets

(56) References Cited

U.S. PATENT DOCUMENTS

| | | | |
|---|---|---|---|
| 2009/0278705 A1 | 11/2009 | Chhabra et al. | |
| 2010/0041364 A1 | 2/2010 | Lott et al. | |
| 2011/0149905 A1 | 6/2011 | Kim | |
| 2011/0158171 A1* | 6/2011 | Centonza | H04L 12/2856 370/328 |
| 2012/0026865 A1* | 2/2012 | Fan | H04W 76/02 370/225 |
| 2012/0110197 A1* | 5/2012 | Miklos | H04W 36/12 709/228 |
| 2012/0163336 A1 | 6/2012 | Adjakple et al. | |
| 2013/0070731 A1 | 3/2013 | Lim et al. | |
| 2013/0150037 A1* | 6/2013 | Jha | H04W 36/0005 455/435.1 |
| 2013/0201904 A1 | 8/2013 | Toskala et al. | |
| 2014/0003282 A1 | 1/2014 | Kafle et al. | |
| 2014/0092805 A1 | 4/2014 | van de Ven et al. | |
| 2015/0089061 A1* | 3/2015 | Li | H04L 61/1511 709/226 |
| 2015/0139096 A1* | 5/2015 | Morioka | H04W 28/08 370/329 |
| 2015/0172964 A1 | 6/2015 | Huang et al. | |
| 2015/0201352 A1* | 7/2015 | Shan | H04W 52/243 370/235 |
| 2015/0305082 A1 | 10/2015 | Elliott et al. | |
| 2015/0358872 A1 | 12/2015 | Grech et al. | |

OTHER PUBLICATIONS

Internet Engineering Task Force (IETF), Request for Comments: 4862, IPv6 Stateless Address Autoconfiguration, 30 pages, Sep. 2007.
Enterprise small cell network architectures, Dec. 1, 2013, pp. 1-53, Release Two-Document 067.02.01, Small Cell Forum, UK.
3GPP TR 21.905 version 10.3.0 Release 10, Digital cellular telecommunications system (Phase 2+); Universal Mobile Telecommunications System (UMTS); LTE; Vocabulary for 3GPP Specifications, 65 pages, Mar. 2011.
3GPP TS 23.203 version 10.9.0 Release 10, Digital cellular telecommunications system (Phase 2+); Universal Mobile Telecommunications System (UMTS); LTE; Policy and charging control architecture, 134 pages, Sep. 2013.
3GPP TS 23.401 version 10.10.0 Release 10, LTE; General Packet Radio Service (GPRS) enhancements for Evolved Universal Terrestrial Radio Access Network (E-UTRAN) access, 281 pages, Apr. 2013.
3GPP TS 29.303 V10.4.0, 3rd Generation Partnership Project-;Technical Specification Group Core Network and Terminals; Domain Name System Procedures; Stage 3 (Release 10), 56 pages, Sep. 2012.
3GPP TS 33.401 version 10.5.0 Release 10, Digital cellular telecommunications system (Phase 2+); Universal Mobile Telecommunications System (UMTS); LTE; 3GPP System Architecture Evolution (SAE); Security architecture, 118 pages, Jul. 2013.
3GPP TS 36.300 version 10.11.0 Release 10, LTE; Evolved Universal Terrestrial Radio Access (E-UTRA) and Evolved Universal Terrestrial Radio Access Network (E-UTRAN); Overall description; Stage 2, 211 pages, Sep. 2013.
3GPP TS 36.401 version 10.4.0 Release 10, LTE; Evolved Universal Terrestrial Radio Access Network (E-UTRAN); Architecture description, 22 pages, Jul. 2012.
3GPP TS 36.412 version 10.1.0 Release 10, LTE; Evolved Universal Terrestrial Radio Access Network (E-UTRAN); S1 signalling transport, 10 pages, Jun. 2011.
3GPP TS 36.413 version 9.8.0 Release 9, LTE; Evolved Universal Terrestrial Radio Access Network (E-UTRAN); S1 Application Protocol (S1AP) (Release 10), 248 pages, Jan. 2012.
3GPP TS 36.413 version 10.6.0 Release 10, LTE; Evolved Universal Terrestrial Radio Access Network (E-UTRAN); S1 Application Protocol (S1AP), 262 pages, Jul. 2012.
3GPP TS 36.423 version 10.7.0 Release 10, LTE; Evolved Universal Terrestrial Radio Access Network (E-UTRAN); X2 Application Protocol (X2AP), 137 pages, Sep. 2013.
Internet Engineering Task Force (IETF), Request for Comments: 6296, IPv6-to-IPv6 Network Prefix Translation, 32 pages, Jun. 2011.
3GPP TS 23.007 version 10.7.0 Release 10, Digital cellular telecommunications system (Phase 2+); Universal Mobile Telecommunications System (UMTS); LTE; Restoration procedures, 54 pages, Apr. 2012.
3GPP TS 36.331 version 9.15.0 Release 9, LTE; Evolved Universal Terrestrial Radio Access (E-UTRA); Radio Resource Control (RRC); Protocol specification, 265 pages, Jul. 2013.
3GPP TS 36.133 version 10.16.0 Release 10, LTE;Evolved Universal Terrestrial Radio Access (E-UTRA); Requirements for support of radio resource management, 728 pages, Nov. 2014.
3GPP TS 36.213 version 10.12.0 Release 10, LTE; Evolved Universal Terrestrial Radio Access (E-UTRA); Physical layer procedures, 129 pages, Mar. 2014.
3GPP TS 36.211 version 10.7.0 Release 10, LTE; Evolved Universal Terrestrial Radio Access (E-UTRA); Physical channels and modulation, 103 pages, Apr. 2013.
3GPP TS 36.212 version 10.8.0 Release 10, LTE; Evolved Universal Terrestrial Radio Access (E-UTRA); Multiplexing and channel coding, 81 pages, Jul. 2013.
3GPP TS 36.101 version 10.16.0 Release 10, LTE; Evolved Universal Terrestrial Radio Access (E-UTRA); User Equipment (UE) radio transmission and reception, 340 pages, Nov. 2014.
"Propagation data and prediction methods for the planning of indoor radiocommunication systems and radio local area networks in the frequency range 900 MHz to 100 GHz", Recommendation ITU-R P.1238-7, Feb. 2012, pp. 1-28, International Telecommunication Union, Geneva.
Enhancing LTE Cell-Edge Performance via PDCCH ICIC, 2011, pp. 1-16, Fujitsu Network Communications Inc., Downloaded from http://www.fujitsu.com/downloads/TEL/fnc/whitepapers/Enhancing-LTE-Cell-Edge.pdf.
Perez-Vega, Garcia, "A Simple Approach to a Statistical Path Loss Model for Indoor Communications", 27th European Microwave Conference, Sep. 8-12 1997, pp. 617-623, Downloaded from personales.unican.es.
S. Dolinar et al. "Code Performance as a Function of Block Size", TMO Progress Report 42-133, May 15, 1998, pp. 1-23, Downloaded from www.inference.phy.cam.ac.uk/ear23/papers/iscta.pdf).
3GPP TS 36.422 version 10.1.0 Release 10, LTE; Evolved Universal Terrestrial Radio Access Network (E-UTRAN); X2 signalling transport, 10 pages, Jun. 2011.
3GPP TS 29.281 version 10.3.0 Release 10, Universal Mobile Telecommunications System (UMTS); LTE; General Packet Radio System (GPRS) Tunnelling Protocol User Plane (GTPv1-U), 27 pages, Oct. 2011.
Internet Engineering Task Force (IETF), Request for Comments: 5996, Internet Key Exchange Protocol Version 2 (IKEv2), 138 pages, Sep. 2010.
Internet Engineering Task Force (IETF), Request for Comments: 4193, Unique Local IPv6 Unicast Addresses, 16 pages, Oct. 2005.
Internet Engineering Task Force (IETF), Request for Comments: 1918, Address Allocation for Private Internets, 9 pages, Feb. 1996.
Internet Engineering Task Force (IETF), Request for Comments: 2131, Dynamic Host Configuration Protocol, 24 pages, Mar. 1997.
Internet Engineering Task Force (IETF), Request for Comments: 3315, Dynamic Host Configuration Protocol for IPv6 (DHCPv6), 101 pages, Jul. 2003.

* cited by examiner

DATA CENTER RELOCATION METHODS AND APPARATUS

FIELD

Various embodiments relate to communication methods and apparatus and, more particularly, to methods and apparatus facilitating data center relocation for an access point.

BACKGROUND

Users with mobile devices are demanding ever increasing amounts of data from the wireless cellular systems to which they connect. This explosive growth has fueled the need for increasing amounts of cellular infrastructure, in particular a dramatically increased density of wireless access points (APs). To attempt to meet these increasing demands, there is a trend to substantially increase the number of available low power small cell APs, e.g., small cell Home eNodeBs (HeNBs). The small cells may be, and in some embodiments are, implemented as femto cells which share frequency spectrum with macro cells where an individual macrobase station normally corresponds to a macro cell.

In the macro network a fair amount of redundancy exists allowing for control and/or other entities to take over and replace a failed node. In current small cell deployments there tends to be little or no redundancy.

If small cells are to be viewed as a viable alternative to large cells, it should be appreciated that there is a need for methods and apparatus which would support redundancy and/or maintenance of small cell systems without placing significant burdens on macro network infrastructure elements that may already exist.

Thus, as small cells are deployed in larger numbers there is a need for redundancy and/or the ability to transition a UE (User Equipment device) or other device from one data center to another even though it may continue to receive services though a particular HeNB. It would be desirable if such transitions of UEs could be implemented with relatively little signaling or communication with elements of the macro network when the transition is between one data center serving HeNBs to another data center serving HeNBs and an HeNB serving a UE remains unchanged.

Accordingly, given that an active data center may fail and/or need to be removed from active status to support maintenance, there is a need for methods and apparatus that facilitate moving of UEs being serviced by HeNBs with communications links to one data center to another data center.

SUMMARY

Various embodiments are directed to methods and apparatus for supporting efficient transitions between datacenters, e.g., changing of data centers responsible for servicing one or more small cells and UEs attached thereto. The small cells may, and in some embodiments are, femto cells.

In various embodiments, a plurality of data centers in a communications network are deployed to support a large number of HeNBs. The data centers may be implemented and managed separately from those of a macro network with which the femto cells, e.g., HeNBs, share frequency spectrum. In this way, the data centers can service the HeNBs while reducing or minimizing the amount of signaling to macro network elements as part of supporting multiple HeNBs and the UEs connected thereto. The data centers may help limit or reduce the amount of signaling to macro network entities even when large numbers of small cells, e.g., HeNBs, are deployed. The data centers can be, and in various embodiments are, used to provide communications service to UEs, including possible location tracking and other communications functions. While the UE's may also interact with macro base stations which generally service a larger service area than HeNBs and/or communicate via an HeNB with a UE (user equipment) device the use of femto base stations and data centers can reduce the load on the macro network infrastructure but still provide generally reliable communications services particularly when data center redundancy is provided in accordance with various features and embodiments.

At least some of the methods and apparatus are well suited for small cell deployments where one or more HeNBs rely on a data center to provide signaling and/or communications related services and where it may be desirable for redundancy and/or maintenance reasons to be able to transition UEs and small cells from one data center to another data center.

In various embodiments, an access point, e.g., an HeNB, establishes a primary connection, e.g., a primary transport connection, with a first HGW in a first datacenter, and establishes a secondary connection, e.g., a secondary transport connection, with a second HGW, in a second datacenter.

In some embodiments, in response to detection of a primary gateway communications failure, a path switch request via the secondary connection is used to transition from the first datacenter to the second datacenter.

In one exemplary embodiment, different DNSs (Domain Name System servers) in different datacenters map a tracking area in which an access point may be located to different IP addresses corresponding to different datacenters. In some such embodiments priority indicators are used in addition to the IP address.

In another exemplary embodiment, a management device generates and transmits dynamic DNS update messages, which are sent to DNS servers to change mapping information and redirect between data centers, e.g., in response to a detected fault condition at a datacenter or in accordance with scheduled maintenance.

An exemplary communications method, in accordance with some embodiments, includes: establishing a primary gateway connection between an access point and a primary gateway; establishing a connection for a user equipment (UE) device to said access point, said established connection being between said UE device and said access point; and transmitting a path switch request via a secondary gateway connection between said access point and a secondary gateway, to a network entity, for said UE device connected to said access point while said UE device remains connected to said access point.

An exemplary communications system, in accordance with some embodiments, includes an access point comprising: a module configured to establish a primary gateway connection between the access point and a primary gateway; a module configured to establish a connection for a user equipment (UE) device to said access point, said established connection being between said UE device and said access point; a transmitter; and a module configured to control the transmitter to transmit a path switch request via a secondary gateway connection between said access point and a secondary gateway, to a network entity, for said UE device connected to said access point while said UE device remains connected to said access point.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

i. DETAILED DESCRIPTION

Figure 1:
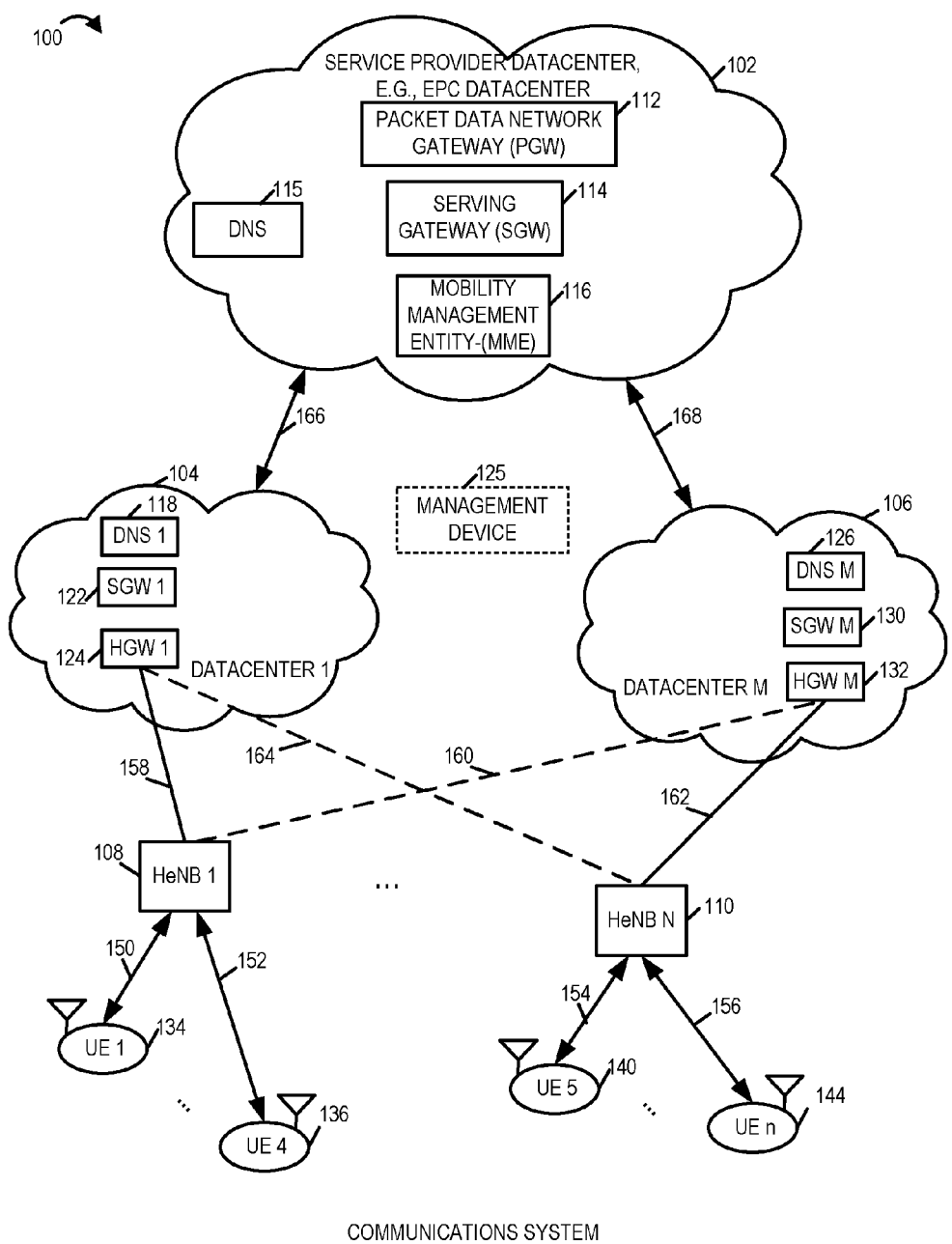
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a service provider datacenter 102, a plurality of datacenters (datacenter 1, . . . , datacenter M 106, a plurality of access points which are Home eNodeBs (HeNB 1, . . . , HeNB N 110), and a plurality of user equipment devices (UE 1 134, . . . , UE 4 136, UE 5 140, . . . , UE n 144). In some embodiments, communications system 100 further includes a management device 125.

Service provider datacenter 102, e.g., an EPC datacenter, include a packet data network gateway (PGW) 112, a serving gateway (SGW) 114, a mobility management entity (MME) 116, and domain name server (DNS) 115. Datacenter 1 104 includes DNS 1 118, SGW 1 122, and HGW 1 124. Datacenter M 106 includes DNS M 128, SGW M 130, and HGW M 132. Service provider datacenter 102 is coupled to datacenter 1 104, as indicated by bi-directional arrow 166. Service provider datacenter 102 is coupled to datacenter M 106, as indicated by bi-directional arrow 168. In one example M=2.

A plurality of UE devices (UE 1 134, . . . , UE 4 136) are coupled to HeNB 1 108, as indicated by bi-directional arrows (150, 152), respectively. A plurality of UE devices (UE 5 140, . . . , UE n 144) are coupled to HeNB N 110, as indicated by bi-directional arrows (154, 156), respectively.

Each HeNB may, and sometimes does, establish connections with multiple HGWs corresponding to different datacenters. HeNB 1 108 is shown having an established primary connection 158, e.g., a primary transport connection, with HGW1 124, and HeNB 1 108 is shown having an established secondary connection 160, e.g., a secondary transport connection, with HGW M 132. HeNB N 110 is shown having an established primary connection 162, e.g., a primary transport connection, with HGW M 132, and HeNB N 110 is shown having an established secondary connection 164, e.g., a secondary transport connection, with HGW 1 124.

In some embodiments, HeNB 1 108 is located in a first tracking area and HeNB N 110 is located in a second tracking area. In some such embodiments, datacenter 1 104 serves as the primary datacenter for HeNB 1 108; datacenter M 106 serves as the secondary or back-up datacenter of HeNB 1 108; datacenter M 106 serves as the primary datacenter for HeNB N 110; datacenter 1 104 serves as the secondary or back-up datacenter of HeNB N 110. In various embodiments, switching between data centers is performed in response to a detected failure or in response to scheduled maintenance. The detected failure may be detected by an HeNB, e.g., HeNB 1 108, or by the management device 125. In some embodiments, a user device, e.g., UE 1 134 in unaware that its HeNB, e.g., HeNB 1 108 has switched between datacenters.

Management device 125 monitors the datacenter operations for failures, monitors communications for failures, e.g., communications between datacenters and access points, for failures. In various embodiments, management device 125 generates and sends dynamic DNS update messages, e.g., to facilitate switching between datacenters.

Figure 2:
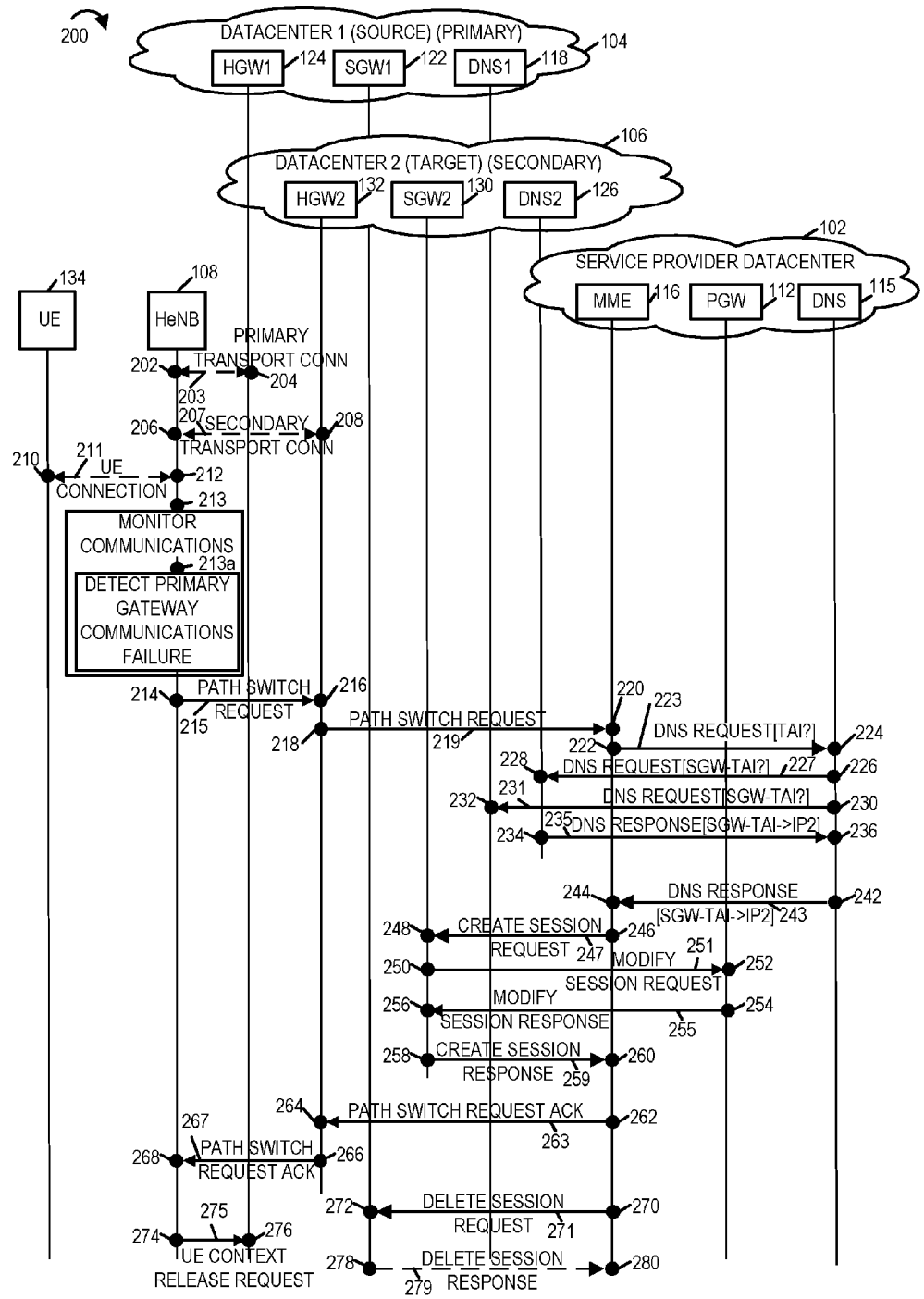
FIG. 2 includes a drawing which illustrates exemplary signaling and exemplary steps in accordance with an exemplary embodiment in which an access point detects a primary gateway communications failure.

FIG. 2 is a drawing illustrating an exemplary communications method in accordance with an exemplary embodiment. Drawing 200 includes an exemplary user equipment (UE) device 134, an exemplary access point, HeNB 108, an exemplary first datacenter, datacenter 1 104, an exemplary second datacenter, datacenter 2 106, and exemplary service provider datacenter 102, Datacenter 1 104 includes a home gateway, HGW 1 124, a serving gateway, SGW 1 122, and a domain name server, DNS 1 118. Datacenter 2 106 includes a home gateway, HGW 2 132, a serving gateway, SGW 2 130, and a domain name server, DNS 2 126. Service provider datacenter 102 includes a mobility management entity (MME) 116. A packet data network gateway (PGW) 112, and a domain name server, DNS 115.

In step 202 and step 204, HeNB 108 and HGW1 124, communicate signals to establish a primary gateway connection for HeNB 108, which is primary transport connection 203. In step 206 and step 208, HeNB 108 and HGW2 132, communicate signals to establish a secondary gateway connection for HeNB 108, which is secondary transport connection 207. In step 210 and step 212, UE 134 and HeNB 108 communicate signals to establish UE connection 211.

In step 213 HeNB 108 monitors communications, and in step 213a HeNB 108 detects a primary gateway communications failure.

In step 214, in response to the detected primary gateway communications failure, HeNB 108 generates and transmits a path switch request 215 which is received by HGW 2 132 in step 216. In step 218, HGW 2 132 generates and transmits path switch request 219, which is a forwarded version of path switch request 215. In step 220 MME 116 receives path switch request 219.

In step 222, MME 116 generates and transmits a DNS request to resolve the SGW information of the Tracking Area Identifier [TAI?] 223 to DNS 115, which is received in step 224 by DNS 115 of service provider datacenter 102. In step 226, DNS 115 generates and transmits DNS request to resolve the SGW information of the Tracking Area Identifier [SGW-TAI?] 227 to DNS 2 126, which is received in step 228 by DNS 2 126. In step 230, DNS 115 generates and transmits a DNS request to resolve the SGW information of the Tracking Area Identifier [SGW-TAI?] 231 to DNS 1 118, which is received in step 232 by DNS 1 118. In some embodiments, DNS request 227 and DNS request 231 communicate the same message via a broadcast message intended for a plurality of DNS servers, which may be located a plurality of datacenters.

In this example, the IP address corresponding to an SGW in the first data center is IP1 and the IP address corresponding to an SGW in the second data center is IP2.

In step 234, DNS 2 126 generates and transmits a DNS response resolving the SGW information of the Tracking Area Identifier into an IP address IP2 [SGW-TAI→IP2] 235 to DNS 115, which is received in step 236. In this example, DNS 1 118, will not respond in the event of a primary data center failure, which is the situation. However, if there was no primary data center failure then DNS 1 118 would have generated and transmitted a DNS response resolving the SGW information of the Tracking Area Identifier into an IP address IP1 [SGW-TAI→IP1]. DNS response 235 includes a priority indicator indicating that the response has a lower priority than a response which may be provided by the primary DNS server.

In this example, the secondary DNS, DNS 2 126, is responding but the secondary DNS, DNS 2 126, has lower priority than the primary DNS, DNS 1 118. However, the primary data center has failed so the secondary DNS will be the only responder and will prevail.

In step 242, DNS 115 generates and transmits DNS response 243 to MME 116, communicating IP2 which is received in step 244. In step 246, MME 116 generates and transmits create session request 247 to SGW 2 130, which is received in step 248. In step 250 SGW 130 generates and transmits modify session request 251 to PGW 112, which is received in step 252. In step 254, PGW 112 generates and transmits modify session response 255 to SGW 2 130, which is received in step 256. In step 258 SGW 2 130 generates and transmits create session response 259 to MME 116, which is received in step 260. In step 262, MME 116 generates and transmits path switch request acknowledgments 263 to HGW 2 132, which is received in step 264. In step 266, HGW 2 132 generates and transmits path switch request acknowledgment 267 to HeNB 108, which is received in step 268. In step 274, HeNB 108 generates and transmits UE context release request 275 to HGW 1 124, which may be, and sometimes is, received in step 276. In some embodiments, UE context release request 275 is sent in response to receiving path switch request acknowledgment. In some other embodiments, UE context release request 275 is sent in response to detection of primary gateway communications failure, e.g., at a time subsequent to the detected failure. In some embodiments, UE context release request 275 is sent following transmission of the path switch request 216.

In step 270 MME 116 generates and transmits delete session request 271, which may be, and sometimes is, received by SGW 1 112 in step 272.

Assuming SGW 1 112 receives message 271, in step 278, SGW 1 122 generates and transmits delete session response 279 to MME 116 which is received in step 280, by MME 116.

Figure 3:
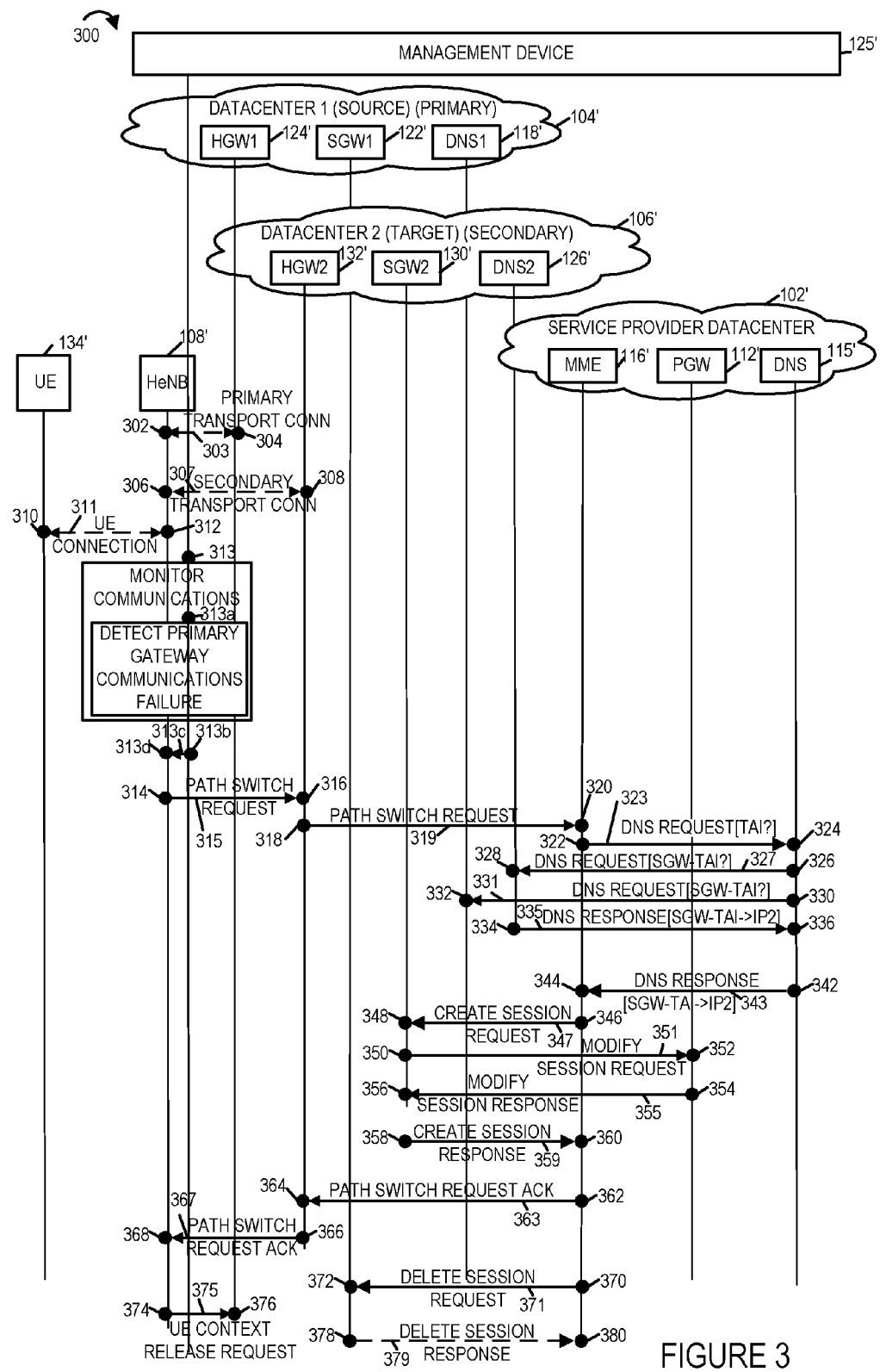
FIG. 3 includes a drawing which illustrates exemplary signaling and exemplary steps in accordance with an exemplary embodiment in which a management device detects a primary gateway communications failure.

FIG. 3 is a drawing illustrating an exemplary communications method in accordance with an exemplary embodiment. Drawing 300 includes an exemplary user equipment (UE) device 134', an exemplary access point, HeNB 108', an exemplary first datacenter, datacenter 1 104', an exemplary second datacenter, datacenter 2 106', and exemplary service provider datacenter 102', and an exemplary management device 125'. Datacenter 1 104' includes a home gateway, HGW 1 124', a serving gateway, SGW 1 122', and a domain name server, DNS 1 118'. Datacenter 2 106' includes a home gateway, HGW 2 132', a serving gateway, SGW 2 130', and a domain name server, DNS 2 126'. Service provider datacenter 102' includes a mobility management entity (MME) 116'. A packet data network gateway (PGW) 112', and a domain name server, DNS 115'. The various elements (134', 108', 104' 106' 102', 124', 122', 118', 132', 130', 126', 112', 116', 115', 125') shown in FIG. 3 may be the same or similar to elements (134, 108, 104, 106, 102, 124, 122, 118, 132, 130, 126, 112, 116, 115, 125), respectively, shown in system 100 of FIG. 1.

In step 302 and step 304, HeNB 108' and HGW1 124', communicate signals to establish a primary gateway connection for HeNB 108', which is primary transport connection 303. In step 306 and step 308, HeNB 108' and HGW2 132', communicate signals to establish a secondary gateway connection for HeNB 108', which is secondary transport connection 307. In step 310 and step 312, UE 134' and HeNB 108' communicate signals to establish UE connection 311.

In step 313 management device 125' monitors communications, and in step 313a management device 125' detects a primary gateway communications failure.

In step 313b, management device 125' generates and sends failure notification message 313c to HeNB 108', which notifies the HeNB 108' of the detected primary gateway communications failure. In step 313d, HeNB 108' receives failure notification message 313c.

In step 314, in response to the detected primary gateway communications failure, HeNB 108' generates and transmits a path switch request 315 which is received by HGW 2 132' in step 316. In step 318, HGW 2 132' generates and transmits path switch request 319, which is a forwarded version of path switch request 315. In step 320 MME 116' receives path switch request 319.

In step 322, MME 116' generates and transmits a DNS request to resolve the SGW information of the Tracking Area Identifier [TAI?] 323 to DNS 115', which is received in step 324 by DNS 115' of service provider datacenter 102'. In step 326, DNS 115' generates and transmits a DNS request to resolve the SGW information of the Tracking Area Identifier [SGW-TAI?] 327 to DNS 2 126', which is received in step 328 by DNS 2 126'. In step 330, DNS 115' generates and transmits a DNS request to resolve the SGW information of the Tracking Area Identifier [SGW-TAI?] 331 to DNS 1 118', which may be and sometimes is received in step 332 by DNS 1 118'. In some embodiments, DNS request 327 and DNS request 331 communicate the same message via a broadcast message intended for a plurality of DNS servers, which may be located a plurality of datacenters.

In this example, the IP address corresponding to an SGW in the first data center is IP1 and the IP address corresponding to an SGW in the second data center is IP2.

In step 334, DNS 2 126' generates and transmits a DNS response resolving the SGW information of the Tracking Area Identifier into an IP address IP2 [SGW-TAI→IP2] 335 to DNS 115', which is received in step 336. In this example, DNS 1 118', will not respond in the event of a primary data center failure, which is the situation. However, if there was no primary data center failure then DNS 1 118' would have generated and transmitted a DNS response resolving the SGW information of the Tracking Area Identifier into an IP address IP1 [SGW-TAI→IP1]. DNS response 335 includes a priority indicator indicating that the response has a lower priority than a response which may be provided by the primary DNS server.

In this example, the secondary DNS, DNS 2 126', is responding but the secondary DNS, DNS 2 126', has lower priority than the primary DNS, DNS 1 118'. However, the primary data center has failed so the secondary DNS will be the only responder and will prevail.

In step 342, DNS 115' generates and transmits DNS response 343 to MME 116', communicating IP2 which is received in step 344. In step 346, MME 116' generates and transmits create session request 347 to SGW 2 130', which is received in step 348. In step 350 SGW 130' generates and transmits modify session request 351 to PGW 112', which is received in step 352. In step 354, PGW 112' generates and transmits modify session response 355 to SGW 2 130', which is received in step 356. In step 358 SGW 2 130' generates and transmits create session response 359 to MME 116', which is received in step 360. In step 362, MME 116' generates and transmits path switch request acknowledgments 363 to HGW 2 132', which is received in step 364. In step 366, HGW 2 132' generates and transmits path switch request acknowledgment 367 to HeNB 108', which is received in step 368. In step 374, HeNB 108' generates and transmits UE context release request 375 to HGW 1 124', which may be, and sometimes is, received in step 376. In some embodiments, UE context release request 375 is sent in response to receiving path switch request acknowledgment. In some other embodiments, UE context release request 375 is sent in response to detection of primary gateway communications failure, e.g., at a time subsequent to the detected failure. In some embodiments, UE context release request 375 is sent following transmission of the path switch request 316.

In step 370 MME 116' generates and transmits delete session request 371, which may be, and sometimes is, received by SGW 1 112' in step 372.

Assuming SGW 1 112' receives message 371, in step 378, SGW 1 122' generates and transmits delete session response 379 to MME 116 which is received in step 380, by MME 116'.

Figure 4:
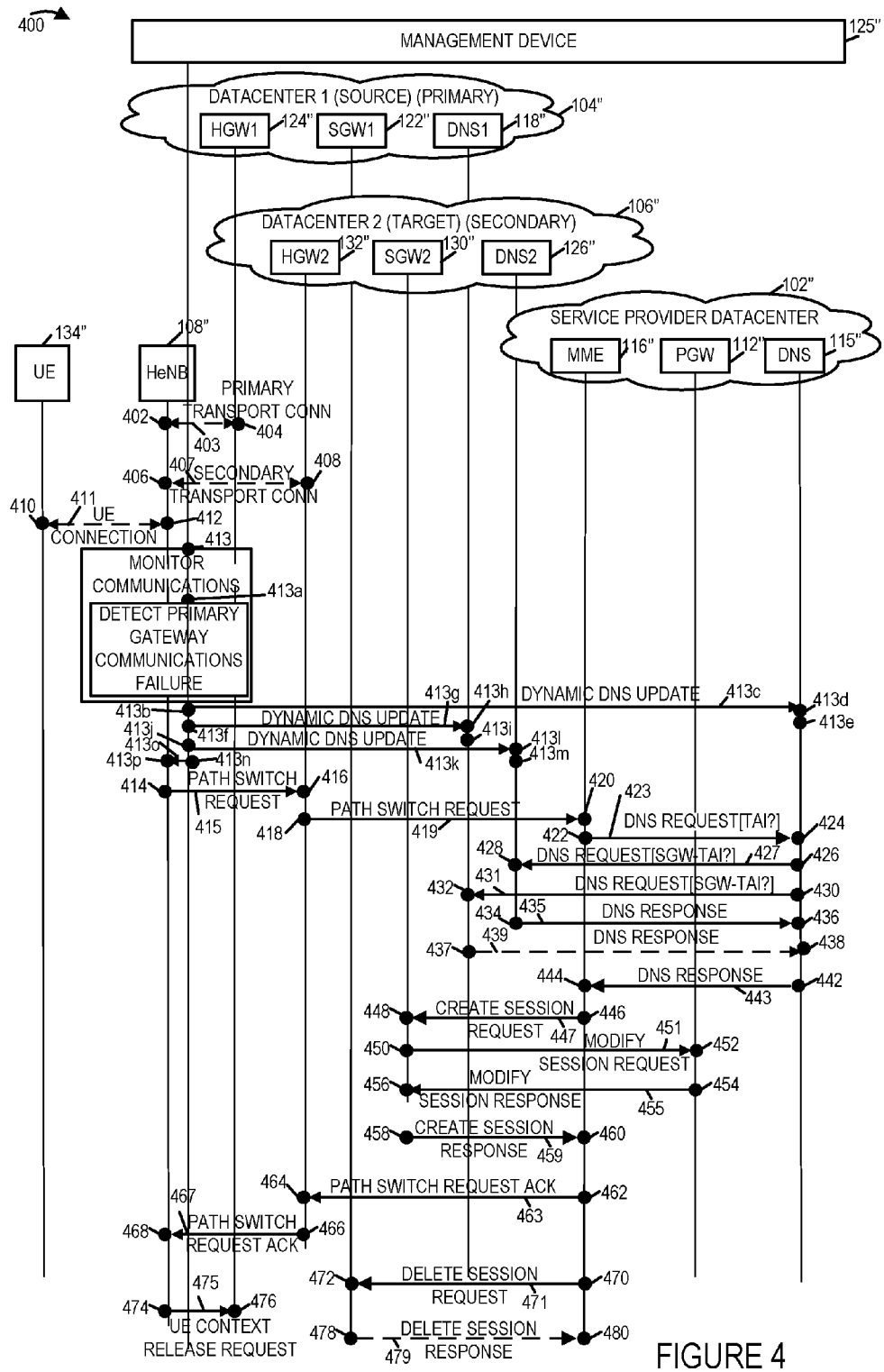
FIG. 4 includes a drawing which illustrates exemplary signaling and exemplary steps in accordance with an exemplary embodiment in which a management device generates and transmits a dynamic Domain Name Server (DNS) update message in response to a detected primary gateway communication failure.

FIG. 4 is a drawing illustrating an exemplary communications method in accordance with an exemplary embodiment. Drawing 400 includes an exemplary user equipment (UE) device 134", an exemplary access point, HeNB 108", an exemplary first datacenter, datacenter 1 104", an exemplary second datacenter, datacenter 2 106", and exemplary service provider datacenter 102", and an exemplary management device 125". Datacenter 1 104" includes a home gateway, HGW 1 124", a serving gateway, SGW 1 122", and a domain name server, DNS 1 118". Datacenter 2 106' includes a home gateway, HGW 2 132", a serving gateway, SGW 2 130", and a domain name server, DNS 2 126". Service provider datacenter 102" includes a mobility management entity (MME) 116". A packet data network gateway (PGW) 112", and a domain name server, DNS 115". The various elements (134", 108", 104" 106" 102", 124", 122", 118", 132", 130", 126", 112", 116", 115", 125") shown in FIG. 3 may be the same or similar to elements (134, 108, 104, 106, 102, 124, 122, 118, 132, 130, 126, 112, 116, 115, 125), respectively, shown in system 100 of FIG. 1.

In step 402 and step 404, HeNB 108" and HGW1 124", communicate signals to establish a primary gateway connection for HeNB 108'4, which is primary transport connection 403. In step 406 and step 408, HeNB 108" and HGW2 132", communicate signals to establish a secondary gateway connection for HeNB 108", which is secondary transport connection 407. In step 410 and step 412, UE 134" and HeNB 108" communicate signals to establish UE connection 411.

In step 413 management device 125" monitors communications, and in step 413*a* management device 125" detects a primary gateway communications failure.

In step 413*b*, management device 125" generates and transmits dynamic DNS update message 413*c* to DNS 115", which is received in step 413*d* by DNS 115". In step 413*e*, DNS 115" updates stored information based on the received information on message 413*c*.

In step 413*f*, management device 125" generates and transmits dynamic DNS update message 413*g* to DNS 1 118", which is received in step 413*h* by DNS 1 118". In step 413*i*, DNS 1 118" updates stored information based on the received information on message 413*g*.

In step 413*j*, management device 125" generates and transmits dynamic DNS update message 413*k* to DNS 2 126", which is received in step 4131 by DNS 2 126". In step 413*m*, DNS 2 126" updates stored information based on the received information on message 413*k*.

In some embodiments, not all three dynamic DNS updates may be required at the same time. The dynamic DNS updates are mostly complementary to each other. In a first alternative, when the management device 125" has the ability to send dynamic DNS updates directly to the DNS 115" in the service provider database 102", a single dynamic DNS update 413*c* is enough to update the serving GW (SGW) for the tracking area of the HeNB 108" to point to an SGW2 130" in the second datacenter 106", instead of a SGW1 122" in the first datacenter 104". The pointing may be in the form of updating the name of the SGW responsible for the tracking area (from fully qualified name FQDN_SGW1 to FQDN_SGW2), while the resolution of said FQDN into an IP address of the respective SGW can be carried on any authoritative server in the DNS infrastructure, including but not limited to, in the service provider datacenter 102", or in the primary datacenter 104" or secondary datacenter 106".

In some embodiments, dynamic DNS update messages 413*c*, 413*g* and 413*k* are the same message, e.g., communicated as a broadcast message to a plurality of DNS servers including DNS 115", DNS 1 118" and DNS 2 126".

In various embodiments, the dynamic DNS update message communicates a dynamic DNS update for the serving gateway (SGW) information of a tracking area identifier corresponding to a location of access point HeNB 108", the dynamic DNS update including updating the serving gateway (SGW) information for said tracking area identifier to ultimately resolve into an IP address of a secondary SGW SGW2 130" corresponding to a second data center, data center 2 106", which is different from the first data center, data center 1 104". For example, in one embodiment, the IP address corresponding to an SGW in the first data center is IP1 and the IP address corresponding to an SGW in the second data center is IP2, and the dynamic DNS update message is used to move HeNB 108" from data center 1 104" to data center 2 106" by changing the IP address for the SGW in charge of the tracking area of HeNB 108" from IP1 to IP2. In another exemplary embodiment, the domain name corresponding to an SGW in the first data center is DomainName1 and the domain name corresponding to an SGW in the second data center is DomainName2, and the dynamic DNS update message is used to move HeNB 108" from data center 1 104" to datacenter 2 106" by changing the domain name for the SGW in charge of the tracking area of HeNB 108" from DomainName1 to DomainName2.

In some embodiments, the dynamic DNS update messages are used to change priorities associated with the DNS servers. For example, dynamic DNS update message 413*g* changes the priority associated with data center 1 104" from medium priority to low priority, and DNS update message 413*k* changes the priority associated with data center 2 106" from low priority to high priority.

In some embodiments, the dynamic DNS update messages are used to change an IP address or domain name corresponding to a failed data center to an IP address or domain name corresponding to an operational data center. For example, dynamic DNS update message 413*g* communicates an IP address or domain name corresponding to datacenter 2 106", which is to replace the IP address or domain name corresponding to failed data center 1 104".

In some embodiments, dynamic DNS message 413*c* is sent to DNS 115", and DNS 115" communicates information included message 413*c* to one or more of DNS 1 118" and DNS 2 126".

In step 413*n*, management device 125" generates and sends failure notification message 413*o* to HeNB 108", which notifies the HeNB 108" of the detected primary gateway communications failure. In step 413*p*, HeNB 108" receives failure notification message 413*o*.

In step 414, in response to the detected primary gateway communications failure, HeNB 108" generates and transmits a path switch request 415 which is received by HGW 2 132" in step 416. In step 418, HGW 2 132" generates and transmits path switch request 419, which is a forwarded version of path switch request 415. In step 420 MME 116" receives path switch request 419.

In step 422, MME 116" generates and transmits a DNS request to resolve the SGW information of the Tracking Area Identifier [TAI?] 423 to DNS 115", which is received in step 424 by DNS 115" of service provider datacenter 102". In step 426, DNS 115" generates and transmits a DNS request to resolve the SGW information of the Tracking Area Identifier [SGW-TAI?] 427 to DNS 2 126", which is received in step 428 by DNS 2 126". In step 430, DNS 115" generates and transmits a DNS request to resolve the SGW information of the Tracking Area Identifier [SGW-TAI?] 431 to DNS 1 118", which may be and sometimes is received in step 432 by DNS 1 118". In some embodiments, DNS request 427 and DNS request 431 communicate the same message via a broadcast message intended for a plurality of DNS servers, which may be located a plurality of datacenters.

In step 434, DNS 2 126" generates and transmits a DNS response resolving the SGW information of the Tracking Area Identifier into an IP address IP2 [SGW-TAI→IP2] 435 to DNS 115", which is received in step 436. In this example, DNS 1 118", will not respond in the event of a primary data center failure, which is the situation. However, if there was no primary data center failure then DNS 1 118" would have generated and transmitted a DNS response resolving the SGW information of the Tracking Area Identifier into an IP address IP1 [SGW-TAI→IP1]. DNS response 435 includes a priority indicator indicating that the response has a lower priority than a response which may be provided by the primary DNS server.

In this example, the secondary DNS, DNS 2 126", is responding but the secondary DNS, DNS 2 126", has lower priority than the primary DNS, DNS 1 118". However, the primary data center has failed so the secondary DNS will be the only responder and will prevail.

In step 442, DNS 115" generates and transmits DNS response 443 to MME 116", communicating IP2 which is received in step 444. In step 446, MME 116" generates and transmits create session request 447 to SGW 2 130", which is received in step 448. In step 450 SGW 130" generates and transmits modify session request 451 to PGW 112", which is received in step 452. In step 454, PGW 112" generates and transmits modify session response 455 to SGW 2 130", which is received in step 456. In step 458 SGW 2 130" generates and transmits create session response 459 to MME 116", which is received in step 460. In step 462, MME 116" generates and transmits path switch request acknowledgments 463 to HGW 2 132", which is received in step 464. In step 466, HGW 2 132" generates and transmits path switch request acknowledgment 467 to HeNB 108", which is received in step 468. In step 474, HeNB 108" generates and transmits UE context release request 475 to HGW 1 124", which may be, and sometimes is, received in step 476. In some embodiments, UE context release request 475 is sent in response to receiving path switch request acknowledgment. In some other embodiments, UE context release request 475 is sent in response to detection of primary gateway communications failure, e.g., at a time subsequent to the detected failure. In some embodiments, UE context release request 475 is sent following transmission of the path switch request 416.

In step 470 MME 116" generates and transmits delete session request 471, which may be, and sometimes is, received by SGW 1 112" in step 472.

Assuming SGW 1 112" receives message 471, in step 478, SGW 1 122" generates and transmits delete session response 479 to MME 116" which is received in step 480, by MME 116".

Figure 5:
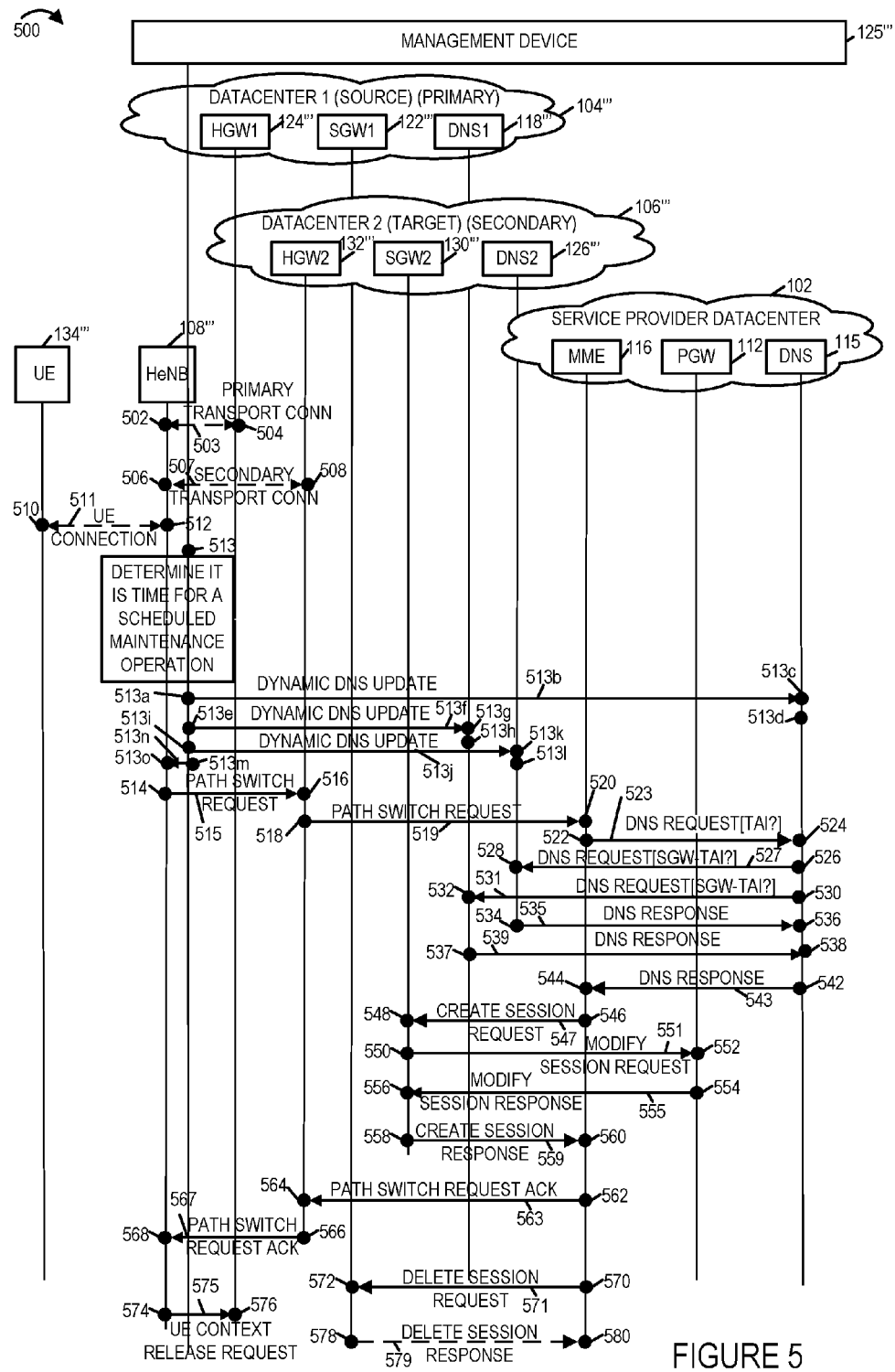
FIG. 5 includes a drawing which illustrates exemplary signaling and exemplary steps in accordance with an exemplary embodiment in which a management device generates and transmits a dynamic DNS update message in response to scheduled maintenance.

FIG. 5 is a drawing 500 illustrating an exemplary communications method in accordance with an exemplary embodiment. Drawing 500 includes an exemplary user equipment (UE) device 134''', an exemplary access point, HeNB 108''', an exemplary first datacenter, datacenter 1 104''', an exemplary second datacenter, datacenter 2 106''', and exemplary service provider datacenter 102''', and an exemplary management device 125'''. Datacenter 1 104''' includes a home gateway, HGW 1 124''', a serving gateway, SGW 1 122''', and a domain name server, DNS 1 118'''. Datacenter 2 106''' includes a home gateway, HGW 1 132''', a serving gateway, SGW 2 130''', and a domain name server, DNS 2 126'''. Service provider datacenter 102''' includes a mobility management entity (MME) 116''', a packet data network gateway (PGW) 112''', and a domain name server, DNS 115'''. The various elements (134''', 108''', 104''' 106''' 102''', 124''', 122''', 118''', 132''', 130''', 126''', 112''', 116''', 115''', 125''') shown in FIG. 3 may be the same or similar to elements (134, 108, 104, 106, 102, 124, 122, 118, 132, 130, 126, 112, 116, 115, 125), respectively, shown in system 100 of FIG. 1.

In step 502 and step 504, HeNB 108''' and HGW1 124''', communicate signals to establish a primary gateway connection for HeNB 108''', which is primary transport connection 503. In step 506 and step 508, HeNB 108''' and HGW2 132''', communicate signals to establish a secondary gateway connection for HeNB 108''', which is secondary transport connection 507. In step 510 and step 512, UE 134''' and HeNB 108''' communicate signals to establish UE connection 511.

In step 513 management device 125''' determines it is time for a scheduled maintenance operation. For example, at this time it is desirable that data center 1 104''' be taken off line so that various maintenance operation can be performed.

In step 513a, management device 125''' generates and transmits dynamic DNS update message 513b to DNS 115''', which is received in step 513c by DNS 115'''. In step 513d, DNS 115''' updates stored information based on the received information on message 513b.

In step 513e, management device 125''' generates and transmits dynamic DNS update message 513f to DNS 1 118''', which is received in step 513g by DNS 1 118'''. In step 513h, DNS 1 118" updates stored information based on the received information on message 513f.

In step 513i, management device 125''' generates and transmits dynamic DNS update message 513j to DNS 2 126''', which is received in step 513k by DNS 2 126'''. In step S131, DNS 2 126''' updates stored information based on the received information on message 413j.

In some embodiments, dynamic DNS update messages 513b, 513f and 513j are the same message, e.g., communicated as a broadcast message to a plurality of DNS servers including DNS 115''', DNS 1 118''' and DNS 2 126'''.

In various embodiments, the dynamic DNS update message communicates a dynamic DNS update for the serving gateway (SGW) information of a tracking area identifier corresponding to a location of access point HeNB 108''', the dynamic DNS update including updating the serving gateway (SGW) information for said tracking area identifier to ultimately resolve into an IP address of a secondary SGW SGW2 130''' an IP address corresponding to a second data center, data center 2 106''', which is different from the first data center, data center 1 104'''. For example, in one embodiment, the IP address corresponding to an SGW in the first data center is IP1 and the IP address corresponding to an SGW in the second data center is IP2, and the dynamic DNS update message is used to move HeNB 108''' from data center 1 104''' to data center 2 106''' by changing the IP address for the SGW in charge of the tracking area of HeNB 108''' from IP1 to IP2. In another exemplary embodiment, the domain name of corresponding to an SGW in the first data center is DomainName1 and the domain name corresponding to an SGW in the second data center is DomainName2, and the dynamic DNS update message is used to move HeNB 108''' from data center 1 104''' to datacenter 2 106''' by changing the domain name for the SGW in charge of the tracking area of HeNB 108" from DomainName1 to DomainName2.

In some embodiments, the dynamic DNS update messages are used to change priorities associated with the DNS servers. For example, dynamic DNS update message 513f changes the priority associated with data center 1 104''' from medium priority to low priority, and DNS update message 513j changes the priority associated with data center 2 106''' from low priority to high priority.

In some embodiments, the dynamic DNS update messages are used to change an IP address or domain name corresponding to a data center being intentionally taken off line, e.g., for maintenance to an IP address or domain name corresponding to an operational data center. For example, dynamic DNS update message 513*f* communicates and IP address or domain name corresponding to datacenter 2 106''', which is to replace the IP address corresponding to data center 1 104''', which is being taken off line for maintenance.

In some embodiments, dynamic DNS message 513*b* is sent to DNS 115''', and DNS 115''' communicates information included message 513*b* to one of more of DNS 1 118''' and DNS 2 126'''.

In step 513*m*, management device 125''' generates and sends notification message 513*n* to HeNB 108''', which notifies the HeNB 108''' that data center 1 104'' is going to be taken off line, e.g., for maintenance. In step 513*o*, HeNB 108''' receives notification message 513*n*.

In step 514, e.g., in response to the notification message or in response to a detected off line condition of datacenter 1 104''', HeNB 108''' generates and transmits a path switch request 515 which is received by HGW 2 132''' in step 516. In step 518, HGW 2 132''' generates and transmits path switch request 519, which is a forwarded version of path switch request 515. In step 520 MME 116''' receives path switch request 519.

In step 522, MME 116''' generates and transmits a DNS request to resolve the SGW information of the Tracking Area Identifier [TAI?] 523 to DNS 115''', which is received in step 524 by DNS 115''' of service provider datacenter 102'''. In step 526, DNS 115''' generates and transmits a DNS request to resolve the SGW information of the Tracking Area Identifier [SGW-TAI?] 527 to DNS 2 126''', which is received in step 528 by DNS 2 126'''. In step 530, DNS 115''' generates and transmits a DNS request to resolve the SGW information of the Tracking Area Identifier [SGW-TAI?] 531 to DNS 1 118''', which is received in step 432 by DNS 1 118''. In some embodiments, DNS request 527 and DNS request 531 communicate the same message via a broadcast message intended for a plurality of DNS servers, which may be located a plurality of datacenters.

In step 534, DNS 2 126''' generates and transmits a DNS response 535 to DNS 115''', which is received in step 536. In step 537, DNS 1 118''' generates and transmits DNS response 539 to DNS 115''', which is received in step 538.

In one embodiment, both DNS response messages (535, 539) communicate IP2, which is the IP address corresponding to data center 2 106'''.

In another embodiment, message 535 communicates IP1, which is the IP address corresponding to data center 2, and further communicates an indication of high priority; message 537 communicates IP, which is the IP address corresponding to data center 1, and further communicates an indication of low priority.

In step 542, DNS 115''' generates and transmits DNS response 543 to MME 116''', which is received in step 544. In some embodiments, information included in message 543 includes information aggregated from received message 539 and message 539.

In step 546, MME 116''' generates and transmits create session request 547 to SGW 2 130''', which is received in step 548. In step 550 SGW 130''' generates and transmits modify session request 551 to PGW 112''', which is received in step 452. In step 554, PGW 112''' generates and transmits modify session response 555 to SGW 2 130''', which is received in step 556. In step 558 SGW 2 130''' generates and transmits create session response 559 to MME 116''', which is received in step 560. In step 562, MME 116''' generates and transmits path switch request acknowledgments 563 to HGW 2 132''', which is received in step 564. In step 566, HGW 2 132''' generates and transmits path switch request acknowledgment 567 to HeNB 108''', which is received in step 568. In step 574, HeNB 108''' generates and transmits UE context release request 575 to HGW 1 124''', which may be, and sometimes is, received in step 576. UE context release request 575 is sent in response to receiving path switch request acknowledgment.

In step 570 MME 116''' generates and transmits delete session request 571, which is, received by SGW 1 112''' in step 572.

In step 578, SGW 1 122''' generates and transmits delete session response 579 to MME 116''' which is received in step 580, by MME 116'''.

Figure 6:
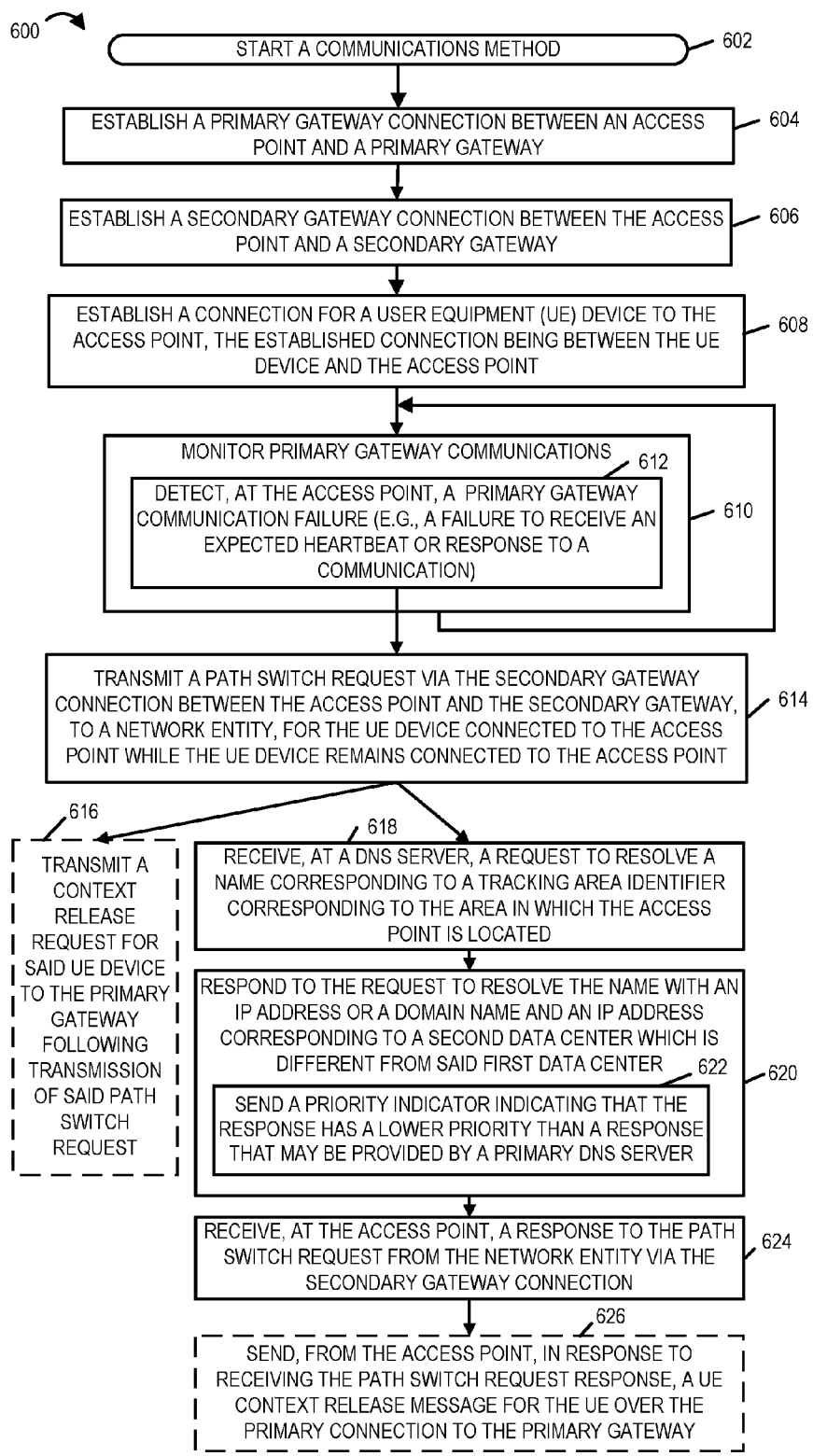
FIG. 6 is a flowchart of an exemplary communications method in accordance with an exemplary embodiment in which an access point detects a primary gateway communications failure.

FIG. 6 is a flowchart 600 of an exemplary communications method in accordance with various embodiments. Operation of the exemplary method starts in step 602 and proceeds to step 604. In step 604, a primary gateway connection between an access point, e.g., HeNB 108, and a primary gateway, e.g., HGW 1 124, is established. In some embodiments, the primary gateway connection is, e.g., a transport layer connection. In some such embodiments, logical connections are then created for each UE as needed. Operation proceeds from step 604 to step 606. In step 606, a secondary gateway connection between the access point and a secondary gateway, e.g., HGW 2 132, is established. In some embodiments, the secondary gateway connection is, e.g., a transport layer connection. Operation proceeds from step 606 to step 608. In step 608, a connection is established for a user equipment (UE) device, e.g., UE 134, to the access point, the established connection being between the UE device and the access point. In some embodiments, establishing a connection for a UE device to an access point, will trigger establishment of a logical connection for the UE device over the primary transport layer connection. Operation proceeds from step 608 to step 610.

In step 610, primary gateway communications are monitored, e.g., by the access point. Step 610 may, and sometimes does, include step 612, in which a primary gateway communications failure is detected at the access point. The detected primary gateway communications failure is, e.g., a failure to receive an expected heartbeat or response to a communication. Operation proceeds from step 612 to step 614.

In step 614 the access point transmits a path switch request via the secondary gateway connection, e.g., a transport layer connection, between the access point and the secondary gateway, to a network entity, e.g., to a mobility management entity (MME), e.g., MME 116, via the secondary connection and secondary gateway, for the UE device connected to access point while the UE device remains connected to the access point. In some embodiments, the path switch request will update the control signaling path and the data signaling path for the UE to the secondary connection thereby moving the control signaling path and the data signaling path from a first data center to a second data center. In various embodiments, the UE device is unaffected by this operation, and this activity is transparent to the UE.

In some embodiments, the access point, e.g., HeNB 108, is an LTE HeNB. In various embodiments, the path switch request is a request to update data and signaling paths corresponding to the UE device. In some embodiments, the path switch request is an LTE S1AP Path Switch Request. In various embodiments, the UE is connected to one cell of said access point prior to and subsequent to the path switch request.

The path switch request is sent via the secondary gateway, e.g., HGW 2 132, in response to detecting the primary gateway communications failure.

Operation proceeds from step 614 to one or both of steps 616 and 618.

In optional step 616 the access point transmits a context release request for said UE device to the primary gateway following transmission of said path switch request. In various embodiments, this will clean up context at the first data center, assuming the primary gateway is still reachable.

Primary gateway, e.g., HGW 1 124, is located at a first data center, e.g., datacenter 1 104. In step 618 a DNS server, e.g., DNS 2 126, receives a request to resolve a name corresponding to a tracking area identifier corresponding to the area in which the access point is located. In various embodiments, the DNS server, e.g., DNS 2 126, is located at a second data center, e.g., datacenter 2 106, which is a non-failed data center. Operation proceeds from step 618 to step 620. In step 620 the DNS server responds to the request to resolve the name with an IP address or a domain name and an IP address corresponding to a second data center which is different from the first data center. For example, DNS 2 126 returns IP2 corresponding to the second data center, while DNS 1 118 would have returned IP1 corresponding to the first data center, if there was not a first data center failure. Step 620 includes step 622, in which the DNS server sends a priority indicator indicating that the response has a lower priority than a response that may be provide by a primary DNS server, e.g., DNS 1 118. The secondary DNS server is responding but has lower priority than the primary DNS server; but the primary data center and/or primary DNS server has failed; therefore, the secondary DNS server will be the only responder and will prevail.

Operation proceeds from step 620 to step 624, in which the access point receives a response to the path switch request from the network security entity, e.g., MME, via the secondary gateway connection.

In some embodiments, operation proceeds from step 624 to optional step 626, in which the access point sends, in response to receiving the path switch request response, a UE context release message for the UE over the primary connection to the primary gateway. In various embodiments, this will clean up context at the first data center, assuming the primary gateway is still reachable.

In various embodiments, the primary DNS server, e.g., DNS 1 118, is located at the first data center, e.g., data center 1 104. In some embodiments, the first and second data centers (104, 106) correspond to different sets of physical equipment. In some such embodiments, the first and second data centers (104, 106) are located in different buildings.

Figure 7:
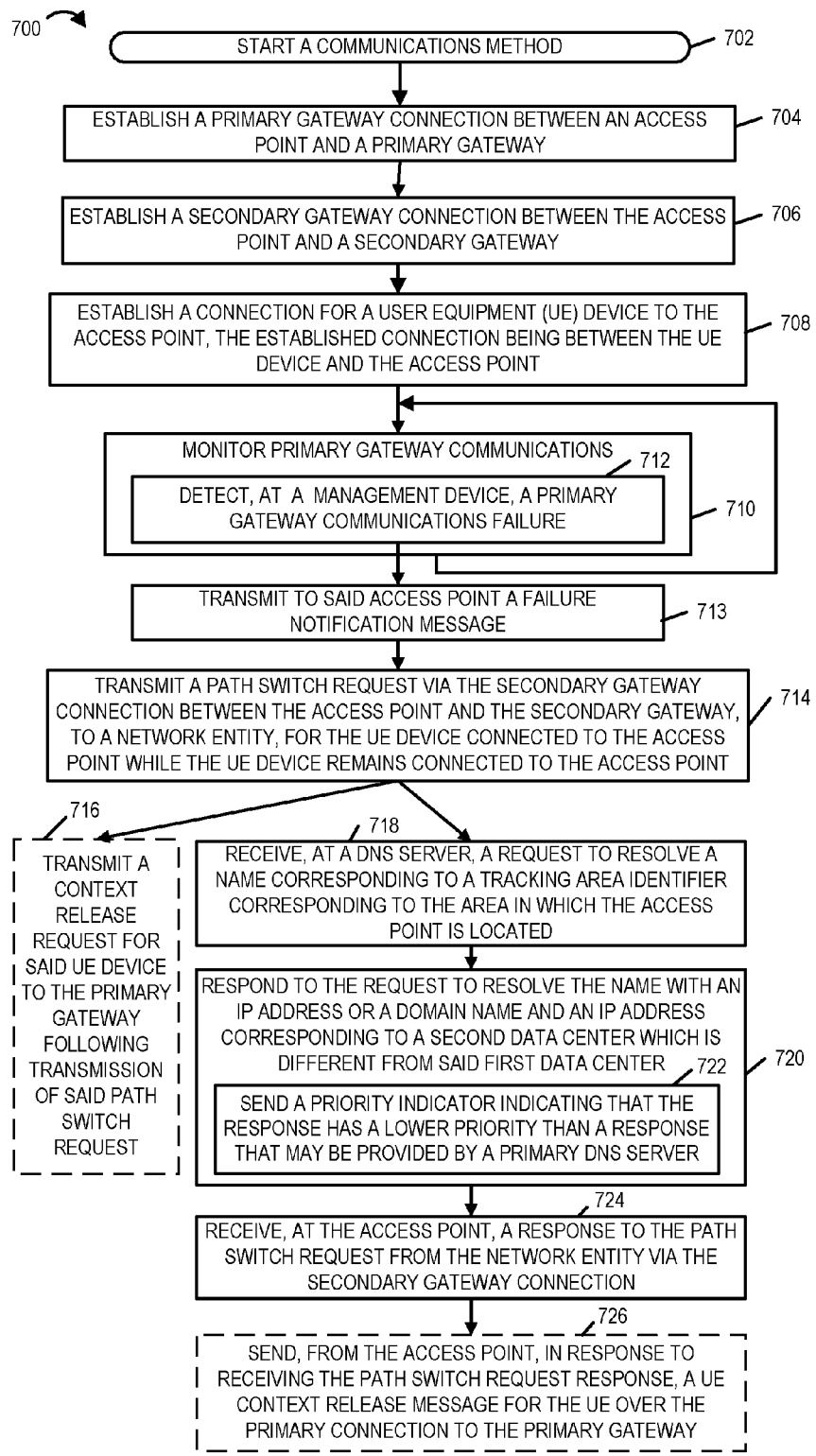
FIG. 7 is a flowchart of an exemplary communications method in accordance with an exemplary embodiment in which a management device detects a primary gateway communications failure.

FIG. 7 is a flowchart 700 of an exemplary communications method in accordance with various embodiments. Operation of the exemplary method starts in step 702 and proceeds to step 704. In step 704, a primary gateway connection between an access point, e.g., HeNB 108', and a primary gateway, e.g., HGW 1 124', is established. In some embodiments, the primary gateway connection is, e.g., a transport layer connection. In some such embodiments, logical connections are then created for each UE as needed. Operation proceeds from step 704 to step 706. In step 706, a secondary gateway connection between the access point and a secondary gateway, e.g., HGW 2 132', is established. In some embodiments, the secondary gateway connection is, e.g., a transport layer connection. Operation proceeds from step 706 to step 708. In step 708, a connection is established for a user equipment (UE) device, e.g., UE 1 134', to the access point, the established connection being between the UE device and the access point. In some embodiments, establishing a connection for a UE device to an access point, will trigger establishment of a logical connection for the UE device over the primary transport layer connection. Operation proceeds from step 708 to step 710.

In step 710, primary gateway communications are monitored, e.g., by management device 125'. Step 710 may, and sometimes does, include step 712, in which a primary gateway communications failure is detected by the management device. The detected primary gateway communications failure is, e.g., a failure to receive an expected heartbeat or failure to receive a response to a communication or an failure internal to the gateway, e.g., which has been detected by built in test equipment. Operation proceeds from step 712 to step 713. In step 713 the management device transmits to said access point a failure notification message. Operation proceeds from step 713 to step 714.

In step 714 the access point transmits a path switch request via the secondary gateway connection, e.g., a transport layer connection, between the access point and the secondary gateway, to a network entity, e.g., to a mobility management entity (MME), e.g., MME 116', via the secondary connection and secondary gateway, for the UE device connected to access point while the UE device remains connected to the access point. In some embodiments, the path switch request will update the control signaling path and the data signaling path for the UE to the secondary connection thereby moving the control signaling path and the data signaling path from a first data center to a second data center. In various embodiments, the UE device is unaffected by this operation, and this activity is transparent to the UE.

In some embodiments, the access point, e.g., HeNB 108', is an LTE HeNB. In various embodiments, the path switch request is a request to update data and signaling paths corresponding to the UE device. In some embodiments, the path switch request is an LTE S1AP Path Switch Request. In various embodiments, the UE is connected to one cell of said access point prior to and subsequent to the path switch request.

The path switch request is sent via the secondary gateway, e.g., HGW 2 132', in response to detecting the primary gateway communications failure.

Operation proceeds from step 714 to one or both of steps 716 and 718.

In optional step 716 the access point transmits a context release request for said UE device to the primary gateway following transmission of said path switch request. In various embodiments, this will clean up context at the first data center, assuming the primary gateway is still reachable.

Primary gateway, e.g., HGW 1 124', is located at a first data center, e.g., datacenter 1 104'. In step 718 a DNS server, e.g., DNS 2 126', receives a request to resolve a name corresponding to a tracking area identifier corresponding to the area in which the access point is located. In various embodiments, the DNS server, e.g., DNS 2 126', is located at a second data center, e.g., datacenter 2 106', which is a non-failed data center. Operation proceeds from step 718 to step 720. In step 720 the DNS server responds to the request to resolve the name with an IP address or a domain name and an IP address corresponding to a second data center which is different from the first data center. For example, DNS 2 126' returns IP2 corresponding to the second data center, while DNS 1 118' would have returned IP1 corresponding to the first data center, if there was not a first data center failure. Step 720 includes step 722, in which the DNS server sends a priority indicator indicating that the response has a lower priority than a response that may be provide by a primary DNS server, e.g., DNS 1 118'. The secondary DNS server is responding but has lower priority than the primary DNS server; but the primary data center and/or primary DNS server has failed; therefore, the secondary DNS server will be the only responder and will prevail.

Operation proceeds from step 720 to step 724, in which the access point receives a response to the path switch request from the network security entity, e.g., MME, via the secondary gateway connection.

In some embodiments, operation proceeds from step 724 to optional step 726, in which the access point sends, in response to receiving the path switch request response, a UE context release message for the UE over the primary connection to the primary gateway. In various embodiments, this will clean up context at the first data center, assuming the primary gateway is still reachable.

In various embodiments, the primary DNS server, e.g., DNS 1 118', is located at the first data center, e.g., data center 1 104'. In some embodiments, the first and second data centers (104', 106') correspond to different sets of physical equipment. In some such embodiments, the first and second data centers (104', 106') are located in different buildings.

Figure 8:
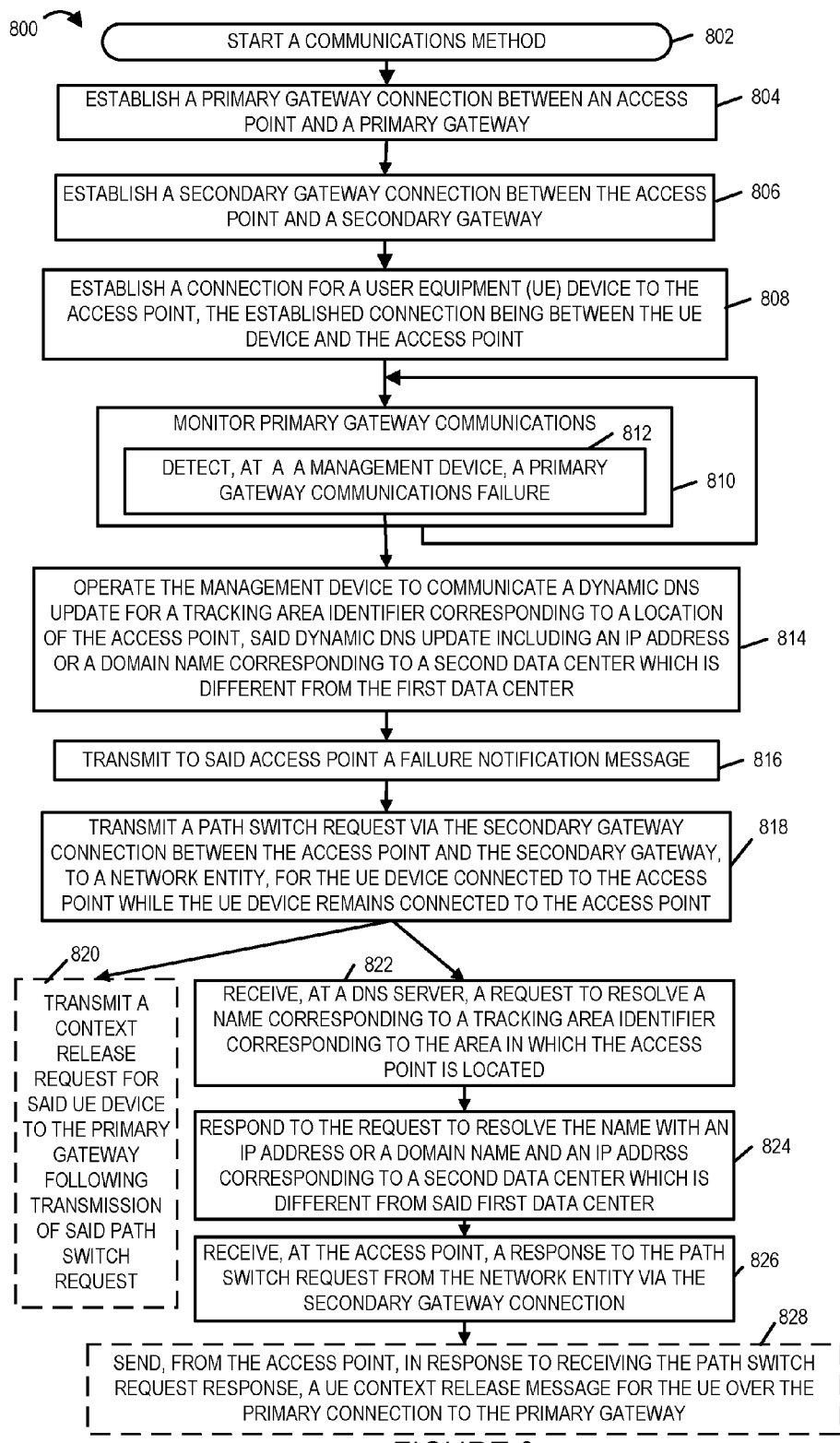
FIG. 8 is a flowchart of an exemplary communications method in accordance with an exemplary embodiment in which a management device generates and transmits a dynamic DNS update message in response to a detected primary gateway communication failure.

FIG. 8 is a flowchart 800 of an exemplary communications method in accordance with various embodiments. Operation of the exemplary method starts in step 802 and proceeds to step 804. In step 804, a primary gateway connection between an access point, e.g., HeNB 108", and a primary gateway, e.g., HGW 1 124", is established. In some embodiments, the primary gateway connection is, e.g., a transport layer connection. In some such embodiments, logical connections are then created for each UE as needed. Operation proceeds from step 804 to step 806. In step 806, a secondary gateway connection between the access point and a secondary gateway, e.g., HGW 2 132", is established. In some embodiments, the secondary gateway connection is, e.g., a transport layer connection. Operation proceeds from step 806 to step 808. In step 808, a connection is established for a user equipment (UE) device, e.g., UE 1 134", to the access point, the established connection being between the UE device and the access point. In some embodiments, establishing a connection for a UE device to an access point, will trigger establishment of a logical connection for the UE device over the primary transport layer connection. Operation proceeds from step 808 to step 810.

In step 810, primary gateway communications are monitored, e.g., by management device 125". Step 810 may, and sometimes does, include step 812, in which a primary gateway communications failure is detected by the management device. The detected primary gateway communications failure is, e.g., a failure to receive an expected heartbeat or failure to receive a response to a communication or an failure internal to the gateway, e.g., which has been detected by built in test equipment. Operation proceeds from step 812 to step 814

In step 814 the management device is operated to communicate a dynamic DNS update for a tracking area identifier corresponding to a location of the access point, said dynamic DNS update including an IP address or a domain name corresponding to a second data center, e.g. IP2, or DomainName2, corresponding to datacenter 2 106", which is different than the IP address or domain name corresponding to the first datacenter, e.g., IP1, or DomainName1, corresponding to datacenter 1 104". The dynamic DNS update is communicated to one or more DNSs, e.g., changing the stored IP address or domain name corresponding to the tracking area in which HeNB 108" is located from IP1 or DomainName1, which corresponds to datacenter 1, to IP2 or DomainName2, which corresponds to datacenter 2. Thus, in some embodiments, in step 814 the management device communicates the dynamic DNS update in response to detection of first data center fault condition. Operation proceeds from step 814 to step 816.

In step 816 the management device transmits to said access point a failure notification message. Operation proceeds from step 816 to step 818.

In step 818 the access point transmits a path switch request via the secondary gateway connection, e.g., a transport layer connection, between the access point and the secondary gateway, to a network entity, e.g., to a mobility management entity (MME), e.g., MME 116", via the secondary connection and secondary gateway, for the UE device connected to access point while the UE device remains connected to the access point. In some embodiments, the path switch request will update the control signaling path and the data signaling path for the UE to the secondary connection thereby moving the control signaling path and the data signaling path from a first data center to a second data center. In various embodiments, the UE device is unaffected by this operation, and this activity is transparent to the UE.

In some embodiments, the access point, e.g., HeNB 108", is an LTE HeNB. In various embodiments, the path switch request is a request to update data and signaling paths corresponding to the UE device. In some embodiments, the path switch request is an LTE S1AP Path Switch Request. In various embodiments, the UE is connected to one cell of said access point prior to and subsequent to the path switch request.

The path switch request is sent via the secondary gateway, e.g., HGW 2 132", in response to detecting the primary gateway communications failure.

Operation proceeds from step 818 to one or both of steps 820 and 822.

In optional step 820 the access point transmits a context release request for said UE device to the primary gateway following transmission of said path switch request. In various embodiments, this will clean up context at the first data center, assuming the primary gateway is still reachable.

Primary gateway, e.g., HGW 1 124", is located at a first data center, e.g., datacenter 1 104". In step 822 a DNS server, e.g., DNS 2 126", receives a request to resolve a name corresponding to a tracking area identifier corresponding to the area in which the access point is located. In various embodiments, the DNS server, e.g., DNS 2 126", is located at a second data center, e.g., datacenter 2 106", which is a non-failed data center. Operation proceeds from step 822 to step 824. In step 824 the DNS server responds to the request to resolve the name with an IP address or a domain name and an IP address corresponding to a second data center which is different from the first data center. For example, DNS 2 126" returns IP2, or DomainName2 and IP2, corresponding to the second data center, based on the updated information communicated in step 814.

Operation proceeds from step 824 to step 826, in which the access point receives a response to the path switch request from the network security entity, e.g., MME 116", via the secondary gateway connection.

In some embodiments, operation proceeds from step 826 to optional step 828, in which the access point sends, in response to receiving the path switch request response, a UE context release message for the UE over the primary connection to the primary gateway. In various embodiments, this will clean up context at the first data center, assuming the primary gateway is still reachable.

In various embodiments, the primary DNS server, e.g., DNS 1 118", is located at the first data center, e.g., data center 1 104". In some embodiments, the first and second data centers (104", 106") correspond to different sets of physical equipment. In some such embodiments, the first and second data centers (104", 106") are located in different buildings.

Figure 9:
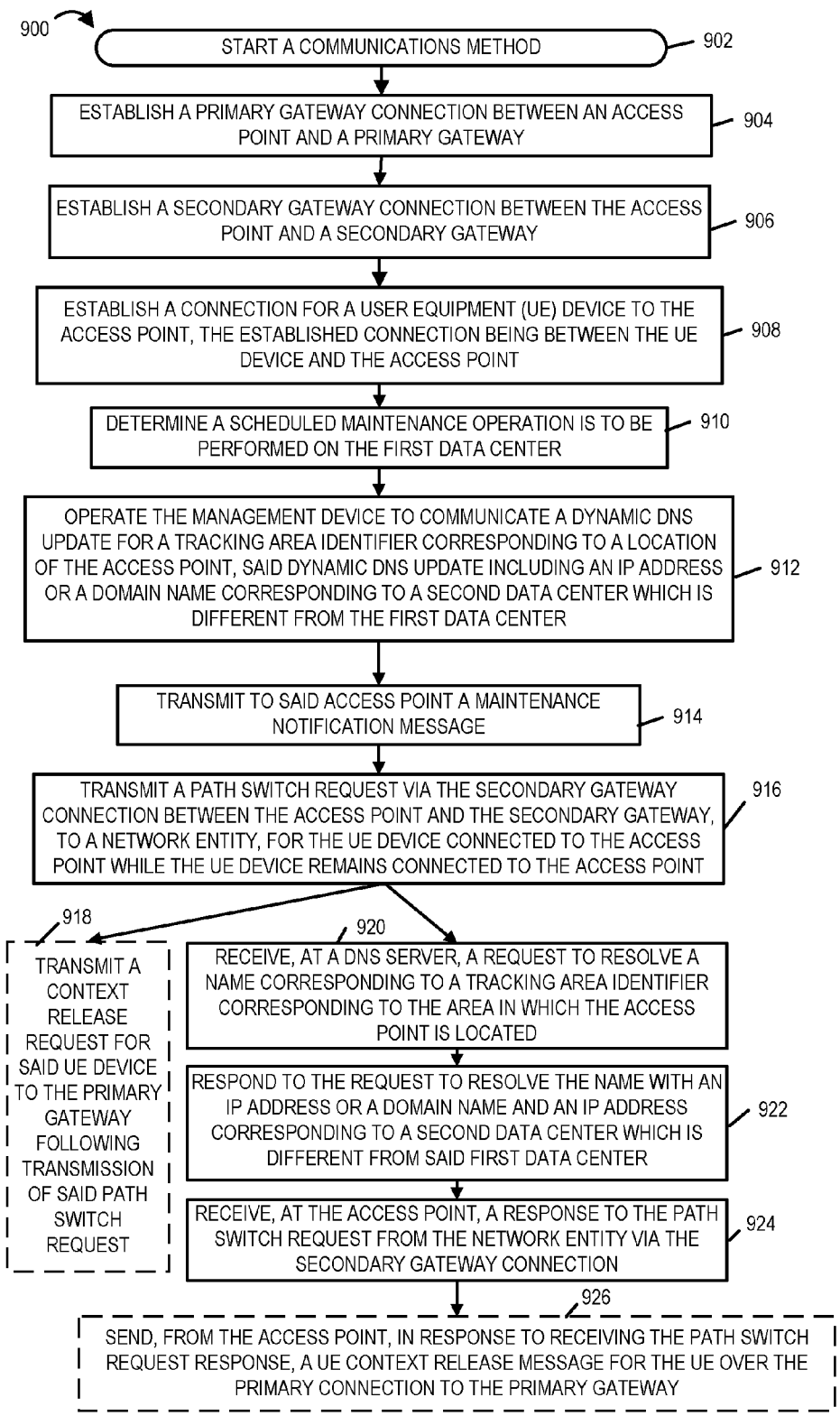
FIG. 9 is a flowchart of an exemplary communications method in accordance with an exemplary embodiment in which a management device generates and transmits a dynamic DNS update message in response to scheduled maintenance.

FIG. 9 is a flowchart 900 of an exemplary communications method in accordance with various embodiments. Operation of the exemplary method starts in step 902 and proceeds to step 904. In step 904, a primary gateway connection between an access point, e.g., HeNB 108'", and a primary gateway, e.g., HGW 1 124'", is established. In some embodiments, the primary gateway connection is, e.g., a transport layer connection. In some such embodiments, logical connections are then created for each UE as needed. Operation proceeds from step 904 to step 906. In step 906, a secondary gateway connection between the access point and a secondary gateway, e.g., HGW 2 132'", is established. In some embodiments, the secondary gateway connection is, e.g., a transport layer connection. Operation proceeds from step 906 to step 908. In step 908, a connection is established for a user equipment (UE) device, e.g., UE 1 134'", to the access point, the established connection being between the UE device and the access point. In some embodiments, establishing a connection for a UE device to an access point, will trigger establishment of a logical connection for the UE device over the primary transport layer connection. Operation proceeds from step 908 to step 910.

In step 910, a management device, e.g., management device 125'", determines that a scheduled maintenance operation is to be performed on the first data center. Operation proceeds from step 910 to step 912.

In step 912 the management device is operated to communicate a dynamic DNS update for a tracking area identifier corresponding to a location of the access point, said dynamic DNS update including an IP address or a domain name corresponding to a second data center, e.g. IP2, or DomainName2, corresponding to datacenter 2 106'", which is different than the IP address or domain name corresponding to the first datacenter, e.g., IP1, or DomainName1, corresponding to datacenter 1 104'". The dynamic DNS update is communicated to one or more DNSs, e.g., changing the stored IP address corresponding to the tracking area in which HeNB 108'" is located from IP1 or DomainName1, which corresponds to datacenter 1, to IP2 or DomainName2, which corresponds to datacenter 2. Thus, in some embodiments, the management device communicates the dynamic DNS update in response in accordance with a scheduled maintenance operation on the first data center. Operation proceeds from step 912 to step 914.

In step 914 the management device transmits to said access point a maintenance notification message. Operation proceeds from step 914 to step 916.

In step 916 the access point transmits a path switch request via the secondary gateway connection, e.g., a transport layer connection, between the access point and the secondary gateway, to a network entity, e.g., to a mobility management entity (MME), e.g., MME 116'", via the secondary connection and secondary gateway, for the UE device connected to access point while the UE device remains connected to the access point. In some embodiments, the path switch request will update the control signaling path and the data signaling path for the UE to the secondary connection thereby moving the control signaling path and the data signaling path from a first data center to a second data center. In various embodiments, the UE device is unaffected by this operation, and this activity is transparent to the UE.

In some embodiments, the access point, e.g., HeNB 108'", is an LTE HeNB. In various embodiments, the path switch request is a request to update data and signaling paths corresponding to the UE device. In some embodiments, the path switch request is an LTE S1AP Path Switch Request. In various embodiments, the UE is connected to one cell of said access point prior to and subsequent to the path switch request.

Operation proceeds from step 916 to one or both of steps 918 and 920.

In optional step 918 the access point transmits a context release request for said UE device to the primary gateway following transmission of said path switch request. In various embodiments, this will clean up context at the first data center, assuming the primary gateway is still reachable.

Primary gateway, e.g., HGW 1 124'", is located at a first data center, e.g., datacenter 1 104'". In step 920 a DNS server, e.g., DNS 2 126'", receives a request to resolve a name corresponding to a tracking area identifier corresponding to the area in which the access point is located. In various embodiments, the DNS server, e.g., DNS 2 126'", is located at a second data center, e.g., datacenter 2 106'", which is a non-failed data center which is to remain active while data center 1 is undergoing maintenance. Operation proceeds from step 920 to step 922. In step 922 the DNS server responds to the request to resolve the name with an IP address or a domain name and an IP address corresponding to a second data center which is different from the first data center. For example, DNS 2 126'" returns IP2, or DomainName2 and IP2, corresponding to the second data center, based on the updated information communicated in step 912.

Operation proceeds from step 922 to step 924, in which the access point receives a response to the path switch request from the network security entity, e.g., MME 116'", via the secondary gateway connection.

In some embodiments, operation proceeds from step 924 to optional step 926, in which the access point sends, in response to receiving the path switch request response, a UE context release message for the UE over the primary connection to the primary gateway. In various embodiments, this will clean up context at the first data center, assuming the primary gateway is still reachable.

In various embodiments, the primary DNS server, e.g., DNS 1 118'", is located at the first data center, e.g., data center 1 104'". In some embodiments, the first and second data centers (104'", 106'") correspond to different sets of physical equipment. In some such embodiments, the first and second data centers (104'", 106'") are located in different buildings.

Figure 10:
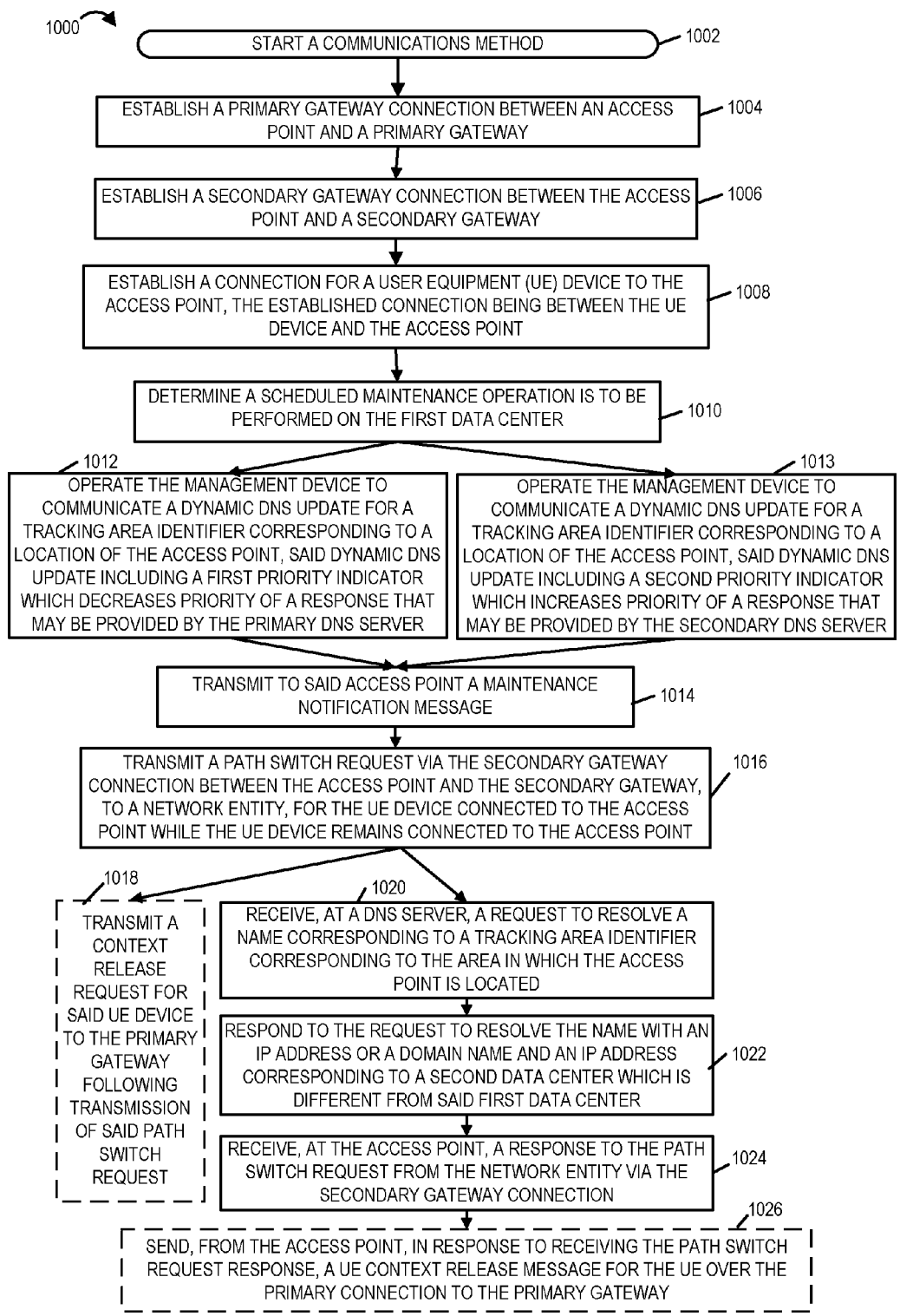
FIG. 10 is a flowchart of an exemplary communications method in accordance with an exemplary embodiment in which a management device generates and transmits a dynamic DNS update message in response to scheduled maintenance.

FIG. 10 is a flowchart 1000 of an exemplary communications method in accordance with various embodiments. Operation of the exemplary method starts in step 1002 and proceeds to step 1004. In step 1004, a primary gateway connection between an access point, e.g., HeNB 108'", and a primary gateway, e.g., HGW 1 124'", is established. In some embodiments, the primary gateway connection is, e.g., a transport layer connection. In some such embodiments, logical connections are then created for each UE as needed. Operation proceeds from step 1004 to step 1006. In step 1006, a secondary gateway connection between the access point and a secondary gateway, e.g., HGW 2 132'", is established. In some embodiments, the secondary gateway connection is, e.g., a transport layer connection. Operation proceeds from step 1006 to step 1008. In step 1008, a connection is established for a user equipment (UE) device, e.g., UE 1 134''', to the access point, the established connection being between the UE device and the access point. In some embodiments, establishing a connection for a UE device to an access point, will trigger establishment of a logical connection for the UE device over the primary transport layer connection. Operation proceeds from step 1008 to step 1010.

In step 1010, a management device, e.g., management device 125''', determines that a scheduled maintenance operation is to be performed on the first data center. Operation proceeds from step 1010 to step 1012 and step 1013.

In step 1012 the management device is operated to communicate a dynamic DNS update for a tracking area identifier corresponding to a location of the access point, said dynamic DNS update including a first priority indicator which decreases the priority of a response that may be provided by the primary DNS server. In step 1013 the management device is operated to communicate a dynamic DNS update for a tracking area identifier corresponding to a location of the access point, said dynamic DNS update including a second priority indicator which increase the priority of a response that may be provided by the secondary DNS server. For example, in one embodiment, prior to the update, for the tracking area in which HeNB 108''' is located: DNS 1 maps the tracking area identifier value to IP1, which corresponds to datacenter 1, with an associated high priority value; and DNS 2 maps to IP2, which corresponds to datacenter 2, with a low priority value. Continuing with the example, after the update, for the tracking area in which HeNB 108''' is located: DNS 1 maps the tracking area identifier value to IP1, which corresponds to datacenter 1, with an associated low priority value; and DNS 2 maps to IP2, which corresponds to datacenter 2, with a high priority value. Thus, in some embodiments, the management device communicates the dynamic DNS update in response in accordance with a scheduled maintenance operation on the first data center. Operation proceeds from step 1012 and 1013 to step 1014.

In step 1014 the management device transmits to said access point a maintenance notification message. Operation proceeds from step 1014 to step 1016.

In step 1016 the access point transmits a path switch request via the secondary gateway connection, e.g., a transport layer connection, between the access point and the secondary gateway, to a network entity, e.g., to a mobility management entity (MME), e.g., MME 116''', via the secondary connection and secondary gateway, for the UE device connected to access point while the UE device remains connected to the access point. In some embodiments, the path switch request will update the control signaling path and the data signaling path for the UE to the secondary connection thereby moving the control signaling path and the data signaling path from a first data center to a second data center. In various embodiments, the UE device is unaffected by this operation, and this activity is transparent to the UE.

In some embodiments, the access point, e.g., HeNB 108''', is an LTE HeNB. In various embodiments, the path switch request is a request to update data and signaling paths corresponding to the UE device. In some embodiments, the path switch request is an LTE S1AP Path Switch Request. In various embodiments, the UE is connected to one cell of said access point prior to and subsequent to the path switch request.

Operation proceeds from step 1016 to one or both of steps 1018 and 1020.

In optional step 1018 the access point transmits a context release request for said UE device to the primary gateway following transmission of said path switch request. In various embodiments, this will clean up context at the first data center, assuming the primary gateway is still reachable.

Primary gateway, e.g., HGW 1 124''', is located at a first data center, e.g., datacenter 1 104'''. In step 1020 a DNS server, e.g., DNS 2 126''', receives a request to resolve a name corresponding to a tracking area identifier corresponding to the area in which the access point is located. In various embodiments, the DNS server, e.g., DNS 2 126''', is located at a second data center, e.g., datacenter 2 106''', which is a non-failed data center which is to remain active while data center 1 is undergoing maintenance. Operation proceeds from step 1020 to step 1022.

In step 1022 the DNS server responds to the request to resolve the name with an IP address or a domain name and an IP address corresponding to a second data center which is different from the first data center. For example, DNS 2 126''' returns IP2 corresponding to the second data center. Note that the DNS updates of steps 1012 and 1013 has switched priority so that a response from DNS 2 will have higher priority than a response from DNS 1, and the data center will be switched from data center 1 to data center 2.

Operation proceeds from step 1022 to step 1024, in which the access point receives a response to the path switch request from the network security entity, e.g., MME 116''', via the secondary gateway connection.

In some embodiments, operation proceeds from step 1024 to optional step 1026, in which the access point sends, in response to receiving the path switch request response, a UE context release message for the UE over the primary connection to the primary gateway. In various embodiments, this will clean up context at the first data center, assuming the primary gateway is still reachable.

In various embodiments, the primary DNS server, e.g., DNS 1 118''', is located at the first data center, e.g., data center 1 104'''. In some embodiments, the first and second data centers (104''', 106''') correspond to different sets of physical equipment. In some such embodiments, the first and second data centers (104''', 106''') are located in different buildings.

Figure 11:
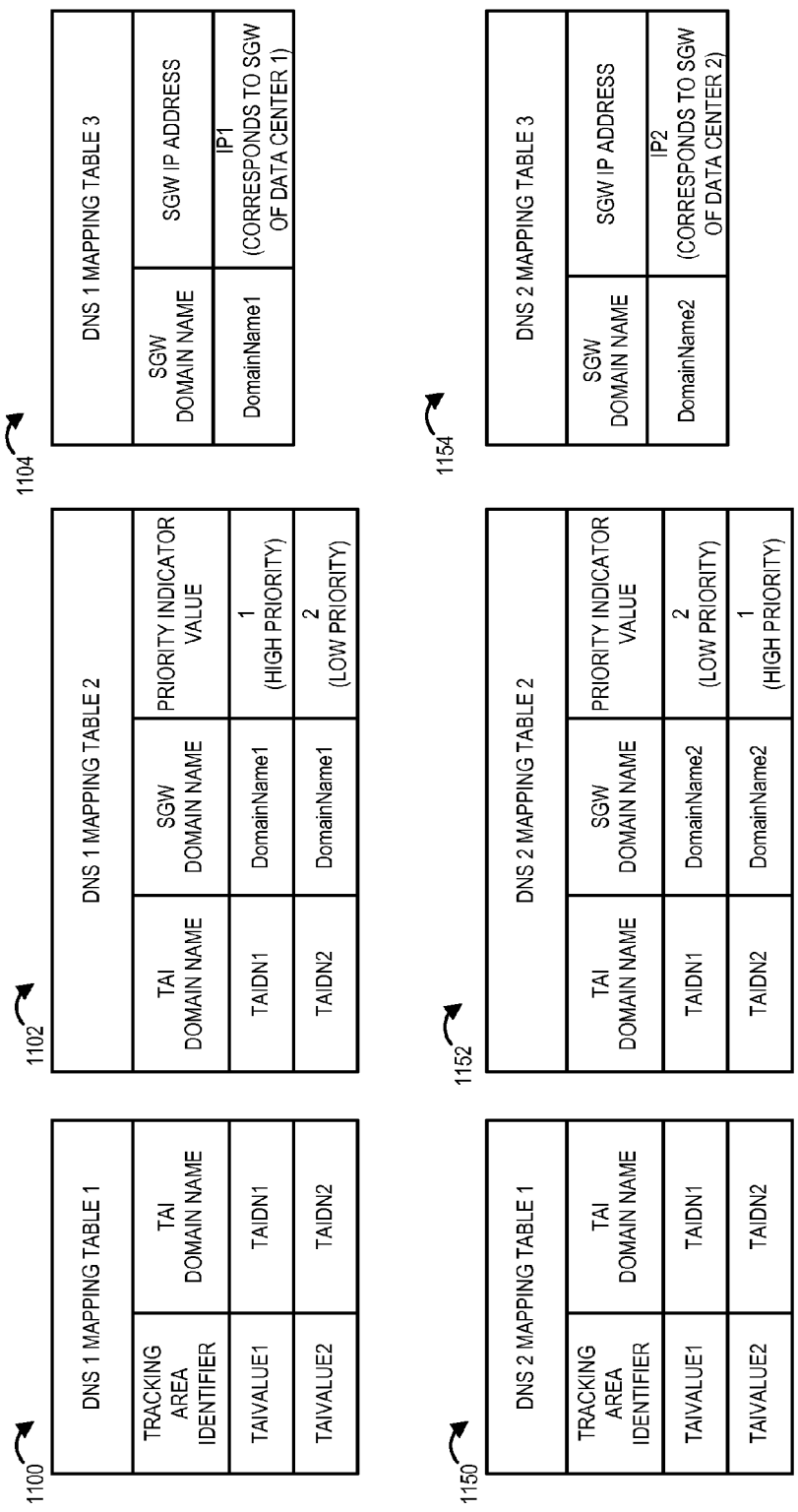
FIG. 11 is a drawing illustrating exemplary mapping tables which may be included in exemplary DNSs in accordance with an exemplary embodiment.

FIG. 11 is a drawing illustrating exemplary mapping tables which may be included in exemplary DNSs in accordance with an exemplary embodiment. Tables (1100, 1102, 1104) are DNS mapping table for DNS 1, e.g., DNS 1 118 or DNS 1 118'. Table 1100 maps a tracking area identifier to a tracking area identifier (TAI) domain name. Table 1102 maps a TAI domain name to a SGW domain name and a priority indicator value. Table 1104 maps a SGW domain name to a SGW IP address. Tables (1150, 1152, 1154) are DNS mapping table for DNS 2, e.g., DNS 2 126 or DNS 2 126'. Table 1150 maps a tracking area identifier to a tracking area identifier (TAI) domain name. Table 1152 maps a TAI domain name to a SGW domain name and a priority indicator value. Table 1154 maps a SGW domain name to a SGW IP address. In this embodiment, different DNSs map the same tracking area identifier value to different SGW domain names and different priority indicator values, and the different SGW domain names map to different IP addresses.

For DNS 1, tracking area identifier value=TAIVALUE1, maps to TAI domain name=TAIDN1, which maps to SGW domain name=DomainName1 and priority indicator value=1, which indicates high priority; SGW domain name=DomainName1 maps to IP address=IP1, which corresponds to data center 1. For DNS 2, tracking area identifier value=TAIVALUE1, maps to TAI domain name=TAIDN1, which maps to SGW domain name=DomainName2 and priority indicator value=2, which indicates low priority; SGW domain name=DomainName2 maps to IP address=IP2, which corresponds to data center 2. Thus for an access point, e.g., HeNB 108, located in tracking area 1, data center 1 is the primary data center, and data center 2 is the secondary or back-up data center.

For DNS 1, tracking area identifier value=TAIVALUE2 maps to TAI domain name=TAIDN2, which maps to SGW domain name=DomainName1 and priority indicator value=2 which indicates low priority; SGW domain name=DomainName1 maps to IP address=IP1, which corresponds to data center 1. For DNS 2, tracking area identifier value=TAIVALUE2 maps to TAI domain name=TAIDN2, which maps to SGW domain name=DomainName2 and priority indicator value=1, which indicates high priority; SGW domain name=DomainName2 maps to IP address=IP2, which corresponds to data center 2. Thus for an access point, e.g., HeNB N 110, located in tracking area 2, data center 2 is the primary data center, and data center 1 is the secondary or back-up data center.

Figure 12:
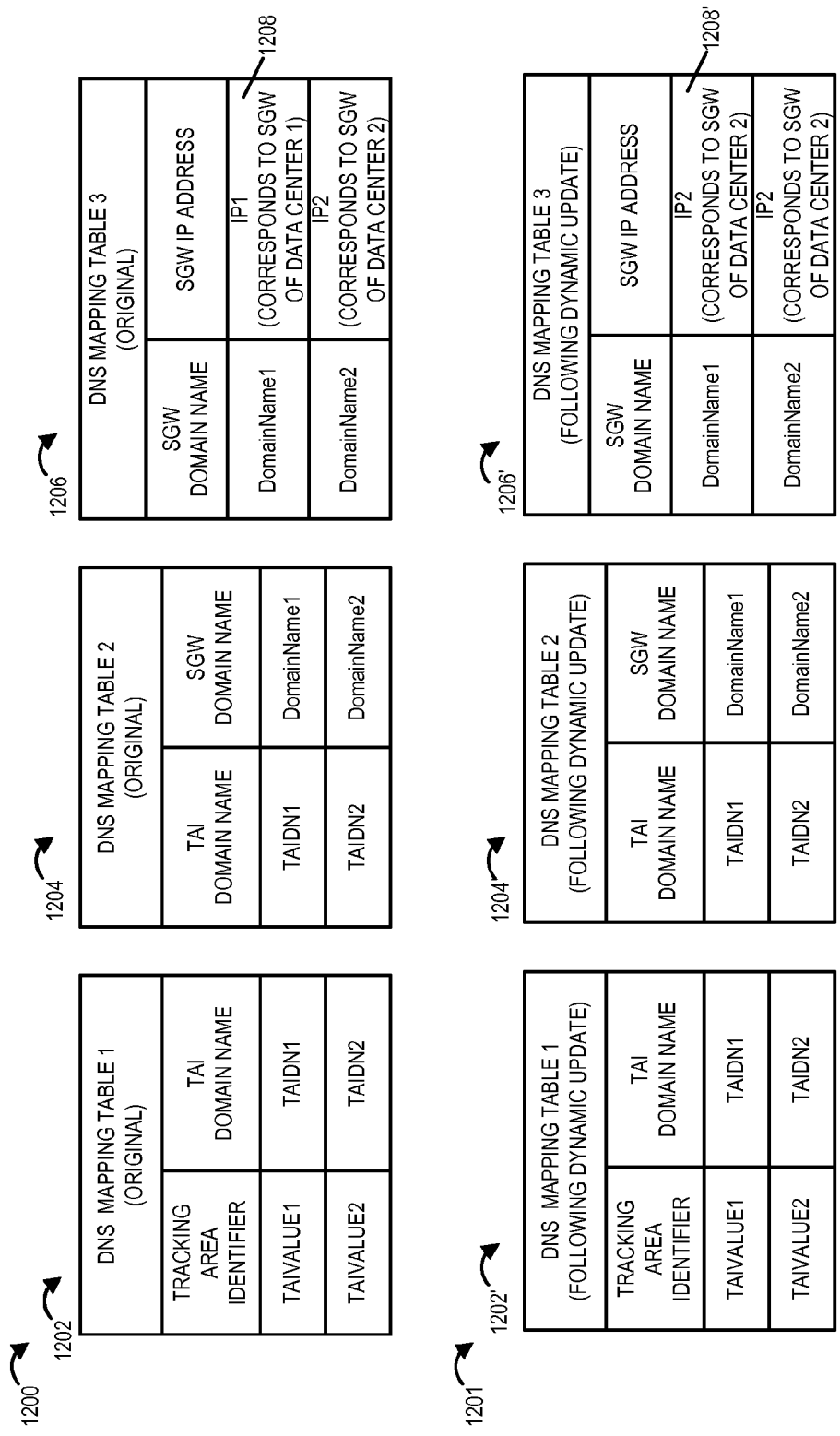
FIG. 12 is a drawing illustrating exemplary original and updated mapping tables which may be included in exemplary DNSs in accordance with another exemplary embodiment.

FIG. 12 is a drawing illustrating exemplary original and updated mapping tables which may be included in exemplary DNSs in accordance with another exemplary embodiment. Set of tables 1200, including table 1202, table 1204, and table 1206, is an original, e.g. pre-update, set of DNS mapping tables for DNS 1, e.g., DNS 1 118" or DNS 1 118''' and/or for DNS 2, e.g., DNS 2 126" or DNS 2 126'''. Table 1202 maps tracking area identifier to TAI domain name; table 1204 maps TAI domain name to SGW domain name; and table 1206 maps SGW domain name to SGW IP address.

Set of tables 1201, including table 1202', 1204', and 1206', is an updated set of DNS mapping tables for DNS 1, e.g., DNS 1 118" or DNS 1 118''', e.g., following a communicated dynamic DNS update message from management device 125" or 125''' and/or for DNS 2, e.g., DNS 2 126" or DNS 2 126''', e.g., following a communicated dynamic DNS update message from management device 125" or 125'''.

In this embodiment, at a given time, each of the DNSs map the same tracking area identifier value to the same IP address. However, the IP address can be, and sometimes is, dynamically updated over time, e.g., in response to a detected fault condition or scheduled maintenance.

Originally, tracking area identifier value=TAIVALUE1 maps to TAI domain name=TAIDN1, which maps to SGW domain name=DomainName1, which maps to IP address=IP1, which corresponds to data center 1; and tracking area identifier value=TAIVALUE2 maps to TAI domain name=TAIDN2, which maps to SGW Domain Name=DomainName2, which maps to IP address=IP2, which corresponds to data center 2.

In this example, the dynamic DNS update changes the mapping between an SGW domain name and an SGW IP address. Table entry 1208 of table 1206 indicates IP1, while table entry 1208' of table 1206' indicates IP2.

In this example, after the update, tracking area identifier value=TAIVALUE1 maps to TAIDN1, which maps to SGW Domain Name=DomainName1, which maps to IP address=IP2, which corresponds to data center 2; and tracking area identifier value=TAIVALUE2 maps to TAI domain name=TAIDN2, which maps to SGW Domain Name=DomainName2, which maps to IP address=IP2, which corresponds to data center 2.

In this example, consider that access point HeNB 108" or 108''' is located in the tracking area with tracking area identifier value=TAIVALUE1 and that a detected primary gateway communications failure or scheduled maintenance on data center 1 104" or 104''' is the trigger event for transition from datacenter 1 104" or 104''' to datacenter 2 106" or 106'''.

Figure 12A:
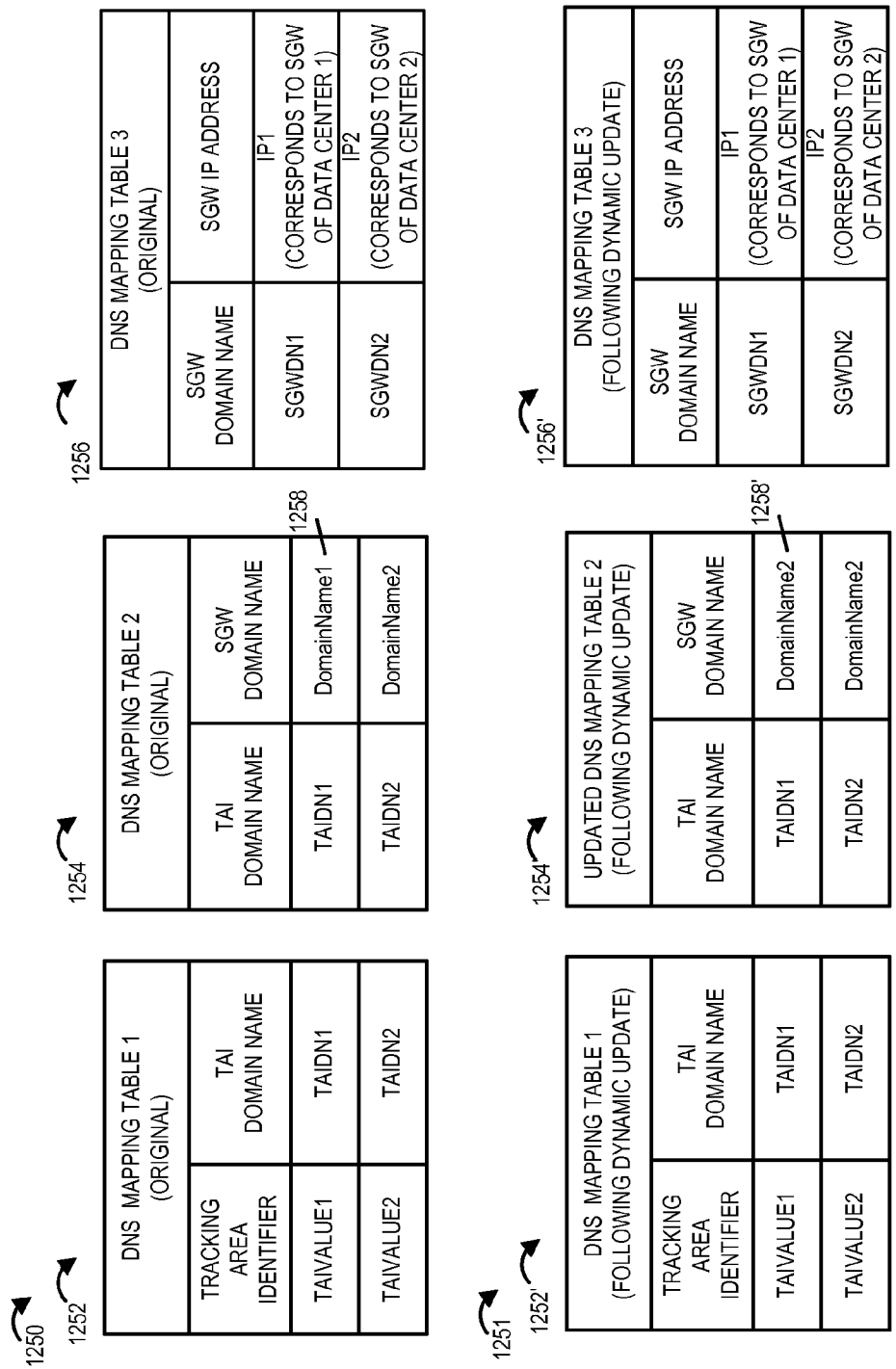
FIG. 12A is a drawing illustrating exemplary original and updated mapping tables which may be included in exemplary DNSs in accordance with yet another exemplary embodiment.

FIG. 12A is a drawing illustrating exemplary original and updated mapping tables which may be included in exemplary DNSs in accordance with yet another exemplary embodiment. Set of tables 1250, including table 1252, table 1254, and table 1256, is an original, e.g. pre-update, set of DNS mapping tables for DNS 1, e.g., DNS 1 118" or DNS 1 118''' and/or for DNS 2 e.g., DNS 2 126" or DNS 2 126'''. Table 1252 maps tracking area identifier to TAI domain name; table 1254 maps TAI domain name to SGW domain name; and table 1256 maps SGW domain name to SGW IP address.

Set of tables 1251, including table 1252', 1254', and 1256', is an updated set of DNS mapping tables for DNS 1, e.g., DNS 1 118" or DNS 1 118''', e.g., following a communicated dynamic DNS update message from management device 125" or 125''' and/or for DNS 2, e.g., DNS 2 126" or DNS 2 126''', e.g., following a communicated dynamic DNS update message from management device 125" or 125'''.

In this exemplary embodiment, at a given time, each of the DNSs map the same tracking area identifier value to the same domain name. However, the domain name can be, and sometimes is, dynamically updated over time, e.g., in response to a detected fault condition or scheduled maintenance.

Originally, tracking area identifier value=TAIVALUE1 maps to TAI domain name=TAIDN1, which maps to SGW domain name=DomainName1, which itself maps to IP address=IP1, which corresponds to data center 1; and tracking area identifier value=TAIVALUE2 maps to TAI domain name=TAIDN2, which maps to SGW domain name=DomainName2, which itself maps to IP address=IP2, which corresponds to data center 2.

In this example, the dynamic DNS update changes the mapping between a TAI domain name and an SGW domain name. Table entry 1258 of table 1254 indicates DomainName1, while table entry 1258' of table 1254' indicates DomainName2.

In this example, after the update, tracking area identifier value=TAIVALUE1 maps to TAI domain name=TAIDN1, which maps to SGW domain name=DomainName2, which itself maps to IP address=IP2, which corresponds to data center 2; and tracking area identifier value=TAIVALUE2 maps to TAI domain name=TAIDN2, which maps to SGW domain name=DomainName2, which itself maps to IP address=IP2, which corresponds to data center 2.

In this example, consider that access point HeNB 108" or 108''' is located in the tracking area with tracking area identifier value=TAIVALUE1 and that a detected primary gateway communications failure or scheduled maintenance on data center 1 104" or 104''' is the trigger event for transition from datacenter 1 104" or 104''' to datacenter 2 106" or 106'''.

Figure 13:
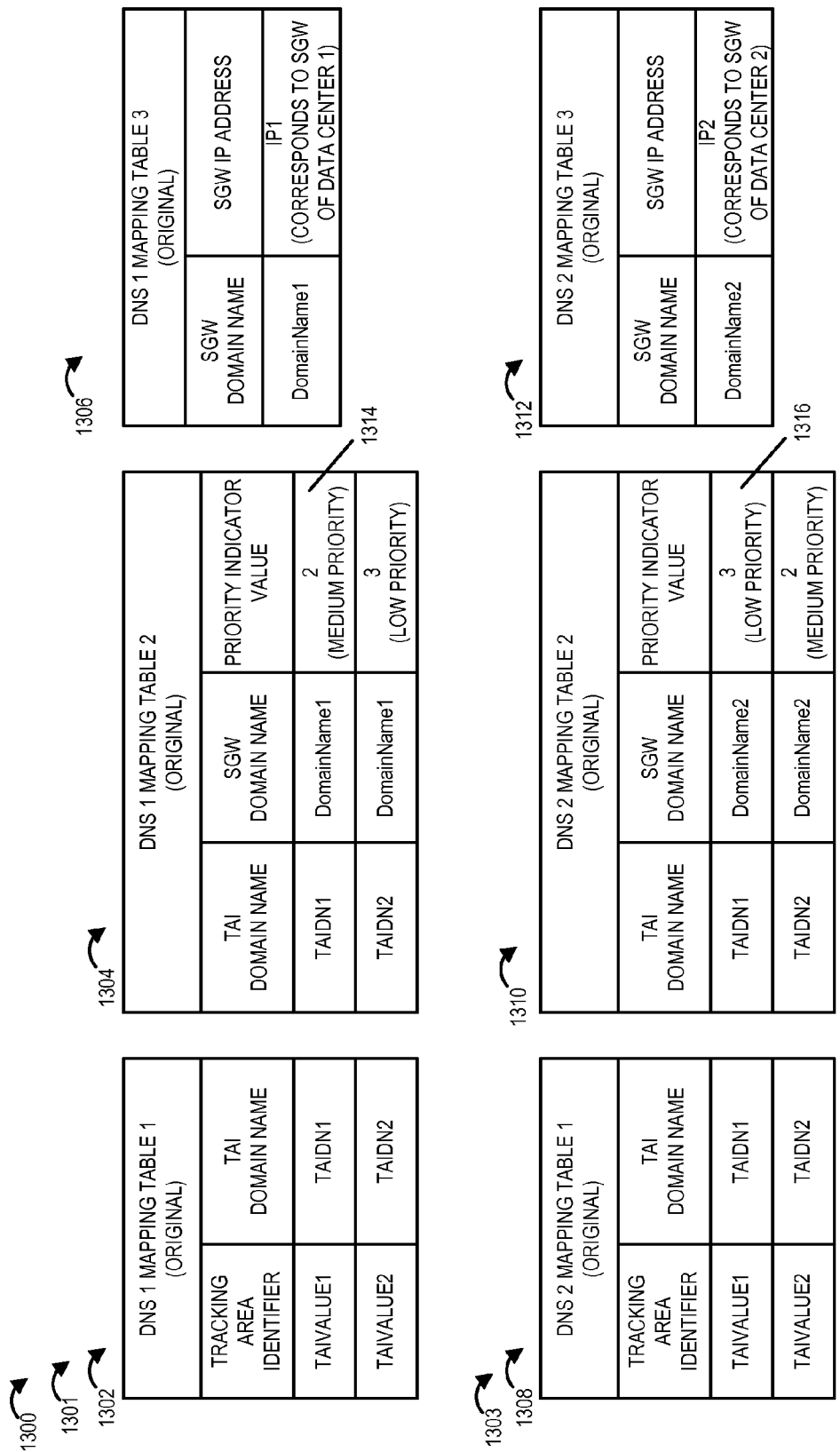
FIG. 13 is a drawing illustrating exemplary original mapping tables which may be included in exemplary DNSs in accordance with another exemplary embodiment.

FIG. 13 is a drawing 1300 illustrating exemplary original mapping tables which may be included in exemplary DNSs in accordance with another exemplary embodiment. Set of tables 1301, including table 1302, 1304, 1306, is a set of original, e.g. pre-update, DNS mapping tables for DNS 1, e.g., DNS 1 118" or DNS 1 118'''. Table 1302 maps tracking area identifier to TAI domain name; table 1304 maps TAI domain name to SGW domain name and priority indicator value; and table 1306 maps SGW domain name to SGW IP address.

Set of tables 1303, including table 1308, 1310, 1312, is a set of original, e.g. pre-update, DNS mapping tables for DNS 2, e.g., DNS 2 126" or DNS 2 126'''. Table 1308 maps tracking area identifier to TAI domain name; table 1310 maps TAI domain name to SGW domain name and priority indicator value; and table 1312 maps SGW domain name to SGW IP address.

Originally, for DNS 1, tracking area identifier value=TAIVALUE1 maps to TAI domain name=TAIDN1, which maps to SGW domain name=DomainName1 and priority indicator value=2, which indicates medium priority; SGW domain name=DomainName1 maps to IP address=IP1, which corresponds to data center 1. Also, originally for DNS1, tracking area identifier value=TAIVALUE2 maps to TAI domain name=TAIDN2, which maps to SGW domain name=DomainName1 and priority indicator value=3, which indicates low priority; SGW domain name=DomainName1 maps to IP address=IP1, which corresponds to data center 1.

Originally, for DNS 2, tracking area identifier value=TAIVALUE1 maps to TAI domain name=TAIDN1, which maps to SGW domain name=DomainName2 and priority indicator value=3, which indicates low priority; SGW domain name=DomainName2 maps to IP address=IP2, which corresponds to data center 2. Also originally for DNS 2, tracking area identifier value=TAIVALUE2 maps to TAIDN2, which maps to SGW domain name=DomainName2 and priority indicator value=2, which indicates medium priority; SGW domain name=DomainName2 maps to IP address=IP2, which corresponds to data center 2.

Figure 13A:
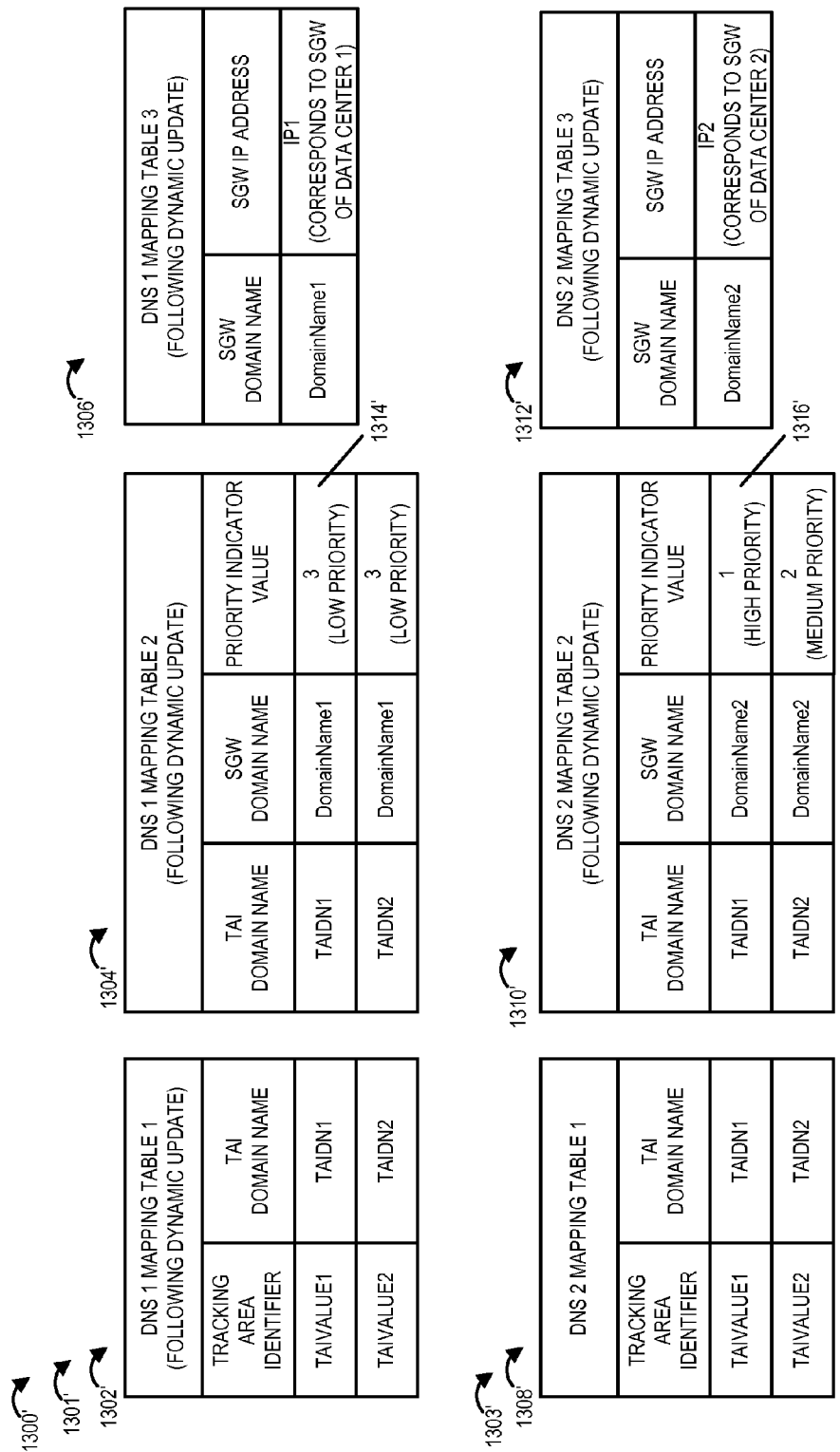
FIG. 13A is a drawing illustrating exemplary updated mapping tables which may be included in exemplary DNSs in accordance with the another exemplary embodiment.

FIG. 13A is a drawing 1300' illustrating exemplary updated mapping tables which may be included in exemplary DNSs in accordance with the another exemplary embodiment. Set of table 1301', including tables 1302', 1304' and 1306', is an updated set DNS mapping tables for DNS 1, e.g., DNS 1 118" or DNS 1 118''', e.g., following a communicated dynamic DNS update message from management device 125" or 125'''. Table 1302' maps tracking area identifier to TAI domain name; table 1304' maps TAI domain name to SGW domain name and priority indicator value; and table 1306' maps SGW domain name to SGW IP address.

Set of tables 1303', including table 1308', 1310' and 1312'. is an updated set DNS mapping tables for DNS 2, e.g., DNS 2 126" or DNS 2 126''', e.g., following a communicated dynamic DNS update message from management device 125" or 125'''. Table 1308' maps tracking area identifier to TAI domain name; table 1310' maps TAI domain name to SGW domain name and priority indicator value; and table 1312' maps SGW domain name to SGW IP address.

In this example after the update, for DNS 1, tracking area identifier value=TAIVALUE1 maps to TAI domain name=TAIDN1, which maps to SGW domain name=DomainName1 and priority indicator value=3 which indicates low priority; SGW domain name=DomainName1 maps to IP address=IP1, which corresponds to data center 1. Also, in this example after the update for DNS1, tracking area identifier value=TAIVALUE2 maps to TAI domain name=TAIDN2, which maps to SGW domain name=DomainName1 and priority indicator value=3, which indicates low priority; SGW domain name=DomainName1 maps to IP address=IP1, which corresponds to data center 1.

In this example after the update, for DNS 2, tracking area identifier value=TAIVALUE1 maps to TAI domain name=TAIDN1, which maps to SGW domain name=DomainName2 and priority indicator value=1, which indicates high priority; SGW domain name=DomainName 2 maps to IP address=IP2, which corresponds to data center 2. Also in this example after the update for DNS 2, tracking area identifier value=TAIVALUE2 maps to TAIDN2, which maps to SGW domain name=DomainName2 and priority indicator value=2, which indicates medium priority; SGW domain name=DomainName 2 maps to IP address=IP2, which corresponds to data center 2.

In this embodiment, each of the DNSs map the same tracking area identifier value to different IP addresses. However, the priority can be, and sometimes is, dynamically updated over time, e.g., in response to a detected fault condition or scheduled maintenance.

In this example, consider that access point HeNB 108" or 108''' is located in the tracking area with tracking area identifier value=TAIVALUE1 and that a detected primary gateway communications failure or scheduled maintenance on data center 1 104" or 104''' is the trigger event for transition from datacenter 1 104" or 104''' to datacenter 2 106" or 106'''. A dynamic change in stored priority information in the DNS mapping tables is utilized to cause redirection to datacenter 2 106" or 106''', when a path switch request is subsequently sent from the access point HeNB 108" or 108'''.

In particular with regard to the DNS 1 mapping tables, table entry 1314 of table 1304 indicates priority indicator value=2, which indicates medium priority; and table entry 1314' of table 1304' indicates priority indicator value=3, which indicates low priority. And with regard to the DNS 2 mapping tables, table entry 1316 of table 1310 indicates priority indicator value=3, which indicates low priority; and table entry 1316' of table 1310' indicates priority indicator value=1, which indicates high priority.

Figure 14:
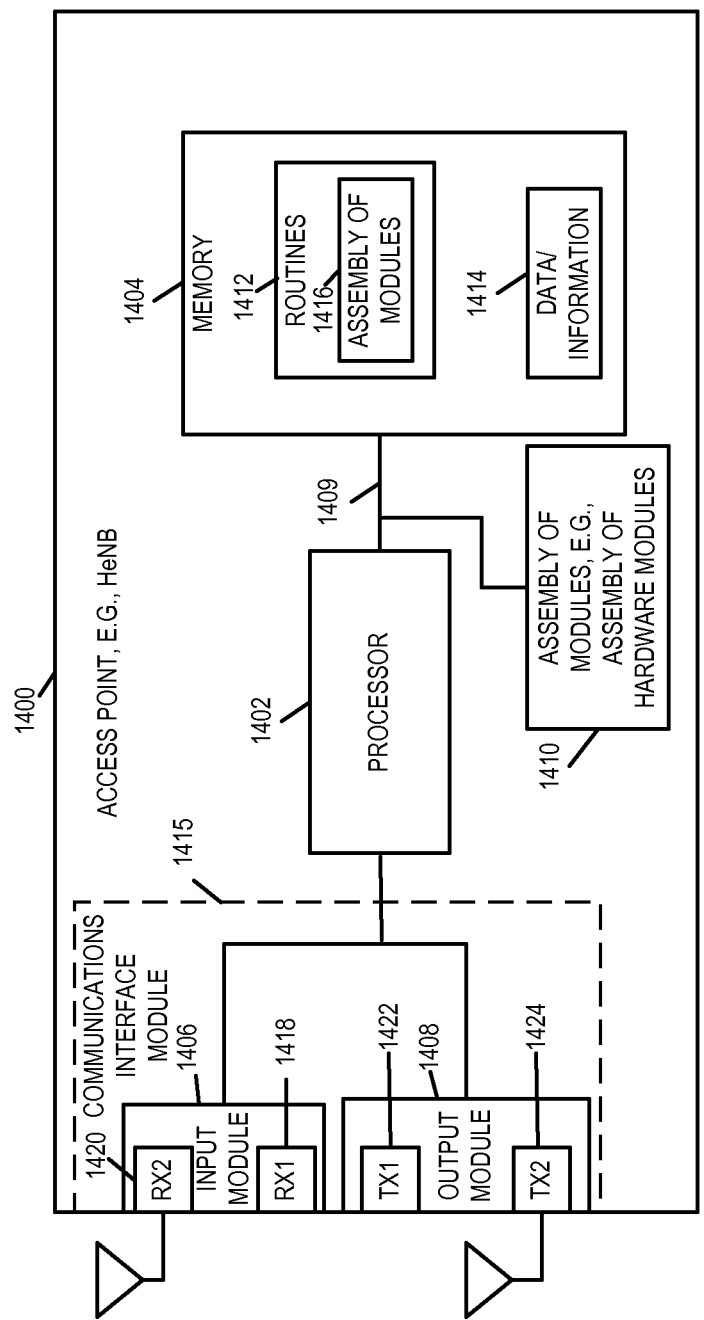
FIG. 14 is a drawing of an exemplary access point, e.g., a HeNB, in accordance with an exemplary embodiment.

FIG. 14 is a drawing of an exemplary access point 1400, e.g., a HeNB, in accordance with an exemplary embodiment. Exemplary access point 1400 is, e.g., HeNB 108 of system 100 of FIG. 1 or FIG. 2, HeNB 108' of FIG. 3, HeNB 108" of FIG. 4, HeNB 108''' of FIG. 5, and/or an access point implementing steps of the one or more of the methods of FIG. 6-10.

Access point 1400, e.g., a HeNB, includes a processor 1402, e.g., a CPU, memory 1404, and an assembly of modules 1410, e.g., an assembly of hardware modules, coupled together via a bus 1409 over which the various elements may exchange data and information. Access point 1400 further includes an input module 1406 and an output module 1408, which are coupled to the processor 1402. In various the input module 1406 and the output module 1408 are included as part of a communications interface module 1415. In various embodiments, communications interface module 1415 includes interfaces for communications with different types of devices, e.g., HGWs, UEs, SGWs, a PGWs, DNSs, MMEs, management devices, etc. and/or supporting a plurality of different communications protocols. The input module 1406 and/or output module 1408 may, and in some embodiments do, include a plurality of different ports and/or interfaces. Input module 1406 includes a plurality of receivers including a first receiver RX 1 1418 and a second receiver RX 2 1420, which is a wireless receiver. Output module 1408 includes a plurality of transmitters including a first transmitter TX 1 1422 and a second transmitter TX 2 1424, which is a wireless transmitter.

Access point 1400 receives signals including messages via input module 1406. Exemplary signals received by receiver RX 1 1418 include primary transport connection establishment signals, secondary transport connection establishment signals, path switch request acknowledgment signals, fault detection notification messages, and maintenance notification messages. Exemplary signals received by receiver RX 2 include UE connection establishment signals.

Access point 1400 transmits signals including messages via output module 1408. Exemplary signals transmitted by transmitter TX 1 1422 include primary transport connection establishment signals, secondary transport connection establishment signals, path switch request signals, and UE context release request signals. Exemplary signals transmitted by transmitter TX 2 1424 include UE connection establishment signals.

Memory 1404 includes routines 1412 and data/information 1414. Routines 1412 includes an assembly of modules 1416.

Figure 15:
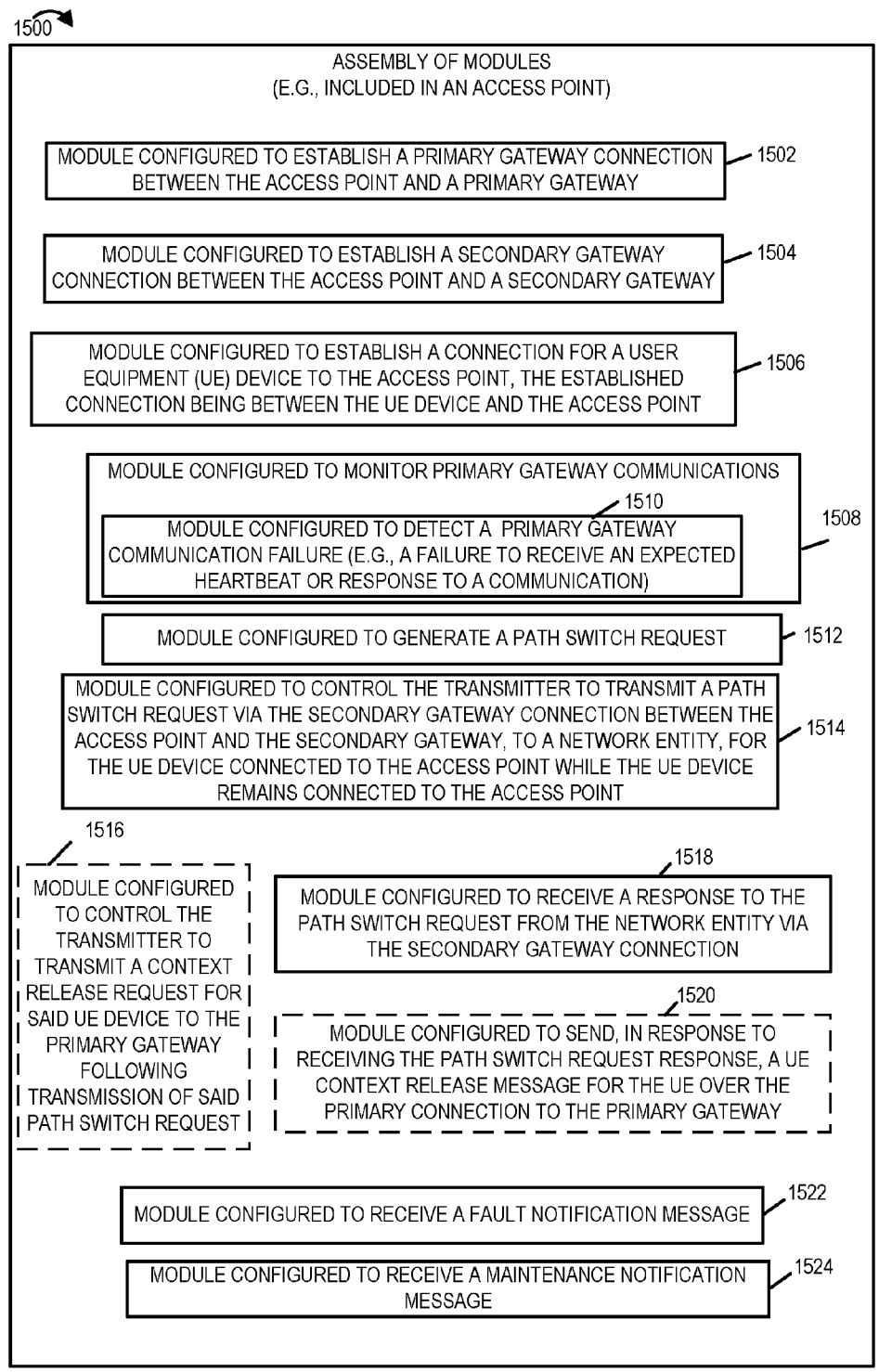
FIG. 15 is a drawing of an assembly of modules which may be included in an exemplary access point, e.g., a HeNB, in accordance with an exemplary embodiment.

FIG. 15 is a drawing of an assembly of modules 1500 which may be included in an exemplary access point, e.g., an exemplary HeNB, in accordance with an exemplary embodiment. Assembly of modules 1500 which can, and in some embodiments is, used in the access point 1400. The modules in the assembly of modules 1500 can, and in some embodiments are, implemented fully in hardware within the processor 1402, e.g., as individual circuits. The modules in the assembly of modules 1500 can, and in some embodiments are, implemented fully in hardware within the assembly of modules 1410, e.g., as individual circuits corresponding to the different modules. In other embodiments some of the modules are implemented, e.g., as circuits, within the processor 1402 with other modules being implemented, e.g., as circuits within assembly of modules 1410, external to and coupled to the processor 1402. As should be appreciated the level of integration of modules on the processor and/or with some modules being external to the processor may be one of design choice.

Alternatively, rather than being implemented as circuits, all or some of the modules may be implemented in software and stored in the memory 1404 of the access point 1400, with the modules controlling operation of access point 1400 to implement the functions corresponding to the modules when the modules are executed by a processor, e.g., processor 1402. In some such embodiments, the assembly of modules 1500 is included in the memory 1404 as assembly of modules 1416. In still other embodiments, various modules in assembly of modules 1500 are implemented as a combination of hardware and software, e.g., with another circuit external to the processor providing input to the processor 1402 which then under software control operates to perform a portion of a module's function. While shown in the FIG. 14 embodiment as a single processor, e.g., computer, it should be appreciated that the processor 1402 may be implemented as one or more processors, e.g., computers.

When implemented in software the modules include code, which when executed by the processor 1402, configure the processor 1402 to implement the function corresponding to the module. In embodiments where the assembly of modules 1500 is stored in the memory 1404, the memory 1404 is a computer program product comprising a computer readable medium comprising code, e.g., individual code for each module, for causing at least one computer, e.g., processor 1402, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 15 control and/or configure the access point 1400 or elements therein such as the processor 1402, to perform the functions of corresponding steps illustrated in the method of one or more of the signaling drawing of FIGS. 2-5 and/or one or more of the flowcharts of FIGS. 6-10. Thus the assembly of modules 1500 includes various modules that perform functions of corresponding steps of one or more of FIGS. 2-10.

Assembly of modules 1500 includes a module 1502 configured to establish a primary gateway connection between the access point and a primary gateway, a module 1504 configured to establish a secondary connection between the access point and a secondary gateway, a module 1506 configured to establish a connection for a user equipment (UE) device to the access point, the established connection being between the UE device and the access point. Assembly of modules 1500 further includes a module 1508 configured to monitor primary gateway communications. Module 1508 includes a module 1510 configured to detect at the access point a primary gateway communications failure, e.g., a failure to receive an expected heartbeat or response to a communication. Assembly of modules 1500 further includes a module 1512 configured to generate a path switch request, a module 1514 configured to control the transmitter ti transmit a path switch request via the secondary gateway connection between the access point and the secondary gateway, to a network entity, for the UE device connected to the access point which the UE device remains connected to the access point. Assembly of modules 1500 further includes a module 1516 configured to control the transmitter to transmit a context release request for said UE device to the primary gateway following transmission of the path switch request, a module 1518 configured to receive a response to the path switch request from the network entity via the secondary gateway connection, and a module 1520 configured to send, in response to receiving the path switch request response a UE context release message for the UE over the primary connection to the primary gateway. In some embodiments, assembly of modules 1500 includes one or module 1516 and 1520.

Assembly of modules 1500 further includes a module 1522 configured to receive a fault notification message, e.g., from a management device which detected a fault condition with the first datacenter. Assembly of modules 1500 further includes a module 1524 configured to receive a maintenance notification message, e.g., from a management device which has determined a scheduled maintenance operation is to be performed on the first data center.

In some embodiments, the access point is an LTE HeNB. In some embodiments, the path switch request is an request to update data and signaling paths corresponding to the UE device. In various embodiments, the path switch request is an LTE S1AP Path Switch Request.

In various embodiments, module 1514 is configured to control the transmitter to transmit a path switch request in response to module 1510 detecting a primary gateway communications fail. In various embodiments, module 1514 is configured to control the transmitter to transmit a path switch request in response to module 1522 receiving a fault notification message, e.g., a management device has detected a primary gateway communications fail and sent the fault notification message. In various embodiments, module 1514 is configured to control the transmitter to transmit a path switch request in response to module 1524 receiving a maintenance notification message.

Figure 16:
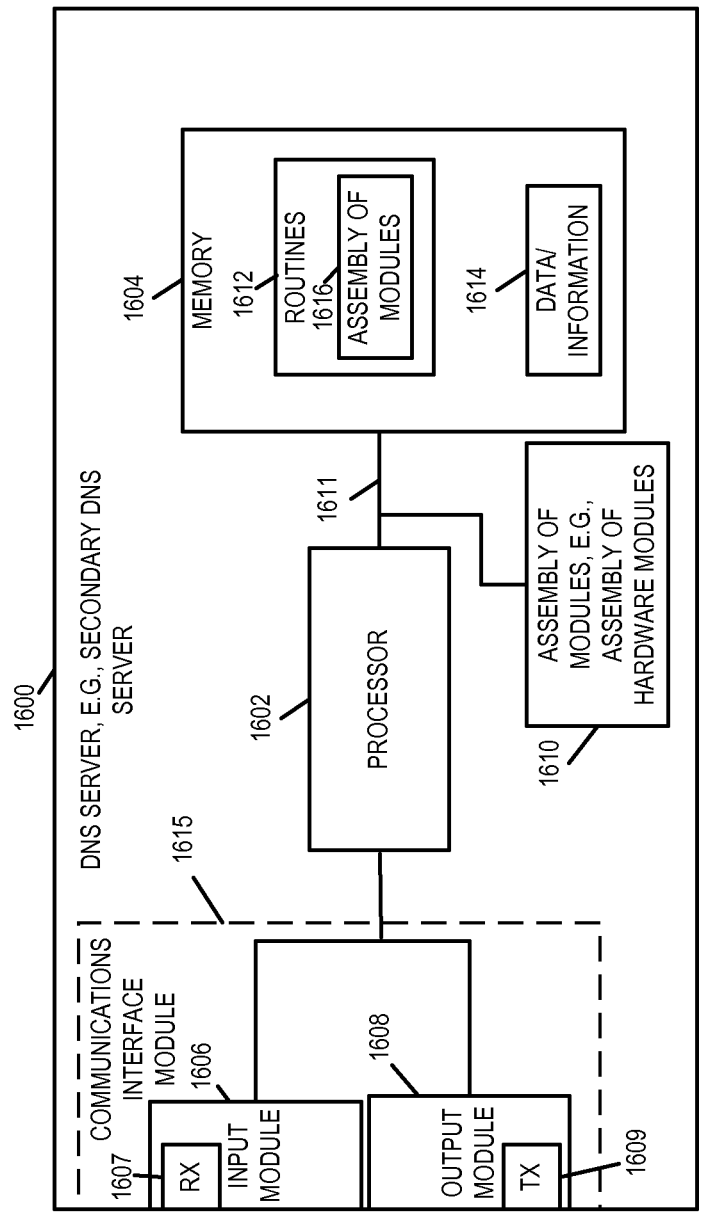
FIG. 16 is a drawing of an exemplary DNS, e.g, a secondary DNS server, in accordance with an exemplary embodiment.

FIG. 16 is a drawing of an exemplary DNS server 1600, e.g., a secondary DNS server, in accordance with an exemplary embodiment. Exemplary DNS server 1600 is, e.g., DNS 2 126 of system 100 of FIG. 1 or FIG. 2, DNS 2 126' of FIG. 3, DNS 2" of FIG. 4, DNS 2'" 126'" of FIG. 5, and/or an DNS implementing steps of the one or more of the methods of FIG. 6-10.

DNS server 1600, e.g., a secondary DNS server, includes a processor 1602, e.g., a CPU, memory 1604, and an assembly of modules 1610, e.g., an assembly of hardware modules, coupled together via a bus 1611 over which the various elements may exchange data and information. DNS server 1600 further includes an input module 1606 and an output module 1608, which are coupled to the processor 1602. In various embodiments, the input module 1606 and the output module 1608 are included as part of a communications interface module 1615. In various embodiments, communications interface module 1615 includes interfaces for communications with different types of devices, e.g., other DNSs, HGWs, SGWs, MMEs, HeNBs, management devices, etc. and/or supporting a plurality of different communications protocols. The input module 1606 and/or output module 1608 may, and in some embodiments do, include a plurality of different ports and/or interfaces. Input module 1606 includes one or more receivers including RX 1607. Output module 1608 includes one or more transmitters including a transmitter TX 1609.

DNS server 1600 receives signals including messages via input module 1606. Exemplary signals received by receiver RX 1607 include DNS request messages, and dynamic DNS update messages.

DNS server 1600 transmits signals including messages via output module 1608. Exemplary signals transmitted by transmitter TX 1609 include DNS response messages.

Memory 1604 includes routines 1612 and data/information 1614. Routines 1612 includes an assembly of modules 1616. Data/information 1614, in some embodiments, includes mapping information, e.g., exemplary mapping tables, such as illustrated in one or more of FIGS. 11-13.

Figure 17:
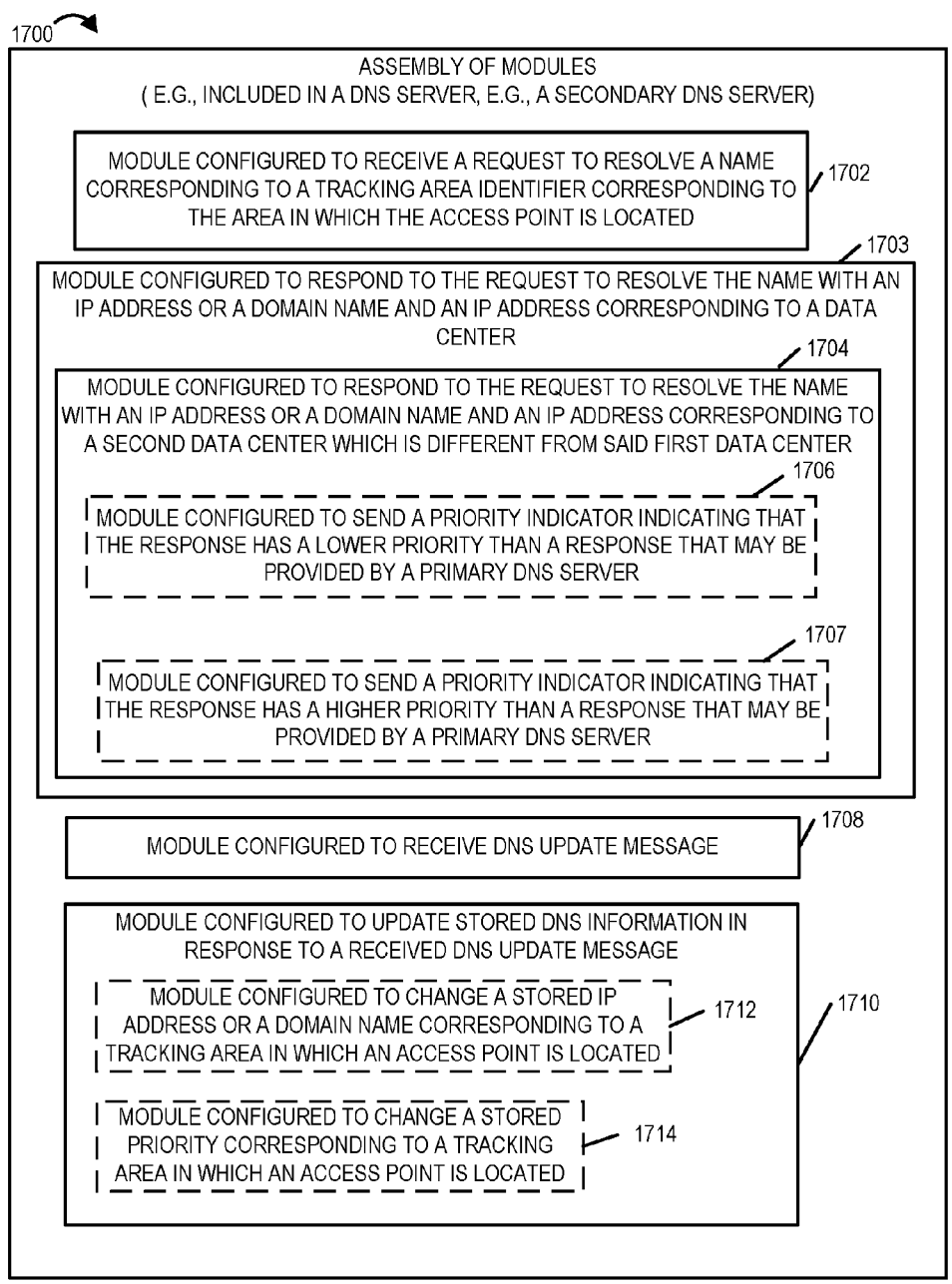
FIG. 17 is a drawing of an assembly of modules which may be included in an exemplary DNS server of FIG. 16 in accordance with an exemplary embodiment.

FIG. 17 is a drawing of an assembly of modules 1700 which may be included in an exemplary DNS server in accordance with an exemplary embodiment. Assembly of modules 1700 can be, and in some embodiments is, used in DNS server 1600. The modules in the assembly of modules 1700 can, and in some embodiments are, implemented fully in hardware within the processor 1602, e.g., as individual circuits. The modules in the assembly of modules 1600 can, and in some embodiments are, implemented fully in hardware within the assembly of modules 1610, e.g., as individual circuits corresponding to the different modules. In other embodiments some of the modules are implemented, e.g., as circuits, within the processor 1602 with other modules being implemented, e.g., as circuits within assembly of modules 1610, external to and coupled to the processor 1602. As should be appreciated the level of integration of modules on the processor and/or with some modules being external to the processor may be one of design choice. Alternatively, rather than being implemented as circuits, all or some of the modules may be implemented in software and stored in the memory 1604 of the DNS server 1600, with the modules controlling operation of DNS server 1600 to implement the functions corresponding to the modules when the modules are executed by a processor, e.g., processor 1602. In some such embodiments, the assembly of modules 1700 is included in the memory 1604 as assembly of modules 1616. In still other embodiments, various modules in assembly of modules 1700 are implemented as a combination of hardware and software, e.g., with another circuit external to the processor providing input to the processor 1602 which then under software control operates to perform a portion of a module's function. While shown in the FIG. 16 embodiment as a single processor, e.g., computer, it should be appreciated that the processor 1602 may be implemented as one or more processors, e.g., computers.

When implemented in software the modules include code, which when executed by the processor 1602, configure the processor 1602 to implement the function corresponding to the module. In embodiments where the assembly of modules 1700 is stored in the memory 1604, the memory 1604 is a computer program product comprising a computer readable medium comprising code, e.g., individual code for each module, for causing at least one computer, e.g., processor 1602, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 17 control and/or configure the DNS server 1600 or elements therein such as the processor 1602, to perform the functions of corresponding steps illustrated in the method of one or more of the signaling drawing of FIGS. 2-5 and/or one or more of the flowcharts of FIGS. 6-10. Thus the assembly of modules 1700 includes various modules that perform functions of corresponding steps of one or more of FIGS. 2-10.

Assembly of modules 1700 includes a module 1702 configured to receive a request to resolve a name corresponding to a tracking area identifier corresponding to the area in which the access point is located, and a module 1703 configured to respond to the request to resolve the name with an IP address or a domain name and an IP address corresponding to a data center. In some embodiments, module 1703 includes a module 1704 configured to respond to the request to resolve the name with an IP address or a domain name and an IP address corresponding to a second data center which is different from the first data center. In various embodiments, module 1704 includes a module 1706 configured to send a priority indicator indicating that the response has a lower priority than a response that may be provided by a primary DNS server. In various embodiments, module 1704 includes a module 1707 configured to send a priority indicator indicating that the response has a higher priority than a response that may be provided by a primary DNS server, e.g., the priority may have been updated in response to a received dynamic DNS update message so that the secondary DNS server will have higher priority than the primary DNS server. Assembly of modules 1700 further includes a module 1708 configured to receive a DNS update message, e.g., from a management device or from another DNS server. Assembly of module 1700 further includes a module 1710 configured to update stored DNS information in response to a received DNS update message. In various embodiments, module 1710 includes one or both of a module 1712 configured to change a stored IP address or a domain name corresponding to a tracking area in which an access point is located, and a module 1714 configured to change a stored priority corresponding to a tracking area in which an access point is located. FIG. 12 and FIG. 12A each illustrates exemplary updating which may be performed by module 1712. FIG. 13 and FIG. 13A illustrates exemplary updating which may be performed by module 1714.

Figure 18:
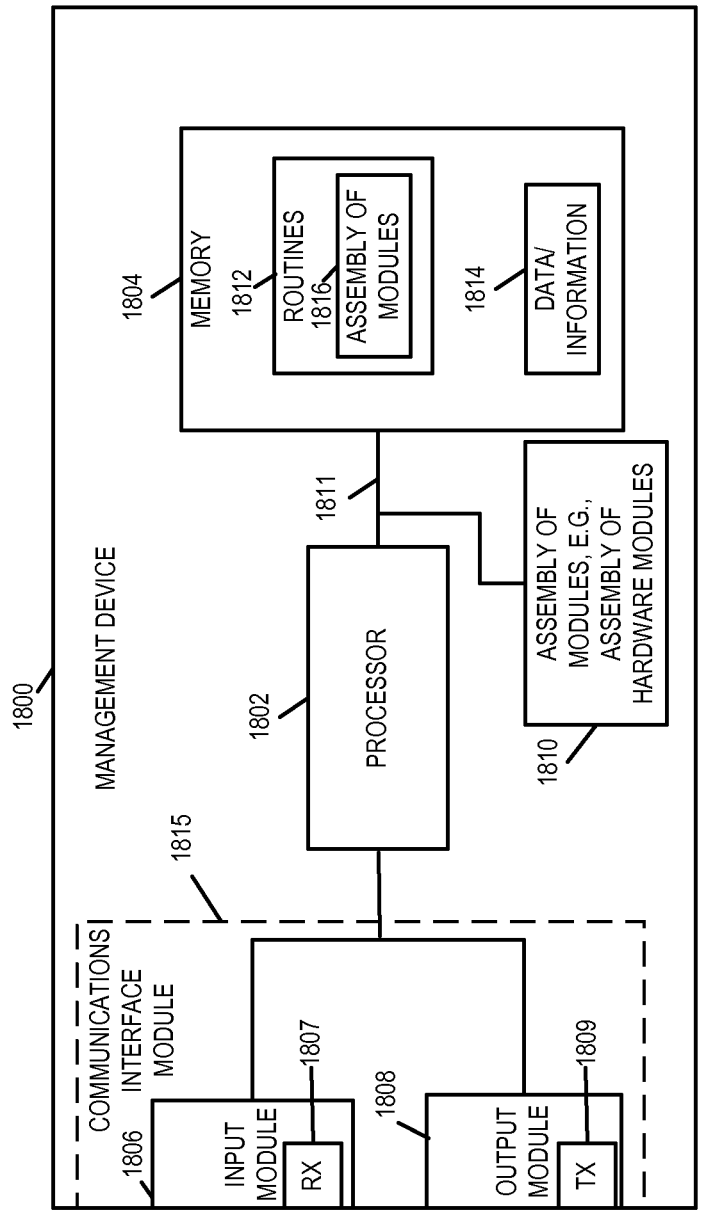
FIG. 18 is a drawing of an exemplary management device in accordance with an exemplary embodiment.

FIG. 18 is a drawing of an exemplary management device 1800 in accordance with an exemplary embodiment. Exemplary management device 1800 is, e.g., management device 125 of system 100 of FIG. 1, management device 125' of FIG. 3, management device 125" of FIG. 4, management device 125''' of FIG. 5, and/or a management device implementing steps of the one or more of the methods of FIG. 6-10.

Management device 1800 includes a processor 1802, e.g., a CPU, memory 1804, and an assembly of modules 1810, e.g., an assembly of hardware modules, coupled together via a bus 1811 over which the various elements may exchange data and information. Management device 1800 further includes an input module 1806 and an output module 1808, which are coupled to the processor 1802. In various embodiments, the input module 1806 and the output module 1808 are included as part of a communications interface module 1815. In various embodiments, communications interface module 1815 includes interfaces for communications with different types of devices, e.g., DNSs, HGWs, SGWs, MMEs, HeNBs, PGWs., etc. and/or supporting a plurality of different communications protocols. The input module 1806 and/or output module 1808 may, and in some embodiments do, include a plurality of different ports and/or interfaces. Input module 1806 includes one or more receivers including RX 1807. Output module 1808 includes one or more transmitters including a transmitter TX 1809.

Management device 1800 receives signals including messages via input module 1806. Exemplary signals received by receiver RX 1807 include monitored signals, e.g., monitored communication signals of transport connections between access points and HGWs, monitored heartbeat signals, monitored device status signals, monitored datacenter status signals, and monitored fault indication signals.

Management device 1800 transmits signals including messages via output module 1808. Exemplary signals transmitted by transmitter TX 1809 include fault notification messages, maintenance notification messages, and dynamic DNS update messages.

Memory 1804 includes routines 1812 and data/information 1814. Routines 1812 includes an assembly of modules 1816.

Figure 19:
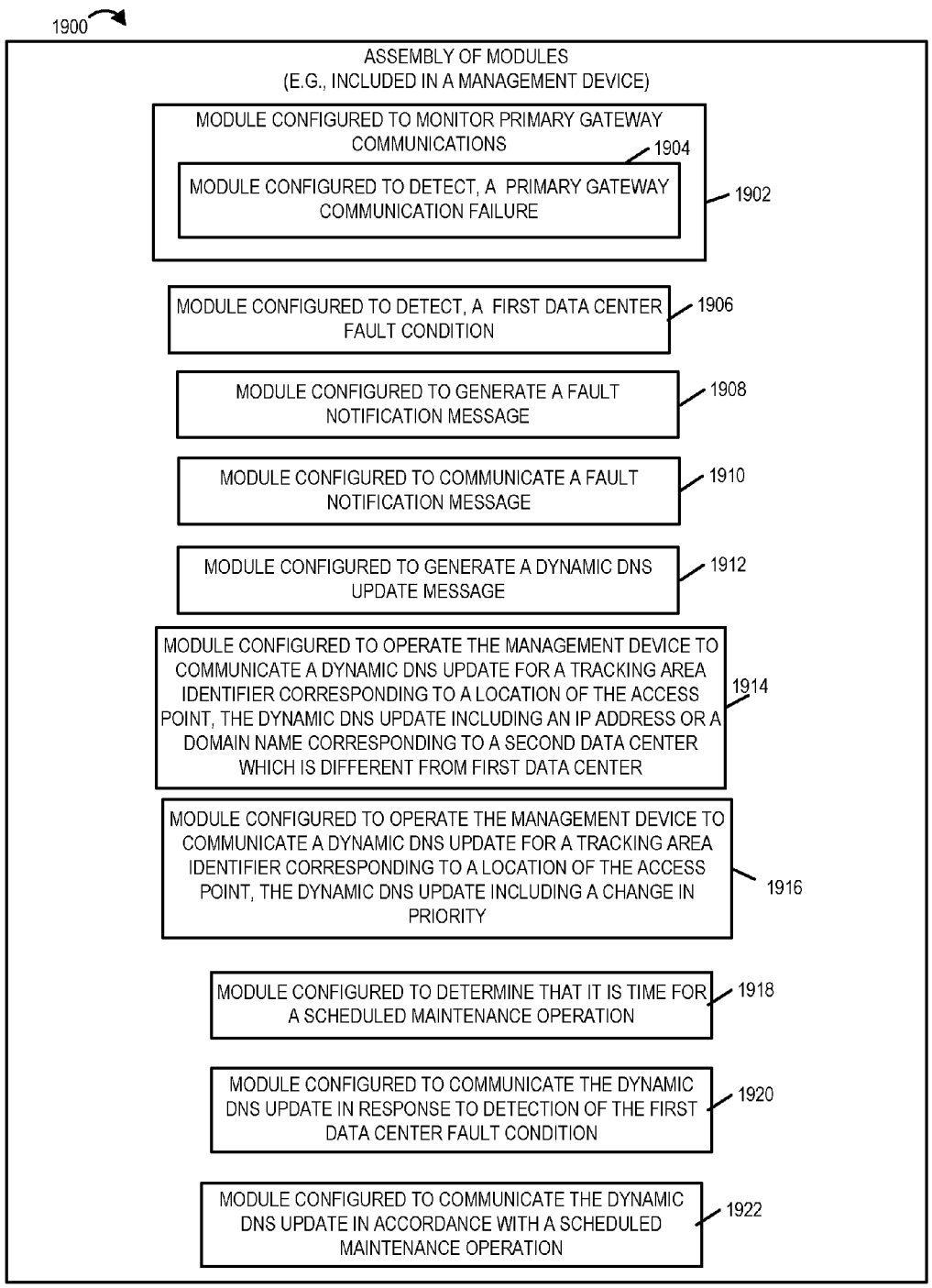
FIG. 19 is a drawing of an assembly of modules which may be included in an exemplary management device in accordance with an exemplary embodiment.

FIG. 19 is a drawing of an assembly of modules 1900 which may be included in an exemplary management device in accordance with an exemplary embodiment. Assembly of modules 1900 can be, and in some embodiments is, used in management device 1800. The modules in the assembly of modules 1900 can be, and in some embodiments are, implemented fully in hardware within the processor 1802, e.g., as individual circuits. The modules in the assembly of modules 1900 can, and in some embodiments are, implemented fully in hardware within the assembly of modules 1810, e.g., as individual circuits corresponding to the different modules. In other embodiments some of the modules are implemented, e.g., as circuits, within the processor 1802 with other modules being implemented, e.g., as circuits within assembly of modules 1810, external to and coupled to the processor 1802. As should be appreciated the level of integration of modules on the processor and/or with some modules being external to the processor may be one of design choice.

Alternatively, rather than being implemented as circuits, all or some of the modules may be implemented in software and stored in the memory 1804 of the management device 1800, with the modules controlling operation of management device 1800 to implement the functions corresponding to the modules when the modules are executed by a processor, e.g., processor 1602. In some such embodiments, the assembly of modules 1900 is included in the memory 1804 as assembly of modules 1816. In still other embodiments, various modules in assembly of modules 1900 are implemented as a combination of hardware and software, e.g., with another circuit external to the processor providing input to the processor 1802 which then under software control operates to perform a portion of a module's function. While shown in the FIG. 18 embodiment as a single processor, e.g., computer, it should be appreciated that the processor 1802 may be implemented as one or more processors, e.g., computers.

When implemented in software the modules include code, which when executed by the processor 1802, configure the processor 1802 to implement the function corresponding to the module. In embodiments where the assembly of modules 1900 is stored in the memory 1804, the memory 1804 is a computer program product comprising a computer readable medium comprising code, e.g., individual code for each module, for causing at least one computer, e.g., processor 1802, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 19 control and/or configure the management device 1900 or elements therein such as the processor 1802, to perform the functions of corresponding steps illustrated in the method of one or more of the signaling drawing of FIGS. 2-5 and/or one or more of the flowcharts of FIGS. 6-10. Thus the assembly of modules 1900 includes various modules that perform functions of corresponding steps of one or more of FIGS. 2-10.

Assembly of modules 1900 includes a module 1902 configured to monitor primary gateway communications. Module 1902 includes a module 1904 configured to detect a primary gateway communications failure. Assembly of modules 1900 further includes a module 1906 configured to detect a first data center fault condition, a module 1908 configured to generate a fault notification message, a module 1910 configured to communicate a fault notification message, a module 1912 configured to generate a dynamic DNS update message, a module 1914 configured to operate the management device to communicate a dynamic DNS update for a tracking area identifier correspond to a location of the access point, the dynamic DNS update including an IP address or a domain name corresponding to a second data center which is differ from the first data center, a module 1916 configured to operate the management device to communicate a dynamic DNS update for a tracking area identifier corresponding to the location of the access point, the dynamic DNS update including a change in priority, e.g., the priority of the second data center is increased and the priority of the first data center is decreased. Assembly of module 1900 further includes a module 1918 configured to determine that it is time for a scheduled maintenance operation, a module 1920 configured to communicate the dynamic update in response to detection of a first data center fault condition, and a module 1922 configured to communicate the dynamic DNS update in accordance with a scheduled maintenance operation.

Figure 20:
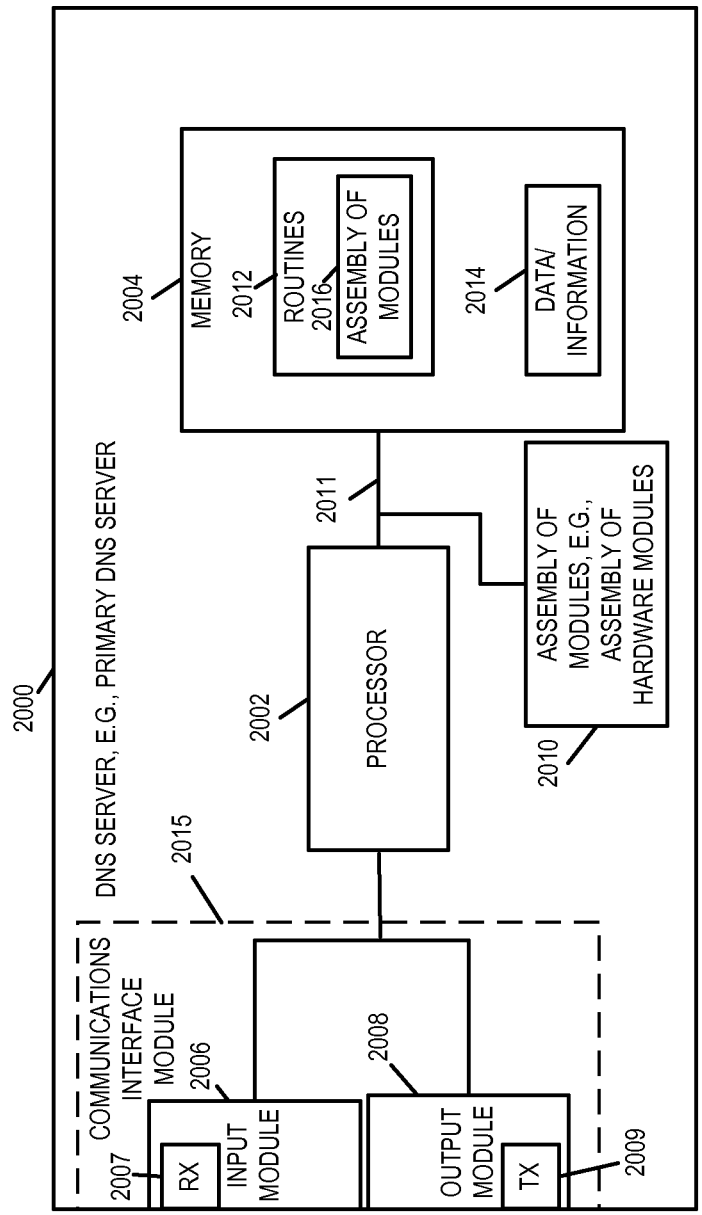
FIG. 20 is a drawing of an exemplary DNS server, e.g., a primary DNS server, in accordance with an exemplary embodiment.

FIG. 20 is a drawing of an exemplary DNS server 2000, e.g., a primary DNS server, in accordance with an exemplary embodiment. Exemplary DNS server 2000 is, e.g., DNS 1 118 of system 100 of FIG. 1 or FIG. 2, DNS 1 118' of FIG. 3, DNS 1 118" of FIG. 4, DNS 1''' 118''' of FIG. 5, and/or an DNS implementing steps of the one or more of the methods of FIG. 6-10.

DNS server 2000, e.g., a primary DNS server, includes a processor 2002, e.g., a CPU, memory 2004, and an assembly of modules 2010, e.g., an assembly of hardware modules, coupled together via a bus 2011 over which the various elements may exchange data and information. DNS server 2000 further includes an input module 2006 and an output module 2008, which are coupled to the processor 2002. In various embodiments, the input module 2006 and the output module 2008 are included as part of a communications interface module 2015. In various embodiments, communications interface module 2015 includes interfaces for communications with different types of devices, e.g., other DNSs, HGWs, SGWs, MMEs, HeNBs, management devices, etc. and/or supporting a plurality of different communications protocols. The input module 2006 and/or output module 2008 may, and in some embodiments do, include a plurality of different ports and/or interfaces. Input module 2006 includes one or more receivers including RX 2007. Output module 2008 includes one or more transmitters including a transmitter TX 2009.

DNS server 2000 receives signals including messages via input module 2006. Exemplary signals received by receiver RX 2007 include DNS request messages, and dynamic DNS update messages.

DNS server 2000 transmits signals including messages via output module 2008. Exemplary signals transmitted by transmitter TX 2009 include DNS response messages.

Memory 2004 includes routines 2012 and data/information 2014. Routines 2012 includes an assembly of modules 2016. Data/information 2014, in some embodiments, includes mapping information, e.g., exemplary mapping tables, such as illustrated in one or more of FIGS. 11-13.

Figure 21:
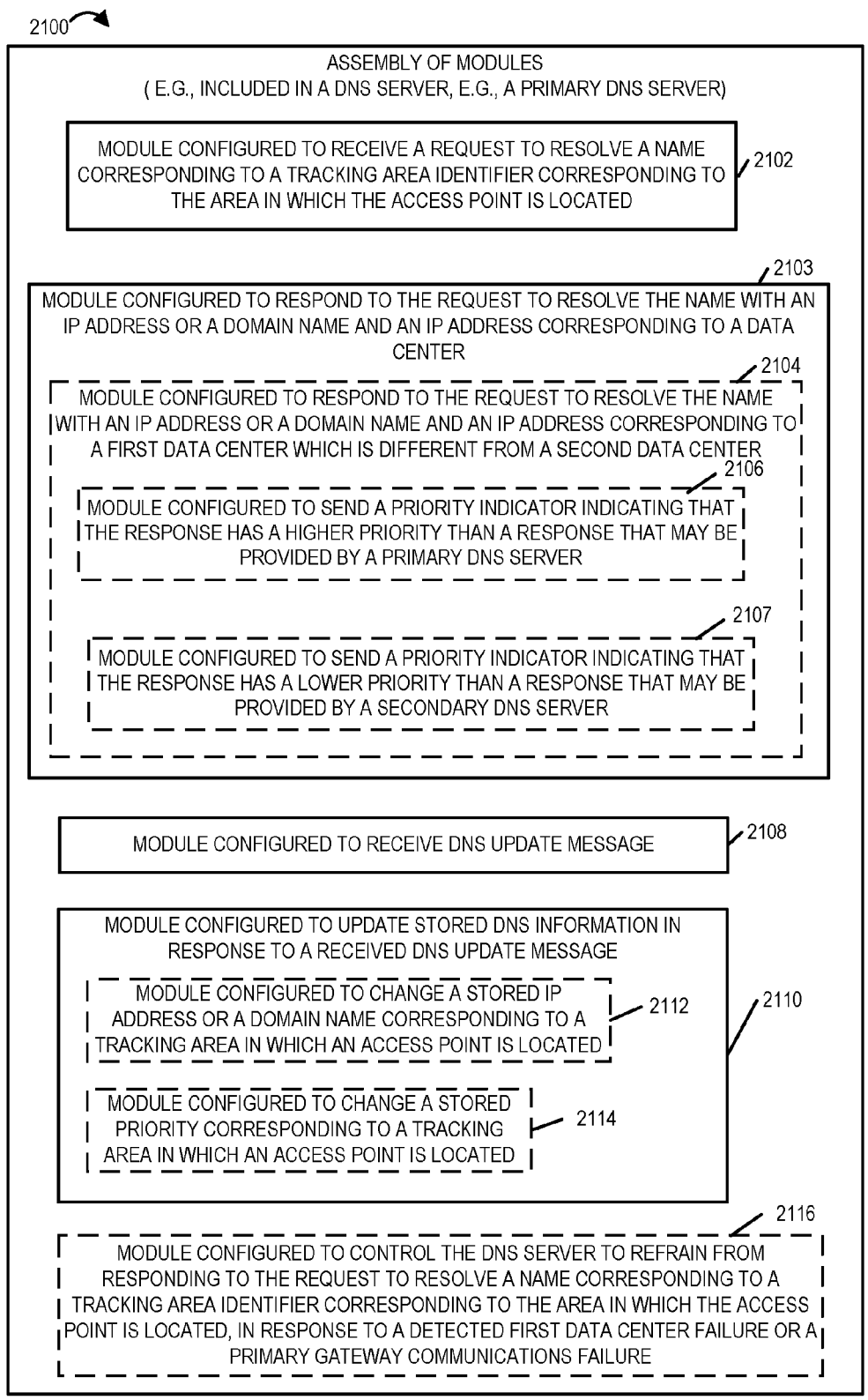
FIG. 21 is a drawing of an assembly of modules which may be included in an exemplary DNS server of FIG. 20 in accordance with an exemplary embodiment.

FIG. 21 is a drawing of an assembly of modules 2100 which may be included in an exemplary DNS server in accordance with an exemplary embodiment. Assembly of modules 2100 can be, and in some embodiments is, used in DNS server 2000. The modules in the assembly of modules 2100 can, and in some embodiments are, implemented fully in hardware within the processor 2002, e.g., as individual circuits. The modules in the assembly of modules 2100 can, and in some embodiments are, implemented fully in hardware within the assembly of modules 2010, e.g., as individual circuits corresponding to the different modules. In other embodiments some of the modules are implemented, e.g., as circuits, within the processor 2002 with other modules being implemented, e.g., as circuits within assembly of modules 2010, external to and coupled to the processor 2002. As should be appreciated the level of integration of modules on the processor and/or with some modules being external to the processor may be one of design choice. Alternatively, rather than being implemented as circuits, all or some of the modules may be implemented in software and stored in the memory 2004 of the DNS server 2000, with the modules controlling operation of DNS server 2000 to implement the functions corresponding to the modules when the modules are executed by a processor, e.g., processor 2002. In some such embodiments, the assembly of modules 2100 is included in the memory 2004 as assembly of modules 2016. In still other embodiments, various modules in assembly of modules 1700 are implemented as a combination of hardware and software, e.g., with another circuit external to the processor providing input to the processor 2002 which then under software control operates to perform a portion of a module's function. While shown in the FIG. 20 embodiment as a single processor, e.g., computer, it should be appreciated that the processor 2002 may be implemented as one or more processors, e.g., computers.

When implemented in software the modules include code, which when executed by the processor 2002, configure the processor 2002 to implement the function corresponding to the module. In embodiments where the assembly of modules 2100 is stored in the memory 2004, the memory 2004 is a computer program product comprising a computer readable medium comprising code, e.g., individual code for each module, for causing at least one computer, e.g., processor 2002, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 21 control and/or configure the DNS server 2000 or elements therein such as the processor 2002, to perform the functions of corresponding steps illustrated in the method of one or more of the signaling drawing of FIGS. 2-5 and/or one or more of the flowcharts of FIGS. 6-10. Thus the assembly of modules 2100 includes various modules that perform functions of corresponding steps of one or more of FIGS. 2-10.

Assembly of modules 2100 includes a module 2102 configured to receive a request to resolve a name corresponding to a tracking area identifier corresponding to the area in which the access point is located, and a module 2103 configured to respond to the request to resolve the name with an IP address or a domain name and an IP address corresponding to a data center. In some embodiments, module 2103 includes a module 2104 configured to respond to the request to resolve the name with an IP address or a domain name and an IP address corresponding to a first data center which is different from the second data center. In various embodiments, module 2104 includes a module 2106 configured to send a priority indicator indicating that the response has a higher priority than a response that may be provided by a secondary DNS server. In various embodiments, module 2104 includes a module 2107 configured to send a priority indicator indicating that the response has a lower priority than a response that may be provided by a secondary DNS server, e.g., the priority may have been updated in response to a received dynamic DNS update message so that the secondary DNS server will have higher priority than the primary DNS server. Assembly of modules 2100 further includes a module 2108 configured to receive a DNS update message, e.g., from a management device or from another DNS server. Assembly of module 2100 further includes a module 2110 configured to update stored DNS information in response to a received DNS update message. In various embodiments, module 2110 includes one or both of a module 2112 configured to change a stored IP address or a domain name corresponding to a tracking area in which an access point is located, and a module 2114 configured to change a stored priority corresponding to a tracking area in which an access point is located. FIG. 12 and FIG. 12A each illustrates exemplary updating which may be performed by module 2112. FIG. 13 and FIG. 13A illustrate exemplary updating which may be performed by module 2114.

In some embodiments, assembly of modules 2100 includes a module 2116 configured to control the DNS server 2000 to refrain from responding to the request to resolve a name corresponding to a location in which the access point is located, in response to a detected first data center failure or a primary gateway communications failure.

Figure 22:
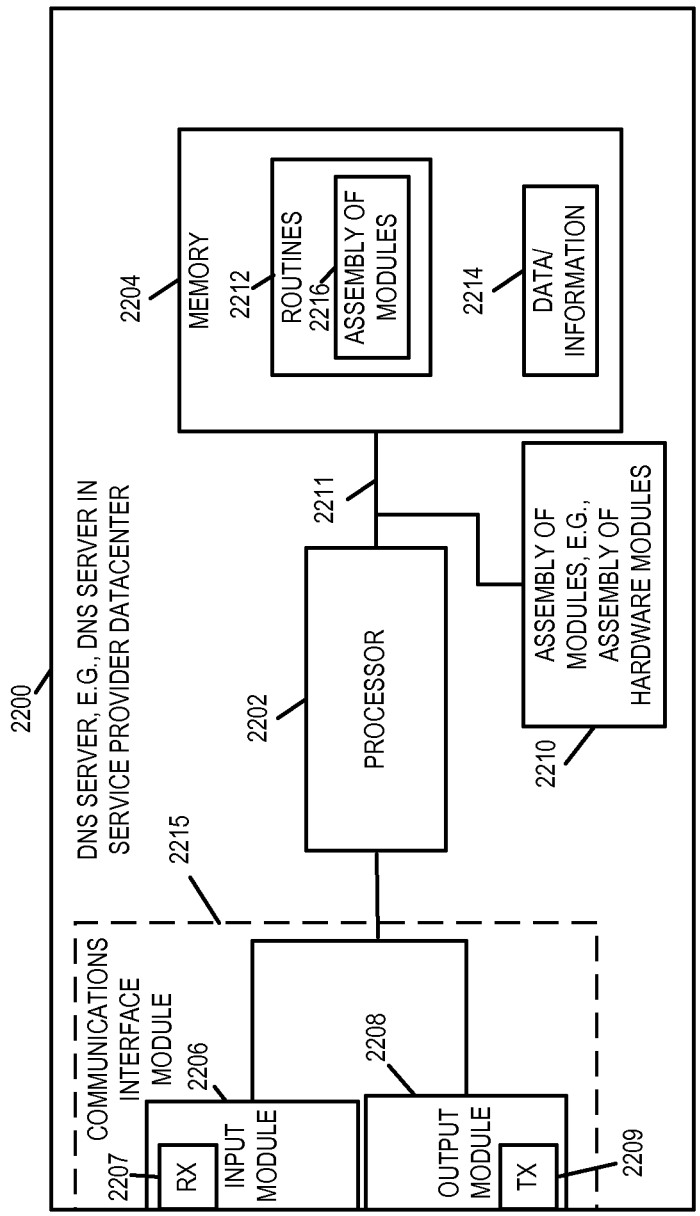
FIG. 22 is a drawing of an exemplary DNS server, e.g., a DNS server in a service provider datacenter, in accordance with an exemplary embodiment.

FIG. 22 is a drawing of an exemplary DNS server 2200, e.g., a DNS server in a service provider datacenter, in accordance with an exemplary embodiment. Exemplary DNS server 2200 is, e.g., DNS 115 of system 100 of FIG. 1 or FIG. 2, DNS 115' of FIG. 3, DNS 115" of FIG. 4, DNS 115'" of FIG. 5, and/or an DNS implementing steps of the one or more of the methods of FIG. 6-10.

DNS server 2200, e.g., a DNS of a service provider datacenter, includes a processor 2202, e.g., a CPU, memory 2204, and an assembly of modules 2210, e.g., an assembly of hardware modules, coupled together via a bus 2211 over which the various elements may exchange data and information. DNS server 2200 further includes an input module 2206 and an output module 2208, which are coupled to the processor 2202. In various embodiments, the input module 2206 and the output module 2208 are included as part of a communications interface module 2215. In various embodiments, communications interface module 2215 includes interfaces for communications with different types of devices, e.g., other DNSs, HGWs, SGWs, MMEs, HeNBs, management devices, etc. and/or supporting a plurality of different communications protocols. The input module 2206 and/or output module 2208 may, and in some embodiments do, include a plurality of different ports and/or interfaces. Input module 2206 includes one or more receivers including RX 2207. Output module 2208 includes one or more transmitters including a transmitter TX 2209.

DNS server 2200 receives signals including messages via input module 2206. Exemplary signals received by receiver RX 2207 include DNS request messages, DNS response messages, and dynamic DNS update messages.

DNS server 2200 transmits signals including messages via output module 2008. Exemplary signals transmitted by transmitter TX 2009 include DNS request messages and DNS response messages.

Memory 2204 includes routines 2212 and data/information 2214. Routines 2212 includes an assembly of modules 2216. Data/information 2214, in some embodiments, includes mapping information, e.g., exemplary mapping tables, such as illustrated in one or more of FIGS. 11-13.

Figure 23:
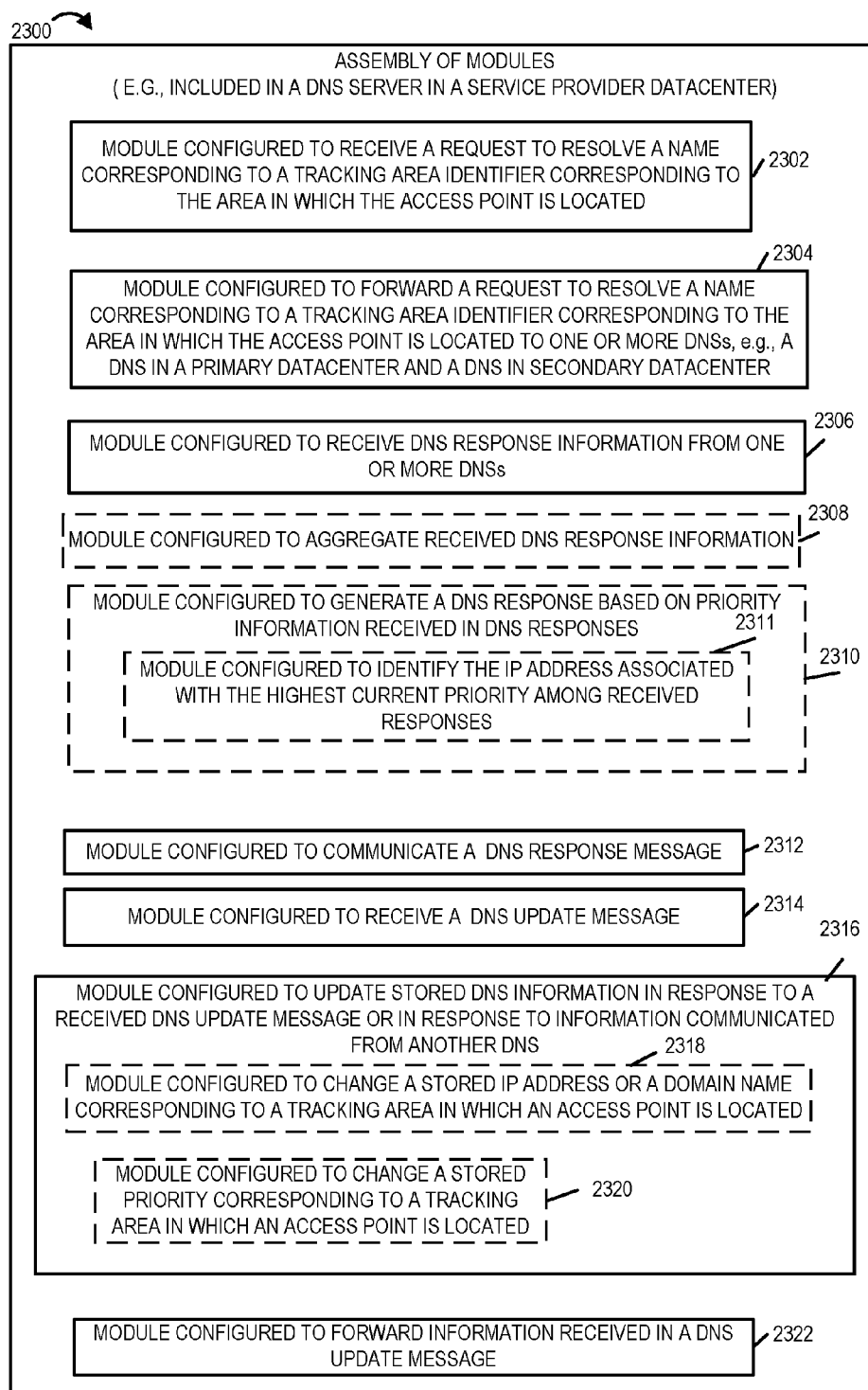
FIG. 23 is a drawing of an assembly of modules which may be included in an exemplary DNS server of FIG. 22 in accordance with an exemplary embodiment.

FIG. 23 is a drawing of an assembly of modules 2300 which may be included in an exemplary DNS server in accordance with an exemplary embodiment. Assembly of modules 2300 can be, and in some embodiments is, used in DNS server 2200. The modules in the assembly of modules 2300 can, and in some embodiments are, implemented fully in hardware within the processor 2202, e.g., as individual circuits. The modules in the assembly of modules 2300 can, and in some embodiments are, implemented fully in hardware within the assembly of modules 2210, e.g., as individual circuits corresponding to the different modules. In other embodiments some of the modules are implemented, e.g., as circuits, within the processor 2202 with other modules being implemented, e.g., as circuits within assembly of modules 2210, external to and coupled to the processor 2202. As should be appreciated the level of integration of modules on the processor and/or with some modules being external to the processor may be one of design choice. Alternatively, rather than being implemented as circuits, all or some of the modules may be implemented in software and stored in the memory 2204 of the DNS server 2200, with the modules controlling operation of DNS server 2200 to implement the functions corresponding to the modules when the modules are executed by a processor, e.g., processor 2202. In some such embodiments, the assembly of modules 2300 is included in the memory 2204 as assembly of modules 2216. In still other embodiments, various modules in assembly of modules 2300 are implemented as a combination of hardware and software, e.g., with another circuit external to the processor providing input to the processor 2202 which then under software control operates to perform a portion of a module's function. While shown in the FIG. 22 embodiment as a single processor, e.g., computer, it should be appreciated that the processor 2202 may be implemented as one or more processors, e.g., computers.

When implemented in software the modules include code, which when executed by the processor 2202, configure the processor 2202 to implement the function corresponding to the module. In embodiments where the assembly of modules 2300 is stored in the memory 2204, the memory 2204 is a computer program product comprising a computer readable medium comprising code, e.g., individual code for each module, for causing at least one computer, e.g., processor 2202, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 23 control and/or configure the DNS server 2200 or elements therein such as the processor 2202, to perform the functions of corresponding steps illustrated in the method of one or more of the signaling drawing of FIGS. 2-5 and/or one or more of the flowcharts of FIGS. 6-10. Thus the assembly of modules 2300 includes various modules that perform functions of corresponding steps of one or more of FIGS. 2-10.

Assembly of modules 2300 includes a module 2302 configured to receive a request to resolve a name corresponding to a tracking area identifier corresponding to an area in which an access point is located, a module 2304 configured to forward a request to resolve a name corresponding to a tracking area identifier corresponding to an area in which an access point is located to one or more DNSs, e.g., a DNS in a primary datacenter and a DNS in a secondary datacenter, and a module 2306 configured to receive DNS response information from one or more DNSs.

In some embodiments, assembly of modules 2300 includes a module 2308 configured to aggregate received DNS response information; e.g., generating a response message including the aggregated information. In some embodiments, the aggregated information includes priority information, e.g., different priority information associated with two different responses from two different DNSs corresponding to two different datacenters. In some embodiments, the DNS 2200 communicates a response message including multiple response, each including priority information, to an MME, and the MME identifies the response having the highest priority.

In some embodiments, assembly of modules 2300 includes a module 2310 configured to generate a DNS response based on priority information received in DNS responses, e.g., DNS server 2200 identifies and communicates the received response with the highest priority to the MME. In some embodiments, module 2310 includes a module 2311 configured to identify the IP address, e.g., SGW IP address, associated with the highest current priority among the received responses. Thus in some embodiments, the DNS 2200 filters the responses received from multiple DNS, e.g., a DNS in a primary datacenter and a DNS in a secondary data center, which may communicate different IP addresses, and selects and forwards the IP address corresponding to the highest current priority among the received alternative responses. In various embodiments, the priority associated with a particular datacenter may be, and sometimes is changed dynamically, e.g., in response to a scheduled maintenance or a detected problem, e.g., a failure condition at a datacenter or a failure condition on a transport connection.

Assembly of modules 2300 further includes a module 2312 configured to communicate a DNS response message, e.g., to the MME which previously communicated the corresponding request message to DNS 2200. In some embodiments, the response message may, and sometimes does, includes aggregated information corresponding to multiple DNSs. In some embodiments, the response message communicates the received response corresponding to the highest priority among received responses.

Assembly of modules 2300 further includes a module 2314 configured to receive a DNS update message, e.g., a dynamic DNS update message from a management device, a module 2322 configured to forward information received in a DNS update message, e.g., to other DNSs. Assembly of modules 2300 further includes a module 2316 configured to update stored DNS information in response to a received DNS update message or in response to information communicated from another DNS. In various embodiments, module 2316 includes one or both of a module 2318 configured to change a stored IP address or a domain name corresponding to a tracking are in which an access point is located, and a module 2320 configured to change a stored priority corresponding to a tracking area in which an access point is located.

Figure 24:
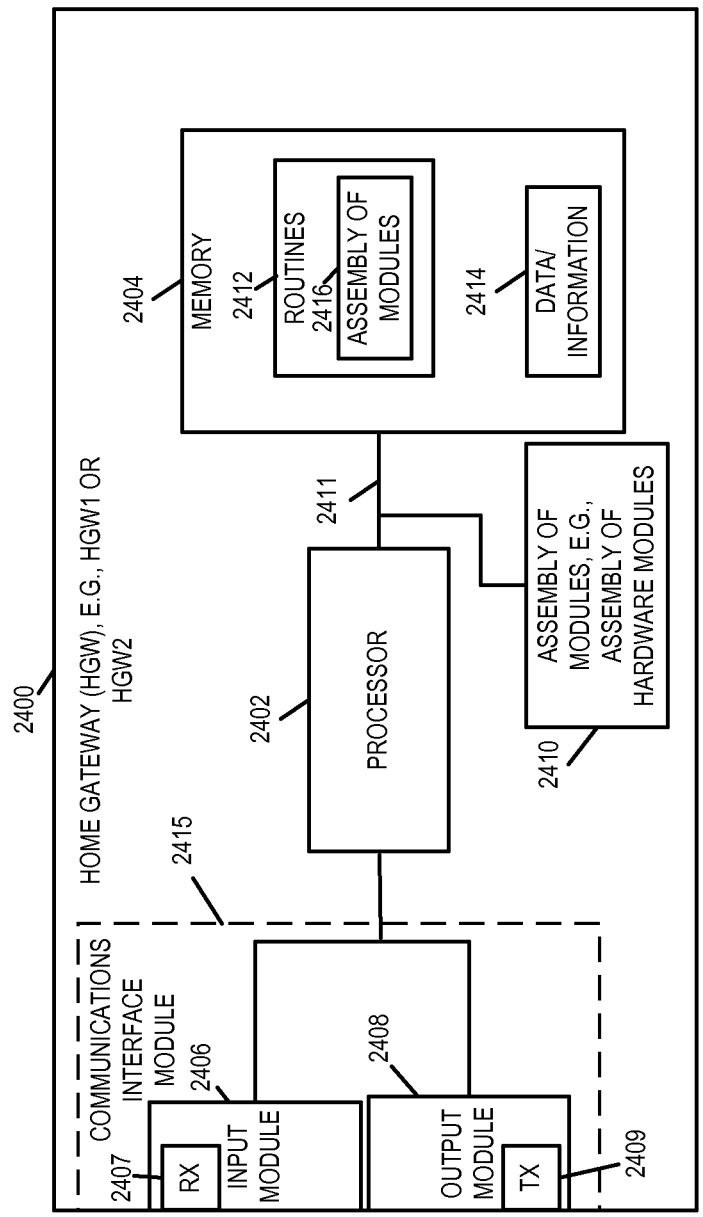
FIG. 24 is a drawing of an exemplary Home Gateway (HGW), in accordance with an exemplary embodiment.

FIG. 24 is a drawing of an exemplary Home Gateway (HGW) 2400, in accordance with an exemplary embodiment. Exemplary HGW 2400 is, e.g., HGW1 124 of system 100 of FIG. 1 or FIG. 2, HGW1 124' of FIG. 3, HGW1 124" of FIG. 4, HGW1 124''' of FIG. 5, HGW2 132 of system 100 of FIG. 1 or FIG. 2, HGW2 132' of FIG. 3, HGW2 132" of FIG. 4, HGW2 132''' of FIG. 5, and/or a HGW implementing steps of the one or more of the methods of FIG. 6-10.

HGW 2400, includes a processor 2402, e.g., a CPU, memory 2404, and an assembly of modules 2410, e.g., an assembly of hardware modules, coupled together via a bus 2411 over which the various elements may exchange data and information. HGW 2400 further includes an input module 2406 and an output module 2408, which are coupled to the processor 2402. In various embodiments, the input module 2406 and the output module 2408 are included as part of a communications interface module 2415. In various embodiments, communications interface module 2415 includes interfaces for communications with different types of devices, e.g., other DNSs, other HGWs, SGWs, MMEs, HeNBs, management devices, UEs, etc. and/or supporting a plurality of different communications protocols. The input module 2406 and/or output module 2408 may, and in some embodiments do, include a plurality of different ports and/or interfaces. Input module 2406 includes one or more receivers including RX 2407. Output module 2408 includes one or more transmitters including a transmitter TX 2409.

HGW 2400 receives signals including messages via input module 2406. Exemplary signals received by receiver RX 2407 include primary transport connection establishment signals, secondary transport connection establishment signals, transport connection status signals, transport connection heartbeat signals, path switch request messages, path switch request acknowledgment messages, and UE context release request messages.

HGW 2400 transmits signals including messages via output module 2408. Exemplary signals transmitted by transmitter TX 2409 include primary transport connection establishment signals, secondary transport connection establishment signals, transport connection status signals, transport connection heartbeat signals, path switch request messages which are being forwarded, path switch request acknowledgment messages which are being forwarded, and UE context release request messages.

Memory 2404 includes routines 2412 and data/information 2414. Routines 2412 includes an assembly of modules 2416.

Figure 25:
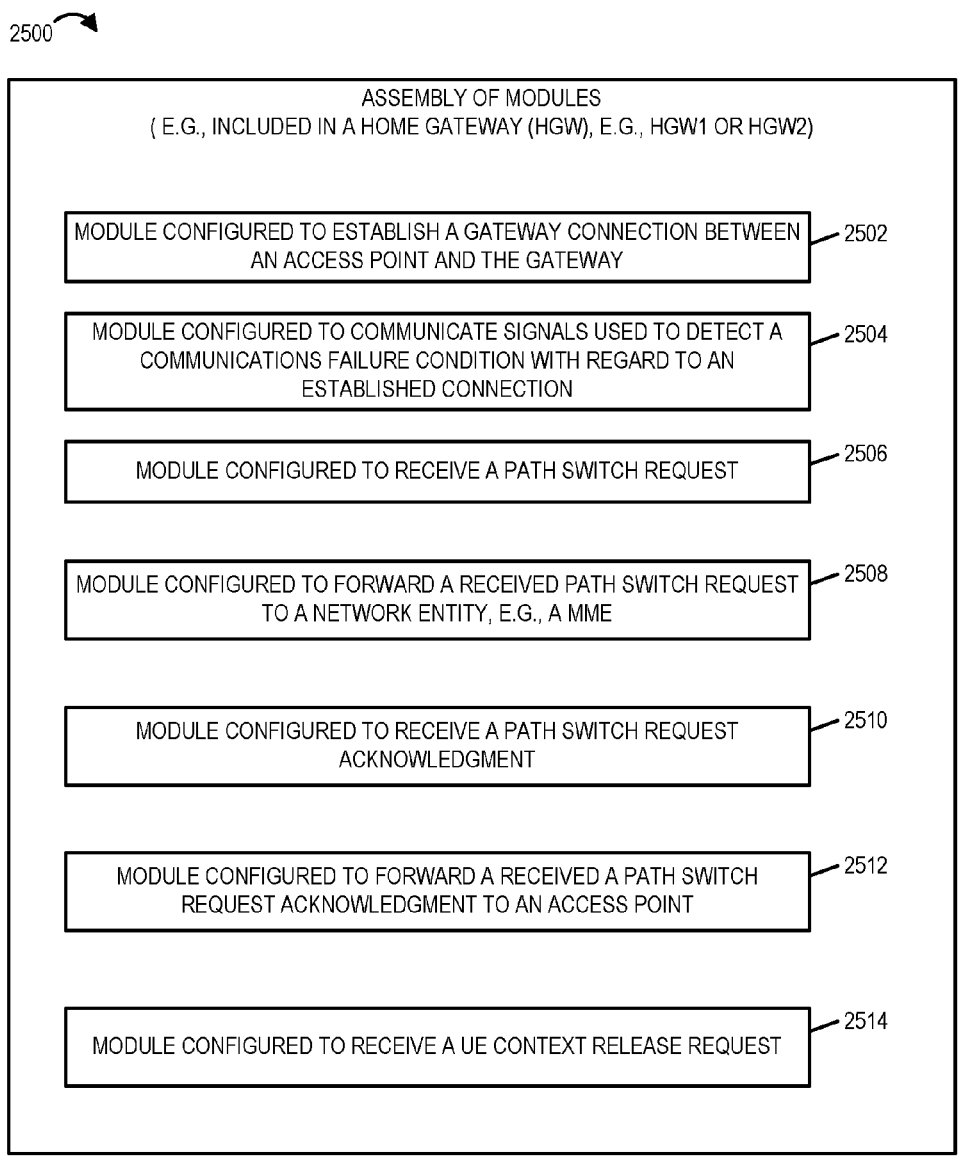
FIG. 25 is a drawing of an assembly of modules which may be included in the HGW of FIG. 24 in accordance with an exemplary embodiment.

FIG. 25 is a drawing of an assembly of modules 2500 which may be included in an exemplary HGW 2400 in accordance with an exemplary embodiment. Assembly of modules 2500 can be, and in some embodiments is, used in HGW 2400. The modules in the assembly of modules 2500 can, and in some embodiments are, implemented fully in hardware within the processor 2402, e.g., as individual circuits. The modules in the assembly of modules 2500 can, and in some embodiments are, implemented fully in hardware within the assembly of modules 2410, e.g., as individual circuits corresponding to the different modules. In other embodiments some of the modules are implemented, e.g., as circuits, within the processor 2402 with other modules being implemented, e.g., as circuits within assembly of modules 2410, external to and coupled to the processor 2402. As should be appreciated the level of integration of modules on the processor and/or with some modules being external to the processor may be one of design choice. Alternatively, rather than being implemented as circuits, all or some of the modules may be implemented in software and stored in the memory 2404 of the HGW 2400, with the modules controlling operation of HGW 2400 to implement the functions corresponding to the modules when the modules are executed by a processor, e.g., processor 2402. In some such embodiments, the assembly of modules 2500 is included in the memory 2404 as assembly of modules 2416. In still other embodiments, various modules in assembly of modules 2500 are implemented as a combination of hardware and software, e.g., with another circuit external to the processor providing input to the processor 2402 which then under software control operates to perform a portion of a module's function. While shown in the FIG. 24 embodiment as a single processor, e.g., computer, it should be appreciated that the processor 2402 may be implemented as one or more processors, e.g., computers.

When implemented in software the modules include code, which when executed by the processor 2402, configure the processor 2402 to implement the function corresponding to the module. In embodiments where the assembly of modules 2500 is stored in the memory 2404, the memory 2404 is a computer program product comprising a computer readable medium comprising code, e.g., individual code for each module, for causing at least one computer, e.g., processor 2402, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 25 control and/or configure the HGW 2400 or elements therein such as the processor 2402, to perform the functions of corresponding steps illustrated in the method of one or more of the signaling drawing of FIGS. 2-5 and/or one or more of the flowcharts of FIGS. 6-10. Thus the assembly of modules 2500 includes various modules that perform functions of corresponding steps of one or more of FIGS. 2-10.

Assembly of modules 2500 includes a module 2502 configured to establish a gateway connection, e.g., a primary transport connection or a secondary transport connection, between an access point, e.g., a HeNB, and the gateway, e.g., HGW 2400, a module 2504 configured to communicate signals used to detect a communications failure condition with regard to an established connection, e.g., signals including heartbeat signals, a module 2506 configured to receive a path switch request, e.g., a path switch request communicated over a secondary transport connection in response to a detected primary gateway communications failure, a module 2508 configured to forward a received path switch request to a network entity, e.g., to a MME, a module 2510 configured to receive a path switch request acknowledgment, a module 2512 configured to forward a received path switch request acknowledgment to an access point, and a module 2514 configured to receive a UE context release request.

Figure 26:
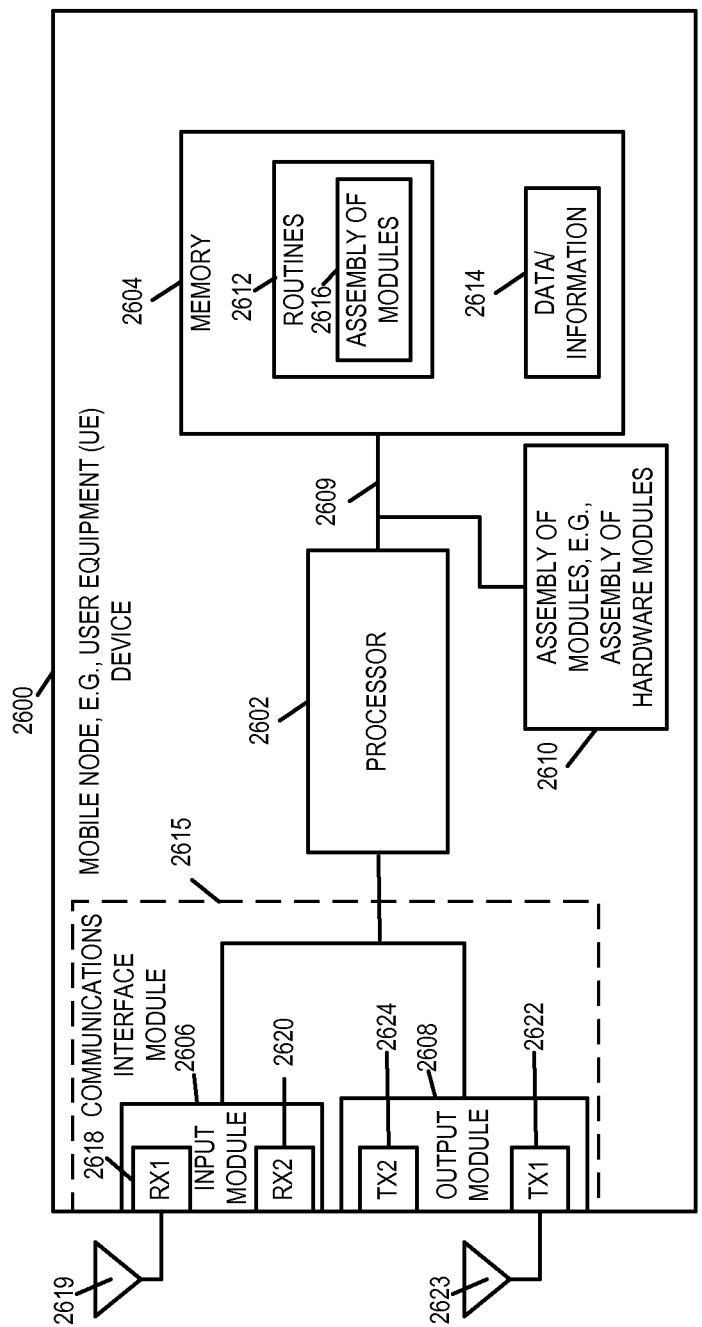
FIG. 26 is a drawing of an exemplary mobile node, e.g., a user equipment (UE) device, in accordance with an exemplary embodiment.

FIG. 26 is a drawing of an exemplary mobile node 2600, e.g., a user equipment (UE) device in accordance with an exemplary embodiment. Exemplary mobile node 2600 is, e.g., UE 134 of system 100 of FIG. 1 or FIG. 2, UE 134' of FIG. 3, UE 134" of FIG. 4, UE 134''' of FIG. 5, and/or a UE implementing steps of the one or more of the methods of FIG. 6-10.

Mobile node 2600, e.g., a UE, includes a processor 2602, e.g., a CPU, memory 2604, and an assembly of modules 2610, e.g., an assembly of hardware modules, coupled together via a bus 2609 over which the various elements may exchange data and information. Mobile node 2600 further includes an input module 2606 and an output module 2608, which are coupled to the processor 2602. In various the input module 2606 and the output module 2608 are included as part of a communications interface module 2615. In various embodiments, communications interface module 2615 includes interfaces for communications with different types of devices and/or supporting a plurality of different communications protocols. The input module 2606 and/or output module 2608 may, and in some embodiments do, include a plurality of different ports and/or interfaces. Input module 2606 includes a plurality of receivers including a first receiver RX 1 2618, which is a wireless receiver coupled to transmit antenna 2619, and a second receiver RX 2 2620. Output module 2608 includes a plurality of transmitters including a first transmitter TX 1 2622, which is a wireless transmitter coupled to transmit antenna 2623, and a second transmitter TX 2 1424. In some embodiments, the same antenna is used for both receive and transmit.

Mobile node 2600 receives signals including connection establishment signals and user data signals via RX 1 2618. Mobile node 2600 transmits signals including connection establishment signals and user data signals via TX 1 2622.

Memory 2604 includes routines 2612 and data/information 2614. Routines 2612 includes an assembly of modules 2616. Data information 2614 includes session information and user data.

Figure 27:
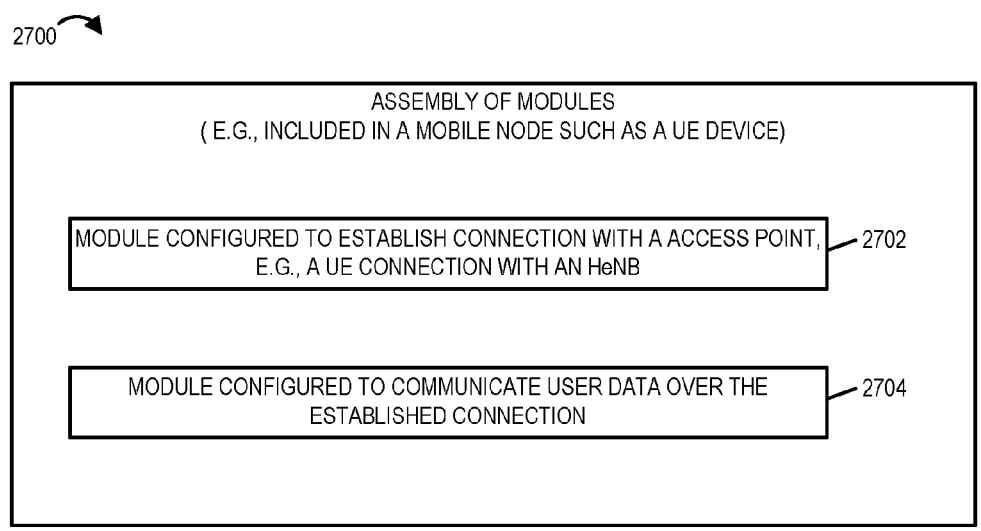
FIG. 27 is a drawing of an assembly of modules which may be included in the mobile node of FIG. 26 in accordance with an exemplary embodiment.

FIG. 27 is a drawing of an assembly of modules 2700 which may be included in an exemplary mobile node, e.g., a UE device, in accordance with an exemplary embodiment. Assembly of modules 2700 which can, and in some embodiments is, used in the mobile node 2600. The modules in the assembly of modules 2700 can, and in some embodiments are, implemented fully in hardware within the processor 2602, e.g., as individual circuits. The modules in the assembly of modules 2700 can, and in some embodiments are, implemented fully in hardware within the assembly of modules 2610, e.g., as individual circuits corresponding to the different modules. In other embodiments some of the modules are implemented, e.g., as circuits, within the processor 2602 with other modules being implemented, e.g., as circuits within assembly of modules 2610, external to and coupled to the processor 2602. As should be appreciated the level of integration of modules on the processor and/or with some modules being external to the processor may be one of design choice.

Alternatively, rather than being implemented as circuits, all or some of the modules may be implemented in software and stored in the memory 2604 of the mobile node 2600, with the modules controlling operation of mobile node 2600 to implement the functions corresponding to the modules when the modules are executed by a processor, e.g., processor 2602. In some such embodiments, the assembly of modules 2700 is included in the memory 2604 as assembly of modules 2616. In still other embodiments, various modules in assembly of modules 2700 are implemented as a combination of hardware and software, e.g., with another circuit external to the processor providing input to the processor 2602 which then under software control operates to perform a portion of a module's function. While shown in the FIG. 26 embodiment as a single processor, e.g., computer, it should be appreciated that the processor 2602 may be implemented as one or more processors, e.g., computers.

When implemented in software the modules include code, which when executed by the processor 2602, configure the processor 2602 to implement the function corresponding to the module. In embodiments where the assembly of modules 2700 is stored in the memory 2604, the memory 2604 is a computer program product comprising a computer readable medium comprising code, e.g., individual code for each module, for causing at least one computer, e.g., processor 2602, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 27 control and/or configure the mobile node 2600 or elements therein such as the processor 2602, to perform the functions of corresponding steps illustrated in the method of one or more of the signaling drawing of FIGS. 2-5 and/or one or more of the flowcharts of FIGS. 6-10. Thus the assembly of modules 2700 includes various modules that perform functions of corresponding steps of one or more of FIGS. 2-10.

Assembly of modules 2700 includes a module 2702 configured to establish a connection with an access point, e.g., a UE connection with an HeNB, and a module 2704 configured to communicate user data over the established connection.

An exemplary communications method, in accordance with some embodiments, comprises: establishing a primary gateway connection between an access point, e.g., a HeNB, and a primary gateway; establishing a connection for a user equipment (UE) device to said access point, said established connection being between said UE device and said access point; and transmitting a path switch request via a secondary gateway connection between said access point and a secondary gateway, to a network entity, e.g., a MME, for said UE device connected to said access point while said UE device remains connected to said access point.

In some embodiments, the primary gateway connection is a transport layer connection, and the secondary gateway connection is a transport layer connection.

In some embodiments, the access point is an LTE HeNB. In various embodiments, the path switch request is a request to update data and signaling paths corresponding to the UE device. In some embodiments, said path switch request is an LTE S1AP Path Switch Request.

In some embodiments, the UE device is connected to one cell of said access point prior to and subsequent to said path switch request.

In various embodiments, the exemplary method includes transmitting a context release request for said UE device to the primary gateway following transmission of said path switch request.

In some embodiments, the exemplary method includes detecting, at said access point or a management device, a primary gateway communication failure; and the path switch request is sent via the secondary gateway connection in response to detecting the primary gateway communication failure. In some such embodiments, the primary gateway is located in a first data center; and the exemplary method further includes receiving at a DNS server a request to resolve a name corresponding to a tracking area identifier corresponding to the area in which the access point is located; and responding to said request to resolve the name with an IP address or a domain name and an IP address, corresponding to a second data center which is different from said first data center.

In some embodiments, said DNS server is located at said second data center.

In some embodiments, responding, at the DNS server that received said request, to said request to resolve a name includes sending a priority indicator indicating that the response has a lower priority than a response that may be provided by a primary DNS server. In some such embodiments, the primary DNS server is located at the first data center.

In various embodiments, the first and second data centers correspond to different sets of physical equipment. In some such embodiments, the first and second data centers are located in different buildings.

In various embodiments, the exemplary method includes receiving, at the access point, a response to the path switch request from the network entity via the secondary gateway connection. In some such embodiments, the exemplary method further includes sending, in response to receiving the path switch request response, a UE context release message for said UE over the primary connection to the primary gateway. In some such embodiments, the secondary gateway is located at the secondary data center.

In some embodiments, the primary gateway is located in a first data center; and the exemplary method further includes operating the management device to communicate a dynamic DNS update for a tracking area identifier corresponding to a location of the access point, said dynamic DNS update including an IP address or a domain name corresponding to a second data center which is different from first data center. In some such embodiments, the first and second data centers correspond to different sets of physical equipment. In some such embodiments, the first and second data centers are located in different buildings.

In various embodiments, the management device communicates the dynamic DNS update in response to detection of a first data center fault condition. In some embodiments, said management device communicates the dynamic DNS update in accordance with a scheduled maintenance operation on the first data center.

An exemplary communications system, in accordance with some embodiments, includes: an access point, e.g., a HeNB, comprising: a module configured to establish a primary gateway connection between the access point and a primary gateway; a module configured to establish a connection for a user equipment (UE) device to said access point, said established connection being between said UE device and said access point; a transmitter; and a module configured to control the transmitter to transmit a path switch request via a secondary gateway connection between said access point and a secondary gateway, to a network entity, e.g., a MME, for said UE device connected to said access point while said UE device remains connected to said access point. In some such embodiments, the access point is an LTE HeNB. In some embodiments, the primary gateway connection and the second gateway connection are transport layer connections.

In various embodiments, said path switch request is a request to update data and signaling paths corresponding to the UE device. In some embodiments, said path switch request is an LTE S1AP Path Switch Request.

In some embodiments, the UE device is connected to one cell of said access point prior to and subsequent to said path switch request.

In some embodiments, the access point in the exemplary communications system further includes a module configured to control the transmitter to transmit a context release request for said UE device to the primary gateway following transmission of said path switch request.

In some embodiments, the access point further includes: a module configured to detecting a primary gateway communication failure; and the module configured to control the transmitter to transmit a path switch request path switch request is further configured to control the transmitter to transmit the path switch request in response to detecting the primary gateway communication failure.

The communications system, in some embodiments, further includes a management device, and the management device includes: a module configured to detect a primary gateway communication failure; and the path switch request is sent via the secondary gateway connection in response to a detected the primary gateway communication failure by the management device. In some such embodiments, the primary gateway is located in a first data center; and the communications system further includes a DNS server comprising: a module configured to receive a request to resolve a name corresponding to a tracking area identifier corresponding to the area in which the access point is located; and a module configured to respond to said request to resolve the name with an IP address or a domain name and an IP address corresponding to a second data center which is different from said first data center. In some such embodiments, the DNS server is located at said second data center.

In various embodiments, the module configured to respond to said request to resolve a name includes: a module configured to send a priority indicator indicating that the response has a lower priority than a response that may be provided by a primary DNS server.

In various embodiments, the primary DNS server is located at the first data center. In some embodiments, the first and second data centers correspond to different sets of physical equipment. In some such embodiments, the first and second data centers are located in different buildings.

In some embodiments, the access point further includes a module configured to receive, at the access point, a response to the path switch request from the network entity via the secondary gateway connection. In some such embodiments, the access point further includes a module configured to send, in response to receiving the path switch request response, a UE context release message for said UE over the primary connection to the primary gateway. In some such embodiments, the secondary gateway is located at the secondary data center.

In various embodiments, the primary gateway is located in a first data center; and the communications system includes a management device, and the management device includes a module configured to operate the management device to communicate a dynamic DNS update for a tracking area identifier corresponding to a location of the access point, said dynamic DNS update including an IP address or a domain name corresponding to a second data center which is different from first data center. In some such embodiments, the first and second data centers correspond to different sets of physical equipment. In some embodiments, the first and second data centers are located in different buildings.

In some embodiments, the management device includes a module configured to communicates the dynamic DNS update in response to detection of a first data center fault condition. In some embodiments, the management device includes a module configured to communicates the dynamic DNS update in accordance with a scheduled maintenance operation on the first data center.

The techniques of various embodiments may be implemented using software, hardware and/or a combination of software and hardware. Various embodiments are directed to apparatus, e.g., communications device such as home gateway (HGW), access point, e.g., an HeNB, a mobility management entity (MME), serving gateway (SGW), and/or a user equipment (UE) device, a management device, a domain name server (DNS), etc. Various embodiments are also directed to methods, e.g., a method of operating a communications device such as a home gateway (HGW), access point, e.g., an HeNB, a mobility management entity (MME), serving gateway (SGW), a domain name server (DNS), a management device, and/or a user equipment (UE) device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, making a handover type decision, implementing the decision, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes.

Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a gateway, e.g., a Home Gateway (HGW), including a processor configured to implement one, multiple or all of the steps of one or more methods of the invention.

In some embodiments, the processor or processors, e.g., CPUs, of one or more devices, e.g., of the communications device, e.g., an access point such as a HeNB, a gateway such as a HGW, a DNS server, a management device are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device with a processor which includes a module corresponding to each of the steps of the various described methods performed by the device in which the processor is included. In some but not all embodiments an apparatus, e.g., a communications device includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Various features are directed to a system including multiple network nodes or components including, for example, one or more servers and one or more access points, e.g., HeNBs and/or other network nodes or entities. In various embodiments the network nodes or entities are implemented as hardware, e.g., separate devices each including a communications interface for sending and/or receiving signals communicating data or other information, one or more processors and memory. In some embodiments the memory includes data and/or control routines. In at least some embodiments the one or more processors operate under control instructions in the control routine or routines stored in the node's memory. thus, when executed by the processor, the instructions in the node or other network entity to perform the functions in accordance with one or more of the methods described herein. In some embodiments the processor or processors of individual nodes are special purposed processors, e.g., ASICs, with hardware circuitry which is configured to implement or control the node or network entity in which the special purpose processor is located to implement one or more steps in accordance with a method or methods described herein. In at least some embodiments, circuits and/or other hardware are used to implement the node or method resulting in a fully hardware implemented embodiment.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
establishing a primary gateway connection between an access point and a primary gateway;
establishing a connection for a user equipment (UE) device to said access point, said established connection being between said UE device and said access point; and
transmitting a path switch request via a secondary gateway connection between said access point and a secondary gateway, to a network entity which is a mobility management entity (MME) for processing of the path switch request message which is for said UE device connected to said access point while said UE device remains connected to said access point.

2. The method of claim 1, wherein said path switch request is a request to update data and signaling paths corresponding to the UE device to move the control signaling path and the data signaling path from the primary gateway connection to the secondary gateway connection.

3. The method of claim 2,
wherein the first gateway is located at a first data center and the second gateway is located at a second data center; and
wherein the updating of the data and signaling paths by the path switch request message moves the control signaling path and the data signaling path from the first data center at which the first gateway is located to the second data center at which the second gateway is located.

4. The method of claim 2, wherein said move of the control signaling path and the data signaling path from the primary gateway connection to the secondary gateway connection is transparent to the UE.

5. The method of claim 1, wherein said path switch request is an LTE S1AP Path Switch Request.

6. The method of claim 1, wherein the UE device is connected to one cell of said access point prior to and subsequent to said path switch request.

7. The method of claim 1, further comprising:
transmitting a context release request for said UE device to the primary gateway following transmission of said path switch request.

8. The method of claim 1, further comprising:
detecting, at said access point or a management device, a primary gateway communication failure; and
wherein said path switch request is sent via the secondary gateway connection in response to detecting the primary gateway communication failure.

9. The method of claim 8,
wherein the primary gateway is located in a first data center;
the method further comprising:
receiving at a DNS server a request to resolve a name corresponding to a tracking area identifier corresponding to the area in which the access point is located; and
responding to said request to resolve the name with an IP address or a domain name and an IP address, corresponding to a second data center which is different from said first data center.

10. The method of claim 9, further comprising:
receiving, at the access point, a response to the path switch request from the network entity via the secondary gateway connection.

11. The method of claim 1,
wherein the primary gateway is located in a first data center;
the method further comprising:
operating the management device to communicate a dynamic DNS update for a tracking area identifier corresponding to a location of the access point, said dynamic DNS update including an IP address or a domain name corresponding to a second data center which is different from first data center.

12. The method of claim 1, further comprising:
establishing the secondary gateway connection between the access point and the primary gateway; and
wherein said steps of establishing the primary gateway connection and establishing the secondary gateway connection are performed prior to establishing the connection for the user equipment (UE) device to said access point.

13. The method of claim 1 wherein the mobility management entity is an LTE MME.

14. A communications method, the method comprising:
establishing a primary gateway connection between an access point and a primary gateway, said primary gateway being a first HeNB gateway and said access point being an LTE HeNB;
establishing a connection for a user equipment (UE) device to said access point, said established connection being between said UE device and said access point; and
transmitting a path switch request via a secondary gateway connection between said access point and a secondary gateway which is a second HeNB gateway, to a network entity, for said UE device connected to said access point while said UE device remains connected to said access point.

15. The method of claim 14, wherein said network entity is a mobility management entity (MME).

16. A communications system comprising:
an access point comprising:
a module configured to establish a primary gateway connection between an access point and a primary gateway;
a module configured to establish a connection for a user equipment (UE) device to said access point, said established connection being between said UE device and said access point;
a transmitter; and a module configured to control the transmitter to transmit a path switch request via a secondary gateway connection between said access point and a secondary gateway, to a network entity which is a mobility management entity (MME) for processing of the path switch request message for said UE device connected to said access point while said UE device remains connected to said access point.

17. The communications system of claim 16, wherein said path switch request is a request to update data and signaling paths corresponding to the UE device to move the control signaling path and the data signaling path from the primary gateway connection to the secondary gateway connection.

18. The communications system of claim 16, wherein said path switch request is an LTE S1AP Path Switch Request.

19. The communications system of claim 16, wherein the UE device is connected to one cell of said access point prior to and subsequent to said path switch request.

20. The communications system of claim 16, wherein said access point further comprises:
a module configured to control the transmitter to transmit a context release request for said UE device to the primary gateway following transmission of said path switch request.

21. The communications system of claim 16, wherein said access point further comprises:
a module configured to detect a primary gateway communication failure; and
wherein said module configured to control the transmitter to transmit a path switch request is further configured to control the transmitter to transmit the path switch request in response to detecting the primary gateway communication failure.

22. The communications system of claim 21,
wherein the primary gateway is located in a first data center; and
wherein the communications system further comprises:
a DNS server comprising:
a module configured to receive a request to resolve a name corresponding to a tracking area identifier corresponding to the area in which the access point is located; and
a module configured to respond to said request to resolve the name with an IP address or a domain name and an IP address corresponding to a second data center which is different from said first data center.

23. The communications system of claim 22, wherein said access point further comprises:
a module configured to receive, at the access point, a response to the path switch request from the network entity via the secondary gateway connection.

24. The communications system of claim 16,
wherein the primary gateway is located in a first data center; and
wherein said communications system further comprises:
a management device comprising:
a module configured to operate the management device to communicate a dynamic DNS update for a tracking area identifier corresponding to a location of the access point, said dynamic DNS update including an IP address or a domain name corresponding to a second data center which is different from first data center.

25. The system of claim 16 wherein the mobility management entity is an LTE MME.

26. A communications system comprising:
an access point, said access point being an LTE HeNB comprising:
a module configured to establish a primary gateway connection between the access point and a primary gateway, said primary gateway being a first HeNB gateway;
a module configured to establish a connection for a user equipment (UE) device to said access point, said established connection being between said UE device and said access point;
a transmitter; and
a module configured to control the transmitter to transmit a path switch request via a secondary gateway connection between said access point and a secondary gateway which is a second HeNB gateway, to a network entity for said UE device connected to said access point while said UE device remains connected to said access point.

* * * * *